United States Patent
Ma et al.

(10) Patent No.: US 12,513,086 B2
(45) Date of Patent: Dec. 30, 2025

(54) MANAGING A DELAY OF NETWORK SEGMENTS IN AN END-TO-END COMMUNICATION PATH

(71) Applicant: QUALCOMM Incorporated, San Diego, CA (US)

(72) Inventors: Liangping Ma, San Diego, CA (US); Prashanth Haridas Hande, San Diego, CA (US); Nikolai Konrad Leung, San Francisco, CA (US); Thomas Stockhammer, Bergen (DE); Imed Bouazizi, Frisco, TX (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 18/167,531

(22) Filed: Feb. 10, 2023

(65) Prior Publication Data
US 2024/0113975 A1    Apr. 4, 2024

Related U.S. Application Data

(60) Provisional application No. 63/377,157, filed on Sep. 26, 2022.

(51) Int. Cl.
*H04L 47/24* (2022.01)
*H04L 43/0864* (2022.01)
(Continued)

(52) U.S. Cl.
CPC .......... *H04L 47/24* (2013.01); *H04L 43/0864* (2013.01); *H04L 43/106* (2013.01); *H04L 47/283* (2013.01)

(58) Field of Classification Search
None
See application file for complete search history.

(56) References Cited

U.S. PATENT DOCUMENTS

| 7,729,268 B2 * | 6/2010 | Matta | H04L 43/55 370/252 |
| 7,873,025 B2 * | 1/2011 | Patel | H04L 43/0852 370/503 |

(Continued)

FOREIGN PATENT DOCUMENTS

WO    2023080961    5/2023

OTHER PUBLICATIONS

3GPP TR 26.806: "3rd Generation Partnership Project; Technical Specification Group SA, Study on Tethering AR Glasses—Architectures, QoS and Media Aspects (Release 18)", 3rd Generation Partnership Project, Mobile Competence Centre, 650, Route Des Lucioles, F-06921, Sophia-Antipolis Cedex, France, No. V0.3.0, Sep. 23, 2022, 28 Pages, XP052210991, Annex A (informative): QOS control of Relay WLAR UE when 5G Sidelink used for Tethering Link.

(Continued)

*Primary Examiner* — Ranodhi Serrao
(74) *Attorney, Agent, or Firm* — Dinsmore & Shohl LLP

(57) ABSTRACT

Embodiments of systems and methods for managing a delay of network segments in an end-to-end communication path may include determining an end-to-end time delay measurement of a communication path spanning a first communication network and a second communication network, and transmitting a message comprising the determined end-to-end time delay measurement of the communication path spanning the first communication network and the second communication network to a network element of the first communication network, wherein the message is configured to enable the network element of the first communication network to configure the first communication network to provide sufficient Quality of Service (QoS) to support an (Continued)

end-to-end QoS requirement based on the determined end-to-end time delay.

27 Claims, 33 Drawing Sheets

(51) Int. Cl.
*H04L 43/106* (2022.01)
*H04L 47/283* (2022.01)

(56) References Cited

U.S. PATENT DOCUMENTS

| | | | | |
|---|---|---|---|---|
| 8,594,069 B2* | 11/2013 | Ho | .................. | H04W 99/00 370/349 |
| 9,088,492 B2* | 7/2015 | Robitaille | ............. | H04L 43/106 |
| 9,509,582 B2* | 11/2016 | Le Pallec | ............ | H04L 43/0852 |
| 9,762,469 B2* | 9/2017 | Robitaille | ............. | H04L 43/062 |
| 10,091,081 B2* | 10/2018 | Robitaille | ............. | H04L 43/062 |
| 10,439,920 B2* | 10/2019 | McCallen | ............... | H04L 43/08 |
| 2005/0111487 A1* | 5/2005 | Matta | .................. | H04L 43/00 370/468 |
| 2007/0195797 A1* | 8/2007 | Patel | .................... | H04L 47/193 370/469 |
| 2008/0259813 A1* | 10/2008 | Matta | .................. | H04L 43/00 370/252 |
| 2009/0061876 A1* | 3/2009 | Ho | .................. | H04W 99/00 455/436 |
| 2010/0177643 A1* | 7/2010 | Matta | ................. | H04L 41/0896 370/248 |
| 2011/0063988 A1* | 3/2011 | Lee | .................... | H04L 43/106 370/252 |
| 2013/0242775 A1* | 9/2013 | Taylor | .................... | H04L 45/70 370/252 |
| 2014/0043992 A1* | 2/2014 | Le Pallec | ................ | H04L 43/10 370/252 |
| 2015/0222549 A1* | 8/2015 | Kakadia | ................ | H04L 47/283 370/231 |
| 2018/0184152 A1* | 6/2018 | Kirkpatrick | ...... | H04N 21/43637 |
| 2020/0052989 A1* | 2/2020 | Robitaille | ............. | H04L 43/106 |
| 2020/0177484 A1* | 6/2020 | Ameling | ............. | H04L 43/0864 |
| 2021/0105633 A1* | 4/2021 | Vaidya | ................. | H04W 76/27 |

OTHER PUBLICATIONS

3GPP TS 23.501: "3rd Generation Partnership Project, Technical Specification Group Services and System Aspects, System architecture for the 5G System (5GS), Stage 2 (Release 17)", 3rd Generation Partnership Project, Mobile Competence Centre, 650, Route Des Lucioles, F-06921, Sophia-Antipolis Cedex, France, vol. SA WG2, No. V17.6.0, Sep. 22, 2022, 571 Pages, XP052210897, chapter 5.33.3 "QOS Monitoring to Assist URLCC Service" chapter 4.2 "architecture reference model".

Huawei, et al., "Clarification on non-5G delay measurement", S4-230504, 3rd Generation Partnership Project, Mobile Competence Centre, 650, Route Des Lucioles, F-06921 Sophia-Antipolis Cedex, FRANCE, vol. 3GPP Sa 4, No. Online, Apr. 17, 2023-Apr. 21, 2023, Apr. 11, 2023, XP052285096, 5 Pages.

International Search Report and Written Opinion—PCT/US2023/032600—ISA/EPO—Jan. 2, 2024). 18 pages.

Thomas (Qualcomm Incorporated) S., et al., "[FS_SmarTAR] Latency Aspects for SmarTAR", [FS_SmarTAR] Key Issue #1: Latentcy-Measurement, 3GPP SA4 MBS SWG, S4-221319, 3GPP, Mobile Competence Centre, 650, Route Des Lucioles, F-06921 Sophia-Antipolis Cedex, France, vol. 3GPP SA 4, No. Toulouse, FR, Nov. 14, 2022-Nov. 18, 2022, Nov. 8, 2022, XP052225535, 8 Pages, the whole document.

* cited by examiner

MANAGING A DELAY OF NETWORK SEGMENTS IN AN END-TO-END COMMUNICATION PATH

RELATED APPLICATIONS

This application claims the benefit of priority to U.S. Provisional Application No. 63/377,157 entitled "Managing a Delay of Network Segments in an End-To-End Communication Path" filed Sep. 26, 2022, the entire contents of which are incorporated herein by reference for all purposes.

BACKGROUND

A communication network may be configured to provide a Quality of Service (QoS) for an application, service, or data flow. There is a resource cost in provisioning a network to provide a certain QoS, so to meet a particular QoS requirement network operators typically attempt to provide sufficient network resources without overcommitting or undercommitting network resources. Providing a QoS for an application, service, or data flow that involves communication across two or more networks of different types is even more complex.

SUMMARY

Various aspects include systems and methods performed by a network element of a communication network for managing end-to-end Quality of Service (QoS) in a communication path spanning at least two communication networks. Various aspects may include a computing device configured to determine an end-to-end time delay measurement of a communication path spanning a first communication network and a second communication network, and transmit a message including the determined end-to-end time delay measurement of the communication path spanning the first communication network and the second communication network to a network element of the first communication network, wherein the message is configured to enable the network element of the first communication network to configure the first communication network to provide sufficient Quality of Service (QoS) to support an end-to-end QoS requirement based on the determined end-to-end time delay.

In some aspects, the first communication network may be a 5G network and the second communication network may not be a 5G network. Some aspects may include transmitting to a second computing device a timestamp message including an originate timestamp, receiving from the second computing device a timestamp reply message including a receive timestamp and a transmit timestamp, generating a final timestamp upon receipt of the timestamp reply message, and determining the end-to-end time delay of the communication path spanning the first communication network and the second communication network based on the originate timestamp, the receive timestamp, the transmit timestamp, and the final timestamp.

Some aspects may include determining the end-to-end time delay measurement of the communication path spanning the first communication network and the second communication network based on the originate timestamp, the receive timestamp, the transmit timestamp, and a radio access network (RAN) delay. In some aspects, the transmit timestamp may be the originate timestamp plus a delay caused by the first communication network. In some aspects, the timestamp message may include a Real Time Protocol (RTP) or Secure Real Time Protocol (SRTP) message, and the timestamp reply message may include a Real Time Control Protocol (RTCP) message.

Some aspects may include transmitting to the network element of the first communication network a probe message including a second originate timestamp, receiving from the network element of the first communication network a measurement reply message including a second receive timestamp and a second transmit timestamp, and determining a delay of the first communication network based on the second originate timestamp, the second receive timestamp, and the second transmit timestamp. In some aspects, the probe message may be configured to be identified based on at least one of a special radio bearer, a logical channel ID, and a QoS flow ID in a Service Data Adaptation Protocol (SDAP) packet header, a UDP packet port number, a specified value of a differentiated services code point (DSCP), a protocol number, or a value in an Options header field.

In some aspects, the processor may be further configured with processor-executable instructions to transmit to the network element of the first communication device a message including an indication of a propagation delay of an air interface in the communication path spanning the first communication network and the second communication network. In such aspects, the message may be configured to enable the network element of the first communication network to configure the first communication network to provide sufficient Quality of Service (QoS) to support the end-to-end QoS requirement based on the determined end-to-end time delay.

Further aspects include a computing device having a processor configured to perform one or more operations of any of the methods summarized above. Further aspects include a computing device configured with processor-executable instructions to perform operations of any of the methods summarized above. Further aspects include a non-transitory processor-readable storage medium having stored thereon processor-executable instructions configured to cause a processor of a computing device to perform operations of any of the methods summarized above. Further aspects include a computing device having means for performing functions of any of the methods summarized above. Further aspects include a system on chip for use in a computing device and that includes a processor configured to perform one or more operations of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1A:
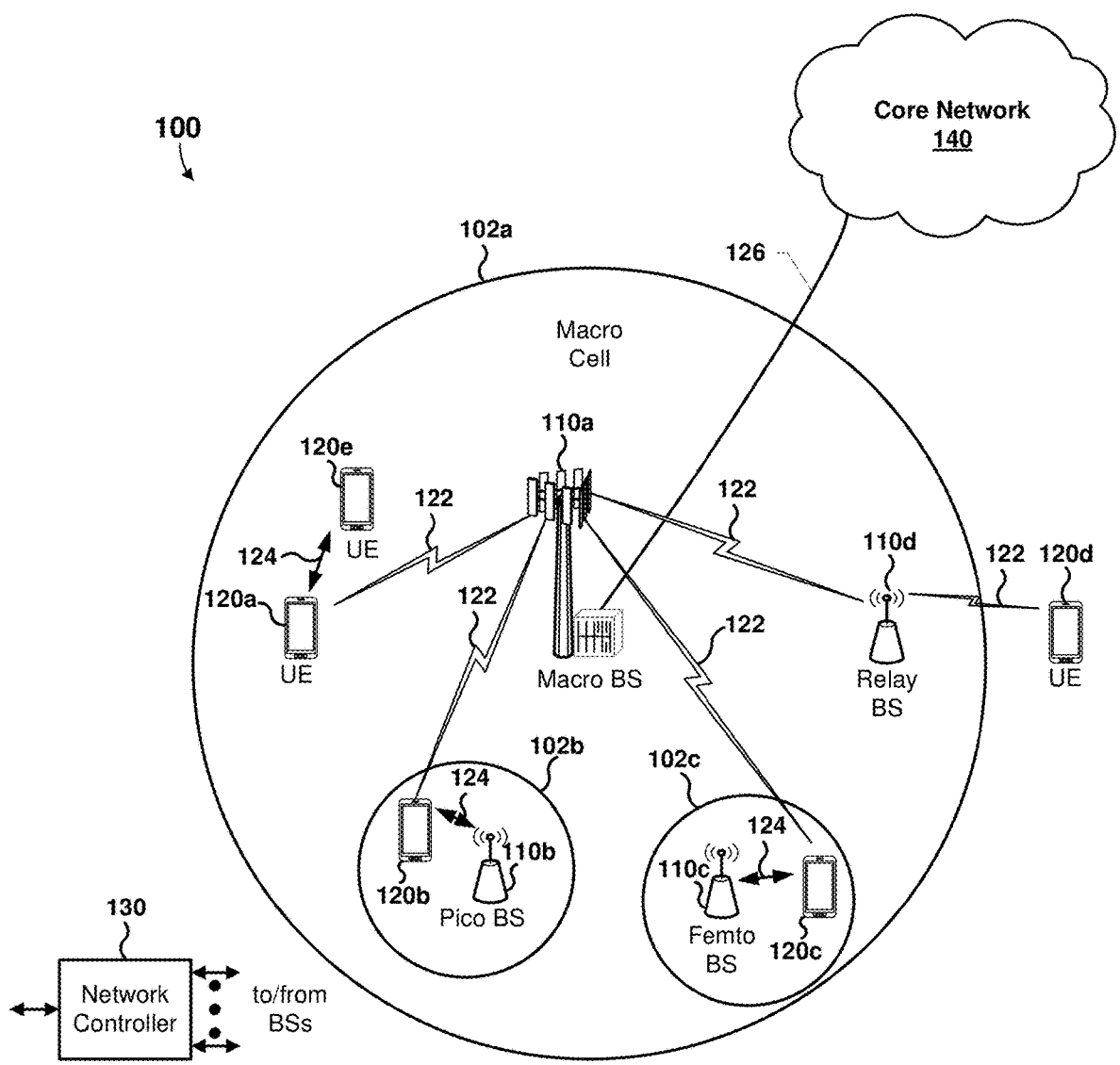
FIG. 1A is a system block diagram illustrating an example communications system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems and methods for managing end-to-end QoS in a communication path spanning a first communication network and a second communication network. Various embodiments may enable a network element to determine QoS requirements for a first communication network based on the end-to-end QoS requirements and the achieved QoS of a second communication network, such as a communication path that traverses a 5G network and one or more non-5G networks. Various embodiments may enable a network element to determine the achieved QoS of the second communication network(s) (e.g., the one or more non-5G networks).

The term "network element" is used herein to refer to any one or all of a computing device that is part of or in communication with a communication network, such as a server, a router, a gateway, a hub device, a switch device, a bridge device, a repeater device, or another electronic device that includes a memory, communication components, and a programmable processor. A wireless device in communication with a network may be considered a network element of such network.

As used herein, the terms "network," "communication network," and "system" may interchangeably refer to a portion or all of a communications network or internetwork. A network may include a plurality of network elements. A network may include a wireless network, and/or may support one or more functions or services of a wireless network.

As used herein, "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (Wi-Fi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

Providing a QoS for an application, service, or data flow that involves communication across two or more networks of different types is complex. A communication network may be able to determine information about, and configure the operations of, its own network elements, including devices communicating with or to those network elements (e.g., devices connected to the communication network). However, a communication network may be unable to obtain information about the operations of other communication networks. For example, an application client of a wireless device may communicate over a communication path with another device (e.g., an application server, or another wireless device). The communication path between the two endpoint devices (the "end-to-end" communication path) may span multiple networks.

As an example, to provide augmented reality application, wireless smart glasses may communicate with (send signals to and receive signals from) an application server over a communication path that spans multiple communication networks. For instance, the smart glasses may communicate with a smart phone over a Wi-Fi network; the smart phone may communicate with a 5G network base station over a cellular communication link; the 5G network may communicate with an internetwork (e.g., the internet); and the internetwork may communicate with a wired network using Ethernet that includes the application server. In this example, the communication path between the smart glasses and the application server spans a Wi-Fi network, a 5G network, an internetwork, and a wired Ethernet network. The augmented reality application of the smart glasses may require a particular QoS to meet one or more application requirements. One network, e.g., the 5G network, may be able to configure its various network elements according to the QoS requirement of the application. However, the 5G network typically has no control over the configuration or operations of network elements of the Wi-Fi network, the internetwork, or the wired Ethernet network.

Various embodiments include methods and network devices configured to perform the methods of managing end-to-end QoS in a communication path spanning a first communication network and a second communication network (which may include one or more other communication networks). For example, the first communication network may include a 5G network, and the second communication network may not be a 5G network. Various operations may be performed by a network element of a communication network functioning as a measurement entity. In various embodiments, a network element of the first communication network may determine an end-to-end QoS requirement for communicating packets from a packet source to a packet destination by the communication path. For example, an application, service, or data flow may request, or may be associated with, a QoS requirement. In various embodiments, the QoS requirement may reflect a performance requirement of the application, service, or data flow. The network element of the first communication network may determine a QoS provided by the second communication network within the communication path. Based on the QoS provided by the second communication network, the network element of the first communication network may configure the first communication network to provide sufficient QoS to support the end-to-end QoS requirement.

In some embodiments, the network element may determine a packet error rate of the second communication network. In such embodiments, the network element may determine a required packet error rate of the first communication network based on the determined packet error rate of the second communication network. The terms "packet error rate" and "packet loss rate" may be used interchangeably herein. In some embodiments, the network elements may determine an available throughput of the second communication network. In such embodiments, the network elements may determine a throughput requirement of the first communication network based on the determined available throughput of the second communication network. In some embodiments, the network element may measure an end-to-end achieved QoS, identify a QoS provided by the first communication network, and determine the QoS provided by the second communication network within the communication path based on the end-to-end achieved QoS and the QoS provided by the first communication network.

In some embodiments, the network element may apply to one or more network elements of the first communication network a 5G QoS Identifier (5QI) that is associated with one or more network element configurations, and/or with one or more measurement operations, to configure the network element(s) to perform operations to enable the network element to determine the QoS provided by the second communication network within the communication path. In some embodiments, any or all of the 5QIs described herein may be defined in a communication standard or technical standard. In some embodiments, a 5QI may be associated with one or more properties or parameters, including at least one of a constant packet delay, a packet delay budget, a packet error rate, a default priority level, a default maximum data burst volume, or another property or parameter.

In some embodiments, the network element may apply a packet delay measurement 5QI that corresponds to a constant packet delay in the first communication network, and may determine the QoS provided by the second communication network within the communication path based on the end-to-end achieved packet delay and the constant packet delay in the first communication network.

In some embodiments, the network element may apply a packet loss rate 5QI that corresponds to a constant packet loss rate in the first communication network, and may determine the QoS provided by the second communication network within the communication path based on the end-to-end achieved packet loss rate and the constant packet loss rate in the first communication network.

In some embodiments, the network element may apply a packet loss rate 5QI associated with a packet loss measurement procedure that excludes packet losses in the first communication network, and may determine the QoS provided by the second communication network within the communication path based on the end-to-end achieved packet loss and the packet loss measurement procedure.

In some embodiments, the network element may apply an available bandwidth 5QI associated with an available bandwidth measurement procedure that configures resources of the first communication network such that a packet loss of the first communication network is substantially negligible relative to a packet loss of the second communication network, and may determine the QoS provided by the second communication network within the communication path based on the end-to-end achieved available bandwidth and the available bandwidth measurement procedure.

In some embodiments, the network element may apply an available bandwidth 5QI associated with an available bandwidth measurement procedure in which data packets are transported in the first communication network back-to-back, and may determine the QoS provided by the second communication network within the communication path based on the end-to-end achieved available bandwidth and the available bandwidth measurement procedure.

In some embodiments, the network element may apply a network measurement 5QI associated with a network measurement procedure for performing end-to-end measurements of measurement packets transported along the communication path, and may determine the QoS provided by the second communication network within the communication path based on the end-to-end achieved QoS and the network measurement procedure.

Various embodiments may improve the operation of a communication network by enabling the configuration of network elements to provide an QoS that meets a QoS requirement for a device, application, or service. Various embodiments may improve the operation of a first communication network by enabling the determination of a QoS provided by another communication network that may include network elements that are not under the control of, or may not otherwise provide information to, the first communication network.

FIG. 1A is a system block diagram illustrating an example communications system 100 suitable for implementing any of the various embodiments. The communications system 100 may be a 5G New Radio (NR) network, or any other suitable network such as a Long Term Evolution (LTE) network. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of wireless devices (illustrated as user equipment (UE) 120a-120e in FIG. 1). The communications system 100 also may include a number of base stations (illustrated as the BS 110a, the BS 110b, the BS 110c, and the BS 110d) and other network entities. A base station is an entity that communicates with wireless devices, and also may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 140 may be any type of core network, such as an LTE core network (e.g., an EPC network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network.

The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a wireless device) and send a transmission of the data to a downstream station (for example, a wireless device or a base station). A relay station also may be a wireless device that can relay transmissions for other wireless devices. In the example illustrated in FIG. 1, a relay station 110d may communicate with macro base station 110a and the wireless device 120d in order to facilitate communication between the base station 110a and the wireless device 120*d*. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120*a*, 120*b*, 120*c* may be dispersed throughout communications system 100, and each wireless device may be stationary or mobile. A wireless device also may be referred to as an access terminal, a terminal, a mobile station, a subscriber unit, a station, user equipment (UE), etc.

A macro base station 110*a* may communicate with the communication network 140 over a wired or wireless communication link 126. The wireless devices 120*a*, 120*b*, 120*c* may communicate with a base station 110*a*-110*d* over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using Time Division Duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. The wireless device 120*a*-120*e* may be included inside a housing that houses components of the wireless device 120*a*-120*e*, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some implementations, two or more wireless devices 120a-120e (for example, illustrated as the wireless device 120a and the wireless device 120e) may communicate directly using one or more sidelink channels 124 (for example, without using a base station 110a-110d as an intermediary to communicate with one another). For example, the wireless devices 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a-110d.

Figure 1B:
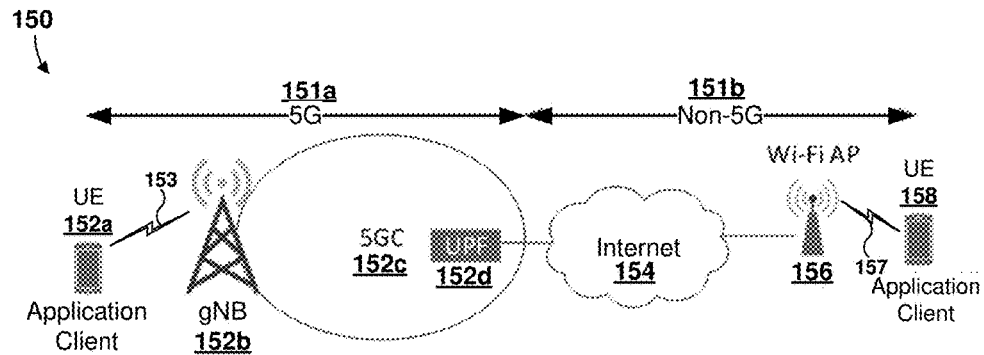
FIGS. 1B-1E are system block diagrams illustrating example communications systems suitable for implementing any of the various embodiments.
Figure 1C:
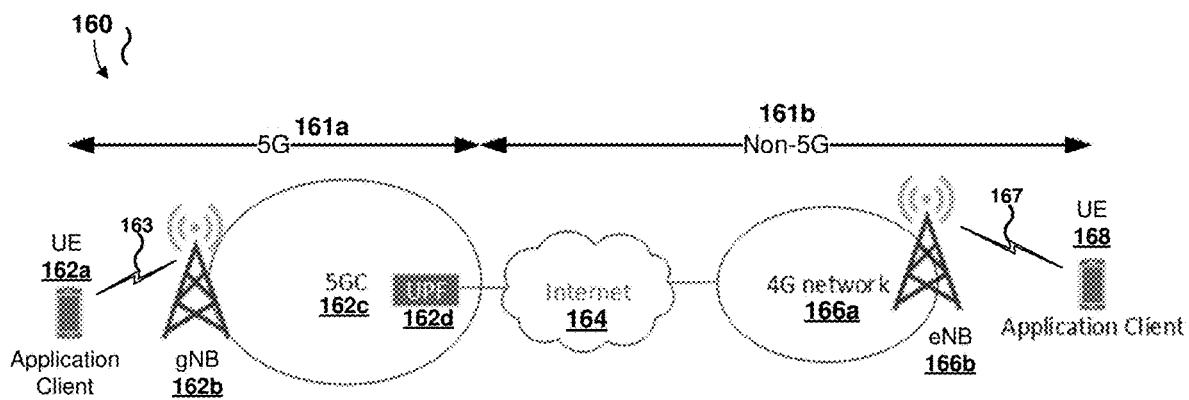
Figure 1D:
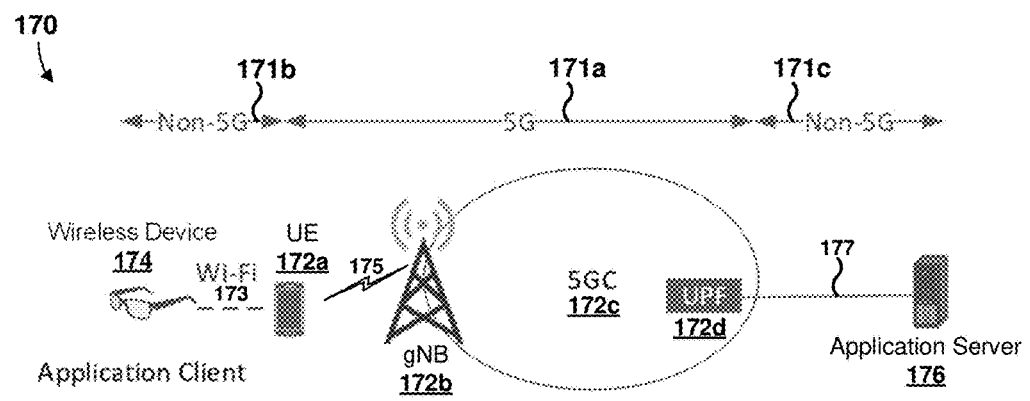

FIGS. 1B-1D are system block diagrams illustrating example communications systems 150, 160, 170, and 180 suitable for implementing any of the various embodiments. With reference to FIGS. 1A-1D, the communications systems 150, 160, 170, and 180 illustrate examples end-to-end communication paths between two endpoint devices that span multiple communication networks. It will be understood that the examples illustrated in communications systems 150, 160, 170, and 180 are non-limiting, and that other implementations of end-to-end communication paths between two endpoint devices that span multiple communication networks are also possible.

Referring to FIG. 1B, an application client executing on a UE 152a (e.g., the wireless devices 120a-120e) may communicate with an application client executing on a UE 158 (e.g., the wireless devices 120a-120e). The communication path between the UE 152a and the UE 158 may span two networks, for example, a 5G network 151a and a non-5G network 151b. In some embodiments, the 5G network 151a may include the UE 152a that may communicate with a gNB 152b via a cellular communication link 153, a 5G core network 152c, and a user plane function (UPF) 152d that may enable communication between the 5G network 151a and the non-5G network 151b. The non-5G network 151b may include an internetwork such as the internet 154, a Wi-Fi access point (AP) 156, and the wireless device 158, which may communicate with the Wi-Fi access point 156 via a Wi-Fi wireless communication link 157.

Referring to FIG. 1C, an application client executing on a UE 162a (e.g., the wireless devices 120a-120e) may communicate with an application client executing on a UE 168 (e.g., the wireless devices 120a-120e). The communication path between the UE 162a and the UE 168 may span two networks, for example, a 5G network 161a and a non-5G network 161. In some embodiments, the 5G network 161a may include the UE 162a that may communicate with a gNB 152b via a cellular communication link 163, a 5G core network 162c, and a user plane function 162d that may enable communication between the 5G network 161a and the non-5G network 161b. The non-5G network 161b may include an internetwork such as the internet 164, a 4G network 166a, a 4G base station such as an eNB 166b, and a wireless device 168, which may communicate with the eNB 166b via a 4G wireless communication link 167.

Referring to FIG. 1D, the communication system 170 may include three networks. An application client executing on a wireless device 174 (illustrated as smart glasses) in a first non-5G network 171b may communicate with an application server 176 in a second non-5G network 171c via a 5G network 171a. In this manner, the communication path between the wireless device 174 and the application server 176 may span three communication networks. In some embodiments, the first non-5G network 171b may include the wireless device 174, which may communicate with a wireless device (UE) 172a via a Wi-Fi communication link 173. The 5G network 171a may include the UE 172a that may communicate with a gNB 172b via a cellular communication link 175, a 5G core network 172c, and a user plane function 172d that may enable communication between the 5G network 171a and the second non-5G network 171c. The second non-5G network 171c may include the application server 176, which may communicate with the 5G network via a wired communication link 177.

Figure 1E:
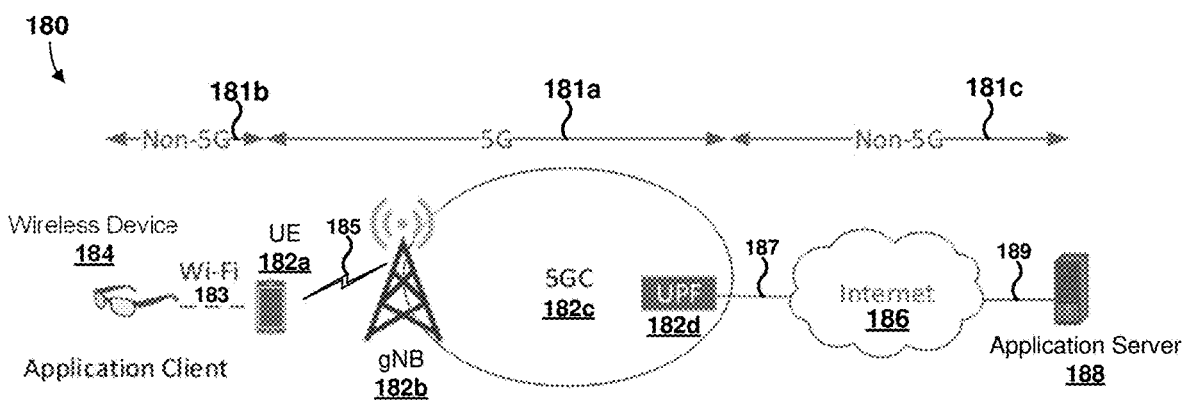

Referring to FIG. 1E, the communication system 180 may include three networks. An application client executing on a wireless device 184 (illustrated as smart glasses) in a first non-5G network 181b may communicate with an application server 188 in a second non-5G network 181c via a 5G network 181a. In this manner, the communication path 189 between the wireless device 184 and the application server 188 may span three communication networks. In some embodiments, the first non-5G network 181b may include the wireless device 184, which may communicate with a wireless device (UE) 182a via a Wi-Fi communication link 181b. The 5G network 181a may include the UE 182a that may communicate with a gNB 182b via a cellular communication link 183, a 5G core network 182c, and a user plane function 182d that may enable communication between the 5G network 181a and the second non-5G network 181c. The second non-5G network 181c may include an internetwork (such as the internet) 186 that may communicate with the 5G network via a wired communication link 185, and the application server 188, which may communicate with the internetwork 186 via a wired communication link 187.

Figure 2:
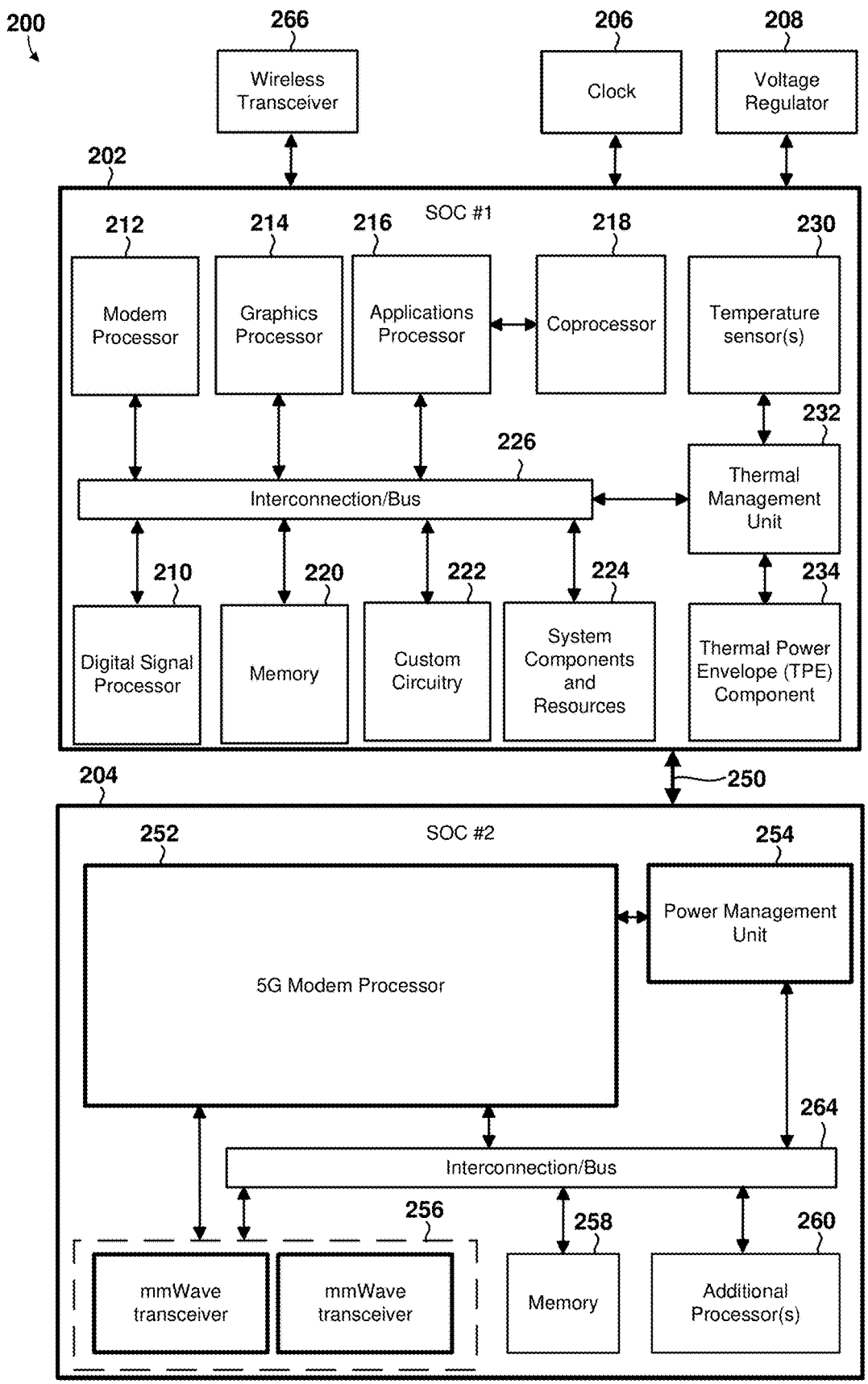
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing device 200 (which may be a SIP in some embodiments) includes a two SOCs 202, 204 coupled to a clock 206, a voltage regulator 208, and a wireless transceiver 266 configured to send and receive wireless communications via an antenna (not shown) to/from a wireless device (e.g., 120a-120e) or a base station (e.g., 110a-110d). In some implementations, the first SOC 202 may operate as central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), and/or very high frequency short wavelength (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (such as CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
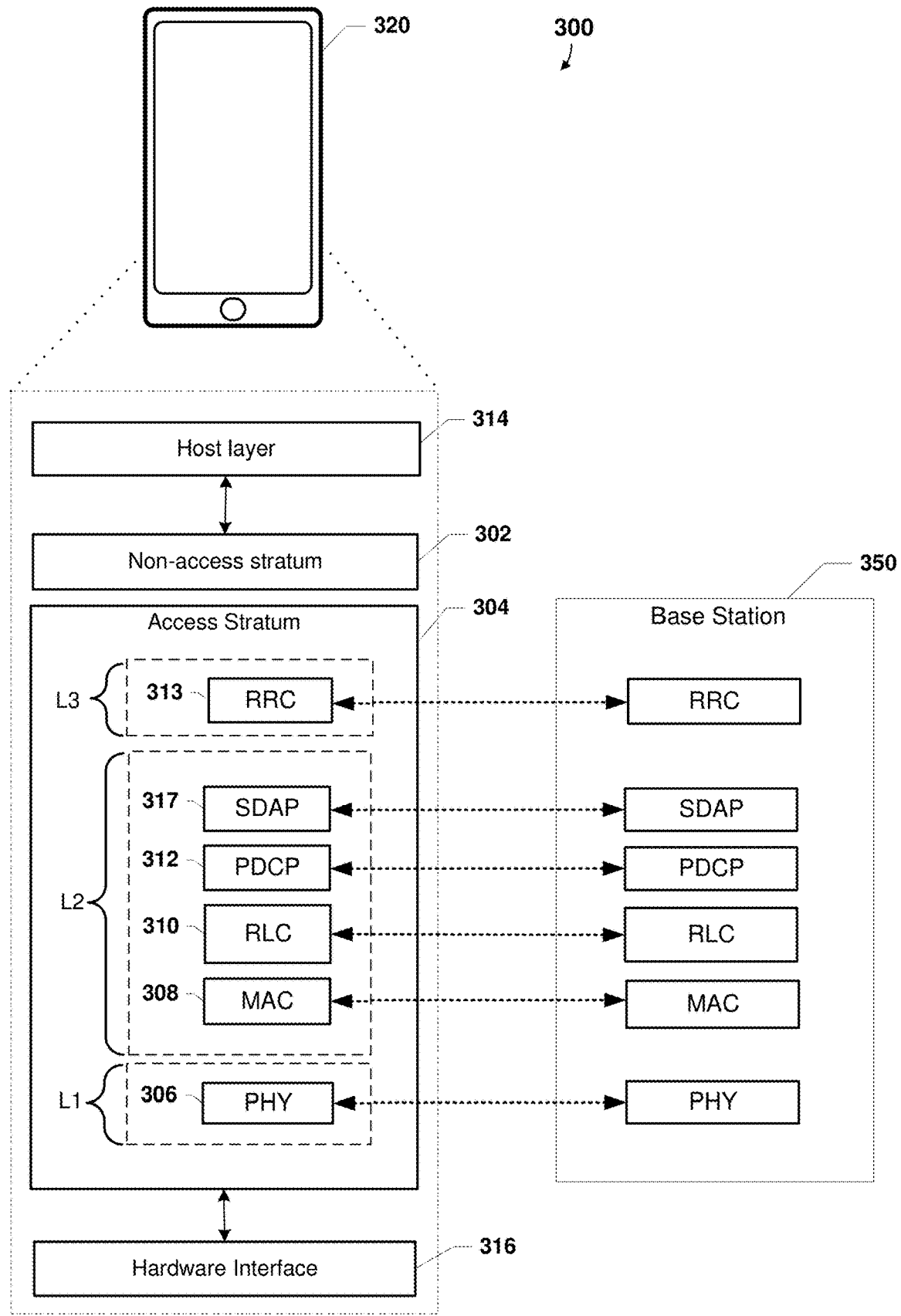
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments.

With reference to FIGS. 1-3, the wireless device 320 may implement the software architecture 300 to facilitate communication between a wireless device 320 (e.g., the wireless device 120a-120e, 200) and the base station 350 (e.g., the base station 110a-110d) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In some implementations, Layer 2 may include a media access control (MAC) sublayer 308, a radio link control (RLC) sublayer 310, and a packet data convergence protocol (PDCP) 312 sublayer, and a Service Data Adaptation Protocol (SDAP) 317 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the wireless device 320 and the base station 350.

In various embodiments, the SDAP sublayer 317 may provide mapping between Quality of Service (QoS) flows and data radio bearers (DRBs). In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as Internet Protocol (IP) layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4:
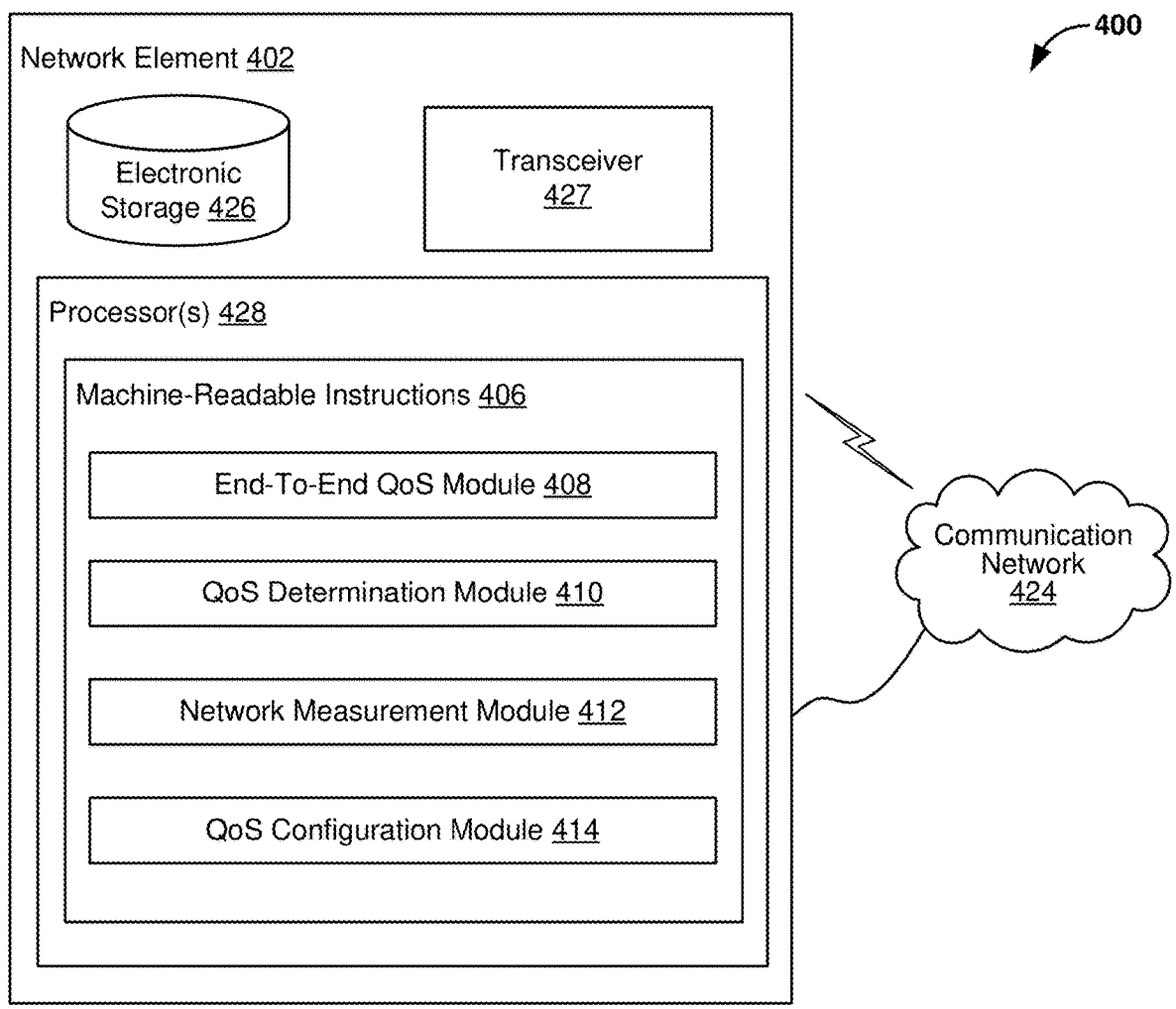
FIG. 4 is a component block diagram illustrating a system configured for managing end-to-end QoS in a communication path spanning a first communication network and a second communication network in accordance with various embodiments.

FIG. 4 is a component block diagram illustrating a system 400 configured for managing end-to-end QoS in a communication path spanning a first communication network and a second communication network in accordance with various embodiments. With reference to FIGS. 1-4, system 400 may include a network element 402 of a 5G network, such as a wireless device (e.g., 110a-110d, 200, 320), a base station (e.g., 120a-120e, 200, 350), or another network element of a 5G network, including any network element of the core network 140 or the 5G networks 151a, 161a, 171a, and 181a.

The network element 402 may be a computing device (e.g., a server or similar computer) including one or more processors 428 coupled to electronic storage 426 and a transceiver 427 (which may be a wired transceiver and/or a wireless transceiver, e.g., 266). In the network element 402, the transceiver 427 may be configured to receive messages sent in transmissions and pass such message to the processor (s) 428 for processing. Similarly, the processor 428 may be configured to send messages for transmission to the transceiver 427 for transmission. The network element 402 may send or receive messages to or from a communication network 424 via a wired and/or wireless communication link.

Referring to the base station 402, the processor(s) 428 may be configured by machine-readable instructions 406. Machine-readable instructions 406 may include one or more instruction modules. The instruction modules may include computer program modules. The instruction modules may include one or more of an end-to-end QoS module 408, a QoS determination module 410, a network measurement module 412, a QoS configuration module 414, or other instruction modules.

The end-to-end QoS module 408 may be configured to determine an end-to-end QoS requirement for communicating packets from a packet source to a packet destination by the communication path.

The QoS determination module 410 may be configured to determine a QoS provided by the second communication network within the communication path. The QoS determination module 410 may be configured to determine a packet error rate of the second communication network. The QoS determination module 410 may be configured to determine an available throughput of the second communication network. The QoS determination module 410 may be configured to measure an end-to-end achieved QoS, identify a QoS provided by the first communication network, and determine the QoS provided by the second communication network within the communication path based on the end-to-end achieved QoS and the QoS provided by the first communication network.

The network measurement module 412 may be configured to apply to the first communication network a packet delay measurement 5QI that corresponds to a constant packet delay in the first communication network, and determine the QoS provided by the second communication network within the communication path based on the end-to-end achieved QoS and the constant packet delay in the first communication network. In some embodiments, the network measurement module 412 may be configured to apply to the first communication network a packet loss rate 5QI that corresponds to a constant packet loss rate in the first communication network, and determine the QoS provided by the second communication network within the communication path based on the end-to-end achieved QoS and the constant packet loss rate in the first communication network. In some embodiments, the network measurement module 412 may be configured to apply to the first communication network a packet loss rate 5QI associated with a packet loss measurement procedure that excludes packet losses in the first communication network, and determine the QoS provided by the second communication network within the communication path based on the end-to-end achieved QoS and the packet loss measurement procedure.

In some embodiments, the network measurement module 412 may be configured to apply to the first communication network an available bandwidth 5QI associated with an available bandwidth measurement procedure that configures resources of the first communication network such that a packet loss of the first communication network is substantially negligible relative to a packet loss of the second communication network, and determine the QoS provided by the second communication network within the communication path based on the end-to-end achieved QoS and the available bandwidth measurement procedure. In some embodiments, the network measurement module 412 may be configured to apply to the first communication network an available bandwidth 5QI associated with an available bandwidth measurement procedure in which data packets are transported in the first communication network back-to-back, and determine the QoS provided by the second communication network within the communication path based on the end-to-end achieved QoS and the available bandwidth measurement procedure. In some embodiments, the network measurement module 412 may be configured to apply to the first communication network a network measurement 5QI associated with a network measurement procedure for performing end-to-end measurements of measurement packets transported along the communication path, and determine the QoS provided by the second communication network within the communication path based on the end-to-end achieved QoS and the network measurement procedure. In some aspects, the measurements packets may be test packets, probe packets, or packets of the application between the two end-point devices.

The QoS configuration module 414 may be configured to configure the first communication network to provide sufficient QoS to support the end-to-end QoS requirement based on the QoS provided by the second communication network. The QoS configuration module 414 may be configured to determine a required packet error rate of the first communication network based on the determined packet error rate of the second communication network. QoS configuration module 414 may be configured to determine a throughput requirement of the first communication network based on the determined available throughput of the second communication network.

The electronic storage 426 may include non-transitory storage media that electronically stores information. The electronic storage media of electronic storage 426 may include one or both of system storage that is provided integrally (i.e., substantially non-removable) with the network element 402 and/or removable storage that is removably connectable to the network element 402 via, for example, a port (e.g., a universal serial bus (USB) port, a firewire port, etc.) or a drive (e.g., a disk drive, etc.). Electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426 may include one or more virtual storage resources (e.g., cloud storage, a virtual private network, and/or other virtual storage resources). Electronic storage 426 may store software algorithms, information determined by processor(s) 428, information received from the network element 402, or other information that enables the network element 402 to function as described herein.

Processor(s) 428 may be configured to provide information processing capabilities in the network element 402. As such, the processor(s) 428 may include one or more of a digital processor, an analog processor, a digital circuit designed to process information, an analog circuit designed to process information, a state machine, and/or other mechanisms for electronically processing information. Although the processor(s) 428 are illustrated as single entities, this is for illustrative purposes only. In some embodiments, the processor(s) 428 may include a plurality of processing units and/or processor cores. The processing units may be physically located within the same device, or processor(s) 428 may represent processing functionality of a plurality of devices operating in coordination. The processor(s) 428 may be configured to execute modules 408-414 and/or other modules by software; hardware; firmware; some combination of software, hardware, and/or firmware; and/or other mechanisms for configuring processing capabilities on processor(s) 428. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-414 described below is for illustrative purposes, and is not intended to be limiting, as any of modules 408-414 may provide more or less functionality than is described. For example, one or more of the modules 408-414 may be eliminated, and some or all of its functionality may be provided by other modules 408-414. As another example, the processor(s) 428 may be configured to execute one or more additional modules that may perform some or all of the functionality attributed below to one of the modules 408-414.

Figure 5:
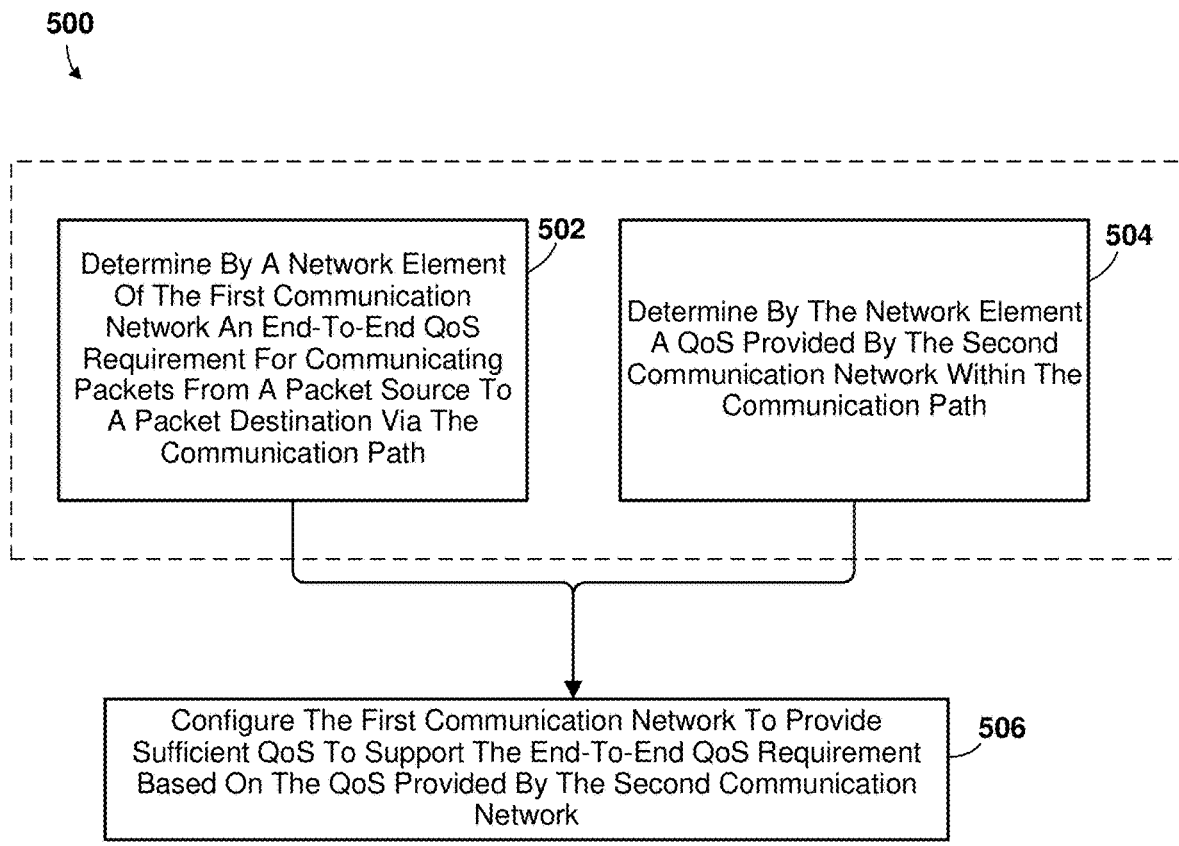
FIG. 5 is a process flow diagram illustrating a method performed by a processor of a network element for enhancing coverage for initial access according to various embodiments.

FIG. 5 is a process flow diagram illustrating a method 500 performed by a processor of a computing device functioning as a network element for enhancing coverage for initial access according to various embodiments. With reference to FIGS. 1-5, the operations of the method 500 may be performed by a processor (such as the processor 210, 212, 214, 216, 218, 252, 260, 428) of a computing device configured to function as a network element (e.g., 402) of the core network 140 or the 5G networks 151a, 161a, 171a, and 181a, a base station device (such as the base station 110a-110d, 200, 350, or a wireless device (e.g., 110a-110d, 200, 320)

In various embodiments, the processor may perform the operations of blocks 502 and 504 in any order, or substantially simultaneously (indicated by the dashed box).

In block 502, the processor may determine an end-to-end QoS requirement for communicating packets from a packet source to a packet destination via the communication path. In some embodiments, the communication path may span two or more communication networks, such as a first communication network and a second communication network. In some embodiments, the first communication network may include a 5G network and the second communication network may include a non-5G network. In some embodiments, the processor may determine an end-to-end QoS requirement associated with an application or application client executing on an endpoint device (e.g., 152a, 162a, 172a, 182a). In some embodiments, the processor may receive the message from an application or application client including the end-to-end QoS requirement. In some embodiments, the processor may determine the end-to-end QoS requirement based on one or more messages from the application, application client, and/or endpoint device. Means for performing the operations of block 502 may include the processor 210, 212, 214, 216, 218, 252, 260, 428 of a computing device functioning as a network element, the wireless transceiver 266, the transceiver 427, and the end-to-end QoS module 408.

In block 504, the processor may determine a QoS provided by the second communication network within the communication path. In some embodiments, the processor may determine a packet error rate of the second communication network. In some alignments, the processor may determine an available throughput of the second communication network. In some embodiments, the processor may measure an end-to-end achieved QoS, identify a QoS provided by the first communication network, and determine the QoS provided by the second communication network within the communication path based on the end-to-end achieved QoS and the QoS provided by the first communication network. Means for performing the operations of block 504 may include the processor 210, 212, 214, 216, 218, 252, 260, 428 of a computing device functioning as a network element, the wireless transceiver 266, the transceiver 427, and the QoS determination module 410.

In block 506, the processor may configure the first communication network to provide sufficient QoS to support the end-to-end QoS requirement based on the QoS provided by the second communication network. In some embodiments, the processor may send one or more messages to one or more network elements of the first communication network to configure operations of the one or more network elements of the first communication network to perform QoS operations to provide sufficient QoS to support the end-to-end QoS requirement. Means for performing the operations of block 506 may include the processor 210, 212, 214, 216, 218, 252, 260, 428 of a computing device functioning as a network element, the wireless transceiver 266, the transceiver 427, and the QoS configuration module 414.

FIGS. 6A-6I are process flow diagrams illustrating operations 600a-600i that may be performed by a processor of a computing device configured to function as a network element as part of the method 500 for managing end-to-end QoS in a communication path spanning a first communication network and a second communication network according to various embodiments. FIGS. 6J and 6K are conceptual diagrams illustrating example packet loss measurements. FIG. 6L is a conceptual diagram illustrating an example available bandwidth measurement. With reference to FIGS. 1-6L, the operations 600a-600i may be performed by a processor (such as the processor 210, 212, 214, 216, 218, 252, 260, 428) of a network element (e.g., 402) of the core network 140 or the 5G networks 151a, 161a, 171a, and 181a, a base station device (such as the base station 110a-110d, 200, 350, or a wireless device (e.g., 110a-110d, 200, 320).

Figure 6A:
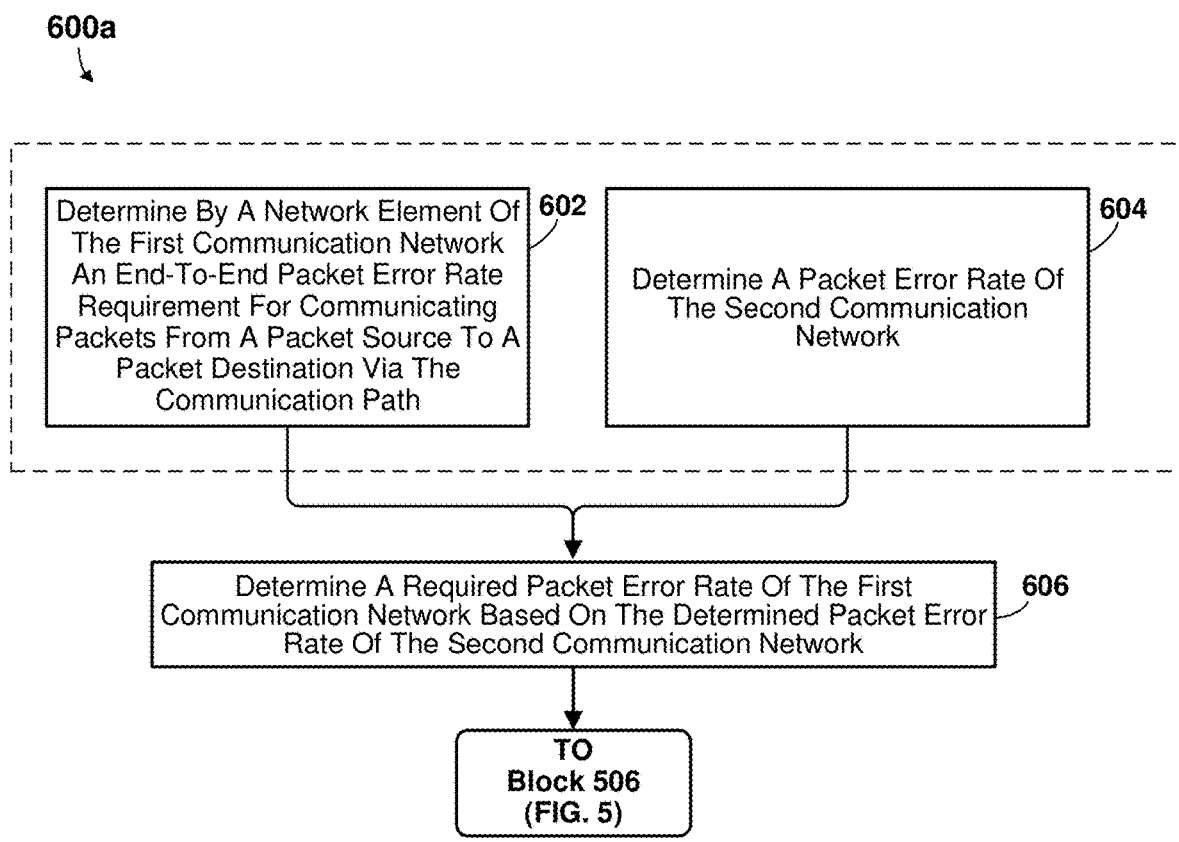
FIGS. 6A-6I are process flow diagrams illustrating operations that may be performed by a processor of a network element as part of the method for managing end-to-end QoS in a communication path spanning a first communication network and a second communication network according to various embodiments.

Referring to FIG. 6A, blocks 602 and 604 are examples of operations that may be performed as part of the blocks 502 and 504 in FIG. 5, respectively. In various embodiments, the processor may perform the operations of blocks 602 and 604 in any order, or substantially simultaneously (indicated by the dashed box).

In block 602, the processor may determine an end-to-end packet error rate for communicating packets from a packet source to a packet destination via the communication path. In some embodiments, the communication path may span two or more communication networks, such as a first communication network and a second communication network. In some implementations, the first communication network and the second communication network may be different types of networks and/or implement different communication protocols (e.g., a 5G network and a non-5G network). Means for performing the operations of block 602 may include the processor 210, 212, 214, 216, 218, 252, 260, 428 of a computing device functioning as a network element, the wireless transceiver 266, the transceiver 427, and the end-to-end QoS module 408.

In block 604, the processor may determine a packet error rate of the second communication network in block 602. Means for performing the operations of block 604 may include the processor 210, 212, 214, 216, 218, 252, 260, 428 of a computing device functioning as a network element, the wireless transceiver 266, the transceiver 427, and the network measurement module 410.

In block 606, the processor may determine a required packet error rate of the first communication network based on the determined packet error rate of the second communication network. Means for performing the operations of block 606 may include the processor 210, 212, 214, 216, 218, 252, 260, 428 of a computing device functioning as a network element, the wireless transceiver 266, the transceiver 427, and the QoS determination module 410.

The processor may then configure the first communication network to provide sufficient QoS to support the end-to-end QoS requirement based on the QoS provided by the second communication network in block 506 of the method 500 as described.

Figure 6B:
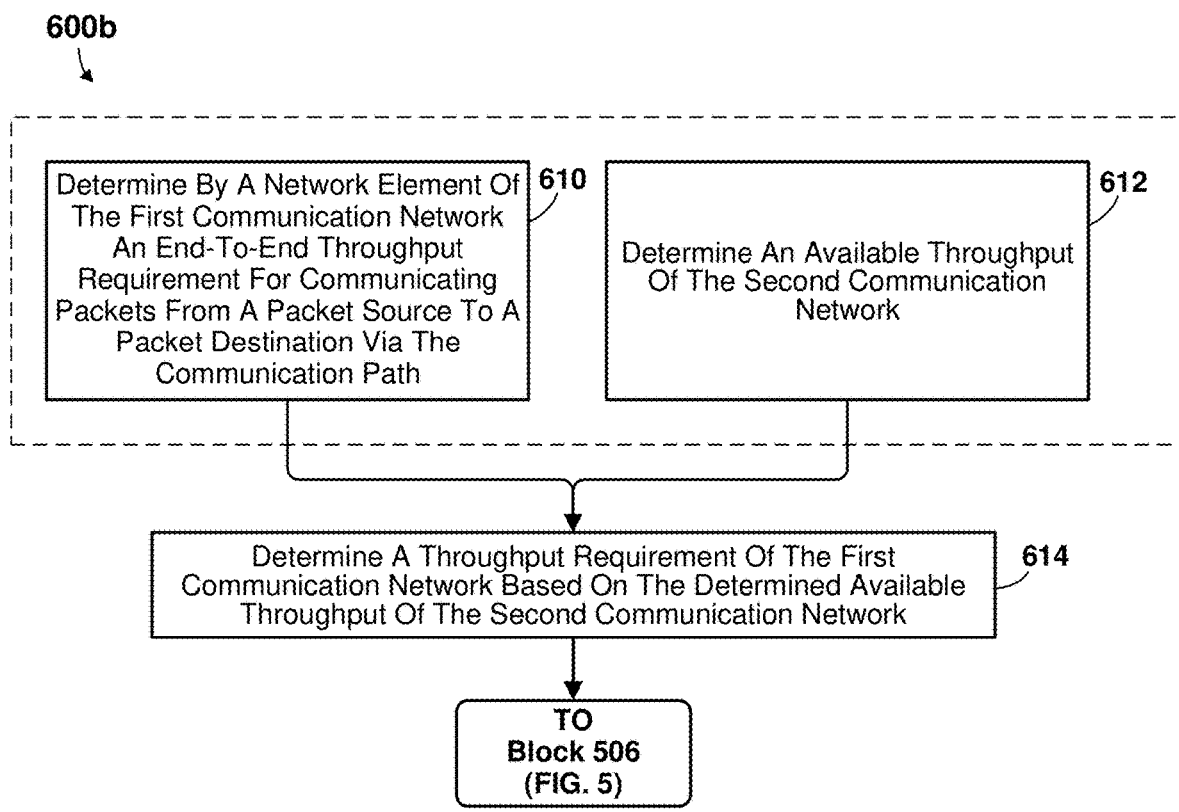

Referring to FIG. 6B, blocks 610 and 612 are examples of operations that may be performed as part of the blocks 502 and 504 in FIG. 5, respectively. In various embodiments, the processor may perform the operations of blocks 610 and 612 in any order, or substantially simultaneously (indicated by the dashed box).

In block 610, the processor may determine an end-to-end throughput requirement for communicating packets from a packet source to a packet destination via the communication path. In some embodiments, the communication path may span two or more communication networks, such as a first communication network and a second communication network. In some implementations, the first communication network and the second communication network may be different types of networks and/or implement different communication protocols (e.g., a 5G network and a non-5G network). Means for performing the operations of block 610 may include the processor 210, 212, 214, 216, 218, 252, 260, 428 of a computing device functioning as a network element, the wireless transceiver 266, the transceiver 427, and the end-to-end QoS module 408.

In block 612, the processor may determine an available throughput of the second communication network in block 610. Means for performing the operations of block 612 may include the processor 210, 212, 214, 216, 218, 252, 260, 428 of a computing device functioning as a network element, the wireless transceiver 266, the transceiver 427, and the network measurement module 410.

In block 614, the processor may determine a throughput requirement of the first communication network based on the determined available throughput of the second communication network. Means for performing the operations of block 614 may include the processor 210, 212, 214, 216, 218, 252, 260, 428 of a computing device functioning as a network element, the wireless transceiver 266, the transceiver 427, and the QoS determination module 410.

The processor may then configure the first communication network to provide sufficient QoS to support the end-to-end QoS requirement based on the QoS provided by the second communication network in block 506 of the method 500 as described.

Figure 6C:
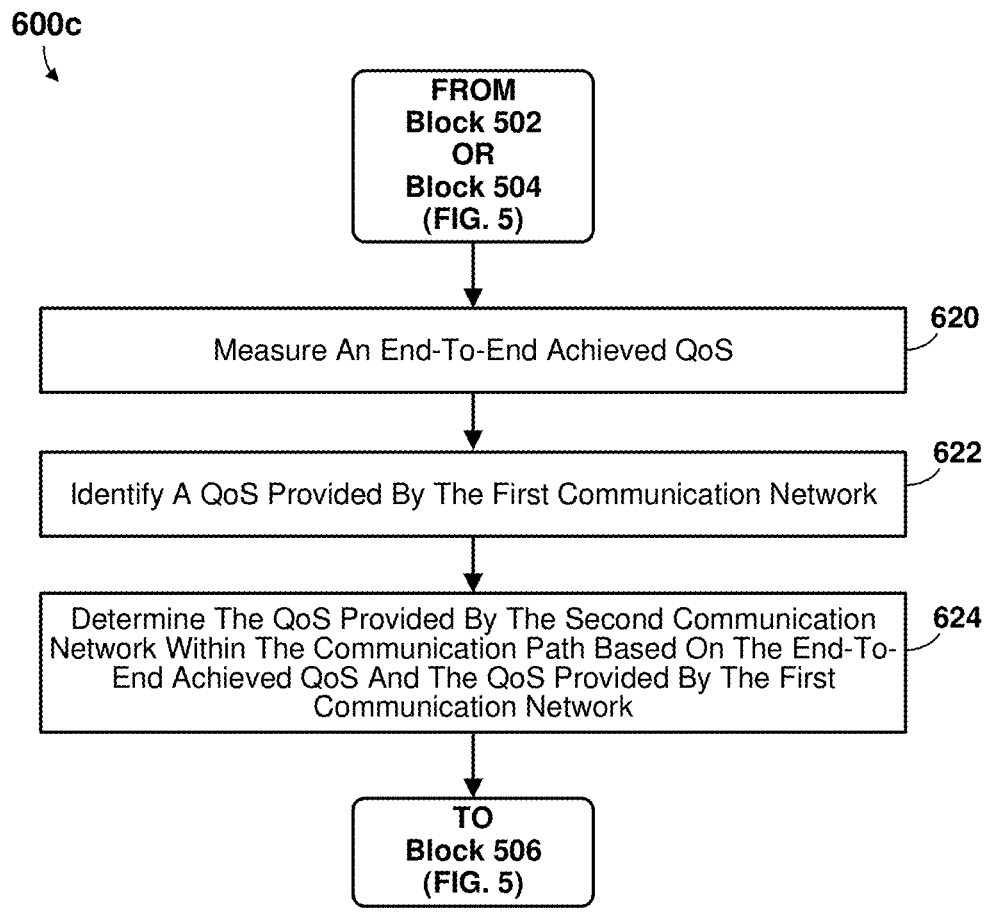

Referring to FIG. 6C, after determining an end-to-end QoS requirement for communicating packets from a packet source to a packet destination via the communication path in block 502 of the method 500 as described, or determining a QoS provided by the second communication network within the communication path in block 504 of the method 500 as described, the processor may measure an end-to-end achieved QoS in block 620. In some embodiments, the processor may perform one or more measurements of packet delay, packet loss, packet departure and arrival time, packet dispersal, and/or another measurement to determine the QoS achieved (provided by) the end-to-end communication path (e.g., from one endpoint to another endpoint) that spans the first communication network and the second communication network. Means for performing the operations of block 620 may include the processor 210, 212, 214, 216, 218, 252, 260, 428 of a computing device functioning as a network element, the wireless transceiver 266, the transceiver 427, and the network measurement module 410.

In block 622, the processor may identify a QoS provided by the first communication network. In some embodiments, the processor may determine the QoS provided by the first communication network. In some embodiments, the processor may select a QoS to be provided by the first communication network. In some embodiments, the processor may identify, select, or set the QoS provided by the first communication network to be substantially constant or substantially invariant. Means for performing the operations of block 622 may include the processor 210, 212, 214, 216, 218, 252, 260, 428 of a computing device functioning as a network element, the wireless transceiver 266, the transceiver 427, and the QoS determination module 410.

In block 624, the processor may determine the QoS provided by the second communication network within the communication path based on the end-to-end achieved QoS and the QoS provided by the first communication network. In some embodiments, by configuring operations of one or more network elements of the first communication network to provide a substantially constant or substantially invariant QoS, the processor may determine the QoS provided by the second communication network within the communication path as a function of the end-to-end achieved QoS and the substantially constant or substantially invariant QoS provided by the first communication network. Means for performing the operations of block 624 may include the processor 210, 212, 214, 216, 218, 252, 260, 428 of a computing device functioning as a network element, the wireless transceiver 266, the transceiver 427, and the QoS determination module 410.

The processor may then configure the first communication network to provide sufficient QoS to support the end-to-end QoS requirement based on the QoS provided by the second communication network in block 506 of the method 500 as described.

Figure 6D:
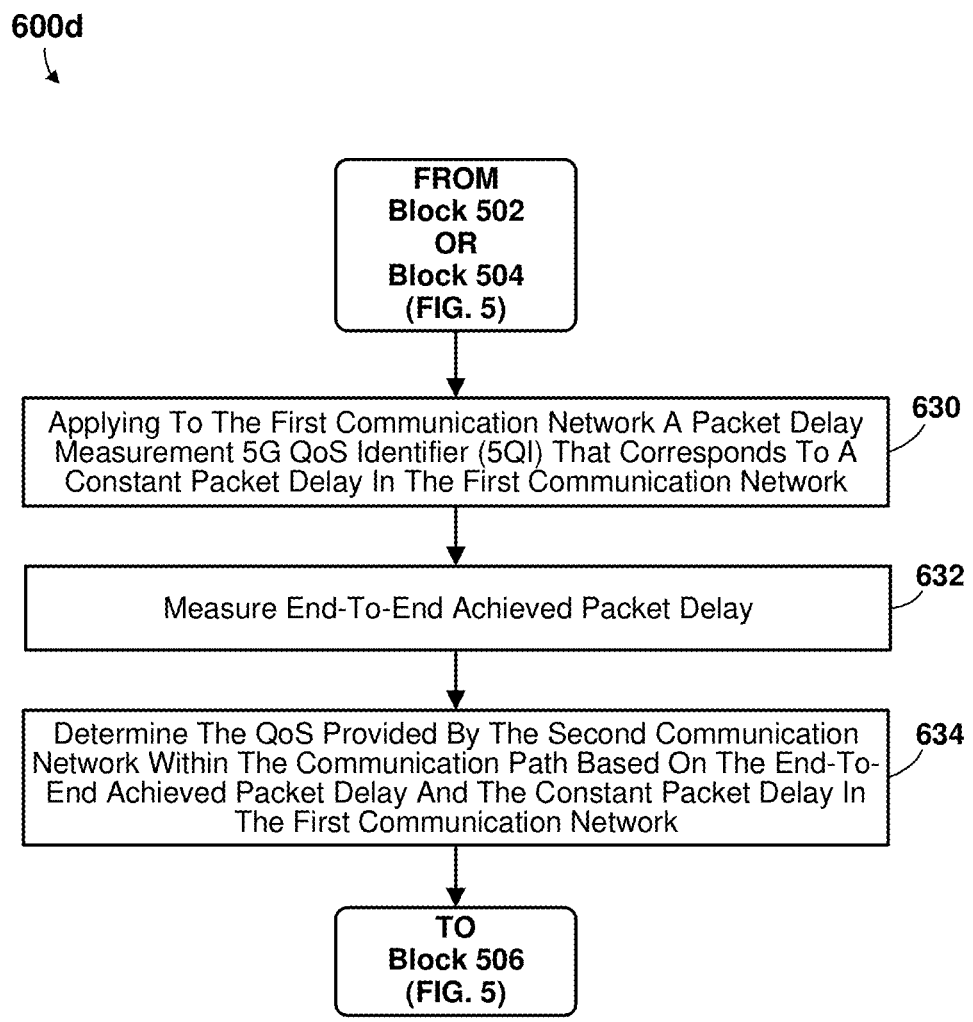

Referring to FIG. 6D, after determining an end-to-end QoS requirement for communicating packets from a packet source to a packet destination via the communication path in block 502 of the method 500 as described, or determining a QoS provided by the second communication network within the communication path in block 504 of the method 500 as described, the processor may apply to the first communication network a packet delay measurement 5G QoS Identifier (5QI) that corresponds to a constant packet delay in the first communication network in block 630. In some embodiments, a packet delay measurement 5QI may be configured and associated with operations that provide a substantially constant or substantially invariant packet delay to packets processed by and/or transported by the first communication network. In some embodiments, in response to the packet delay measurement 5QI, one or more network elements of the first communication network may be configured to provide substantially constant packet delay to packets processed by and/or transported by the network elements of the first communication network. In some embodiments, the one or more network elements of the first communication network may include a base station (which may include a Medium Access Control (MAC) scheduler, a routing function, etc.), one or more intermediate nodes, and a user plane function. Means for performing the operations of block 630 may include the processor 210, 212, 214, 216, 218, 252, 260, 428 of a computing device functioning as a network element, the wireless transceiver 266, the transceiver 427, and the QoS configuration module 414.

In block 632, the processor may measure an end-to-end achieved packet delay. Means for performing the operations of block 632 may include the processor 210, 212, 214, 216, 218, 252, 260, 428 of a computing device functioning as a network element, the wireless transceiver 266, the transceiver 427, and the network measurement module 412.

In block 634, the processor may determine the QoS provided by the second communication network within the communication path based on the end-to-end achieved packet delay and the constant packet delay in the first communication network. In some embodiments, measurement packets may be sent end-to-end along the communication path that spans multiple communication networks (e.g., the first communication network and the second communication network). In some embodiments, the processor may determine a packet delay of the second communication network based on an end-to-end packet delay and the substantially constant packet delay provided by the first communication network. In some embodiments, the packet delay provided by (incurred by, caused by, related to) the second communication network may be represented as $Dn = De2e - Dc$, in which $Dn$ represents the packet delay of the second communication network (which may be a non-5G communication network), $De2e$ represents the end-to-end packet delay, and $Dc$ represents the substantially constant packet delay of the first communication network. Means for performing the operations of block 634 may include the processor 210, 212, 214, 216, 218, 252, 260, 428 of a computing device functioning as a network element, the wireless transceiver 266, the transceiver 427, and the network measurement module 412.

The processor may then configure the first communication network to provide sufficient QoS to support the end-to-end QoS requirement based on the QoS provided by the second communication network in block 506 of the method 500 as described.

Figure 6E:
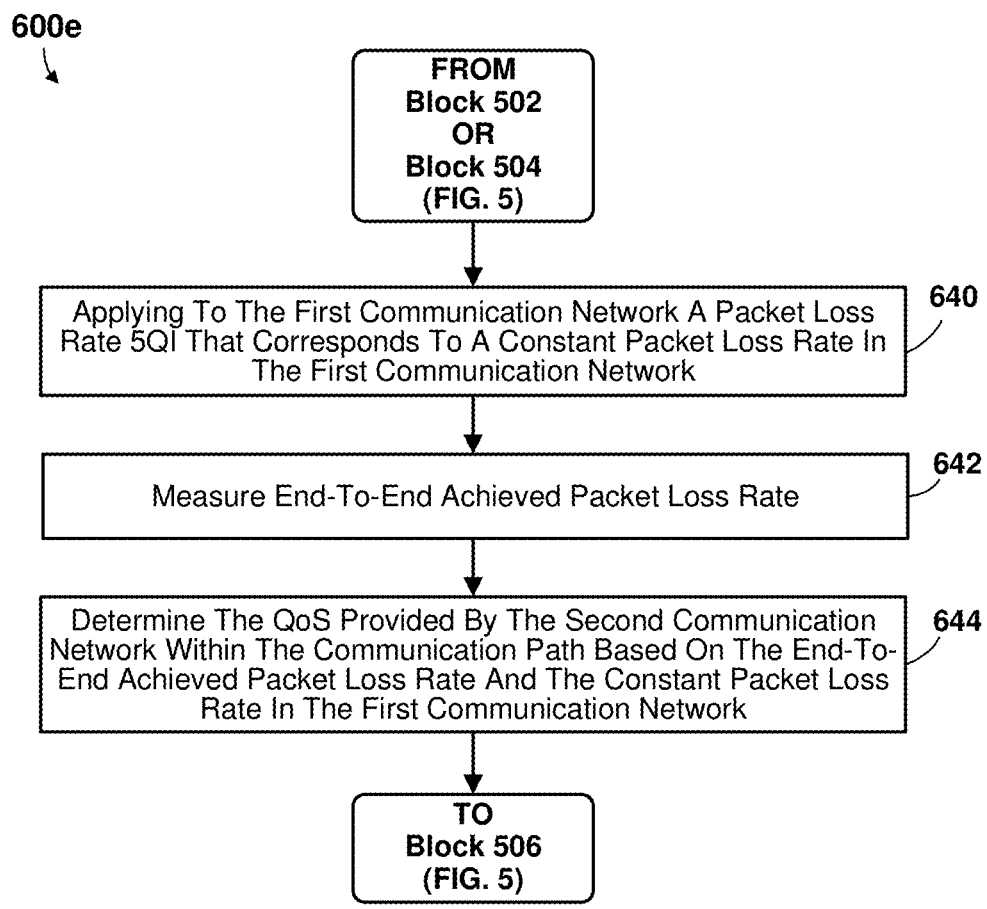

Referring to FIG. 6E, after determining an end-to-end QoS requirement for communicating packets from a packet source to a packet destination via the communication path in block 502 of the method 500 as described, or determining a QoS provided by the second communication network within the communication path in block 504 of the method 500 as described, the processor may apply to the first communication network a packet loss rate 5QI that corresponds to a constant packet loss rate in the first communication network in block 640. In some embodiments, a packet loss rate 5QI may be configured and associated with operations that provide a substantially constant or substantially invariant packet loss rate to packets processed by and/or transported by the first communication network. In some embodiments, in response to the packet loss rate measurement 5QI, one or more network elements of the first communication network may be configured to provide the substantially constant packet loss rate to packets processed by and/or transported by the network elements of the first communication network. Means for performing the operations of block 640 may include the processor 210, 212, 214, 216, 218, 252, 260, 428 of a computing device functioning as a network element, the wireless transceiver 266, the transceiver 427, and the QoS configuration module 414.

In block 642, the processor may measure an end-to-end achieved packet loss rate. Means for performing the operations of block 642 may include the processor 210, 212, 214, 216, 218, 252, 260, 428 of a computing device functioning as a network element, the wireless transceiver 266, the transceiver 427, and the network measurement module 412.

In block 644, the processor may determine the packet loss rate provided by the second communication network within the communication path based on the end-to-end achieved packet loss rate and the constant packet loss rate in the first communication network. In some embodiments, measurement packets may be sent end-to-end along the communication path that spans multiple communication networks. In some embodiments, the processor may determine a packet loss rate of the second communication network based on an end-to-end packet loss rate and the substantially constant packet loss rate incurred by (caused by, related to, provided by) the first communication network. In some embodiments, the packet loss rate provided by the second communication network may be represented as:

$$p_n = \frac{p_{e2e} - p_c}{1 - p_c}$$

in which Pn represents the packet loss rate of the second communication network (which may be a non-5G communication network), Pe2e represents the end-to-end packet loss rate, and Pc represents the substantially constant packet loss rate provided by the first communication network. Means for performing the operations of block 644 may include the processor 210, 212, 214, 216, 218, 252, 260, 428 of a computing device functioning as a network element, the wireless transceiver 266, the transceiver 427, and the network measurement module 412.

The processor may then configure the first communication network to provide sufficient QoS to support the end-to-end QoS requirement based on the QoS provided by the second communication network in block 506 of the method 500 as described.

Figure 6F:
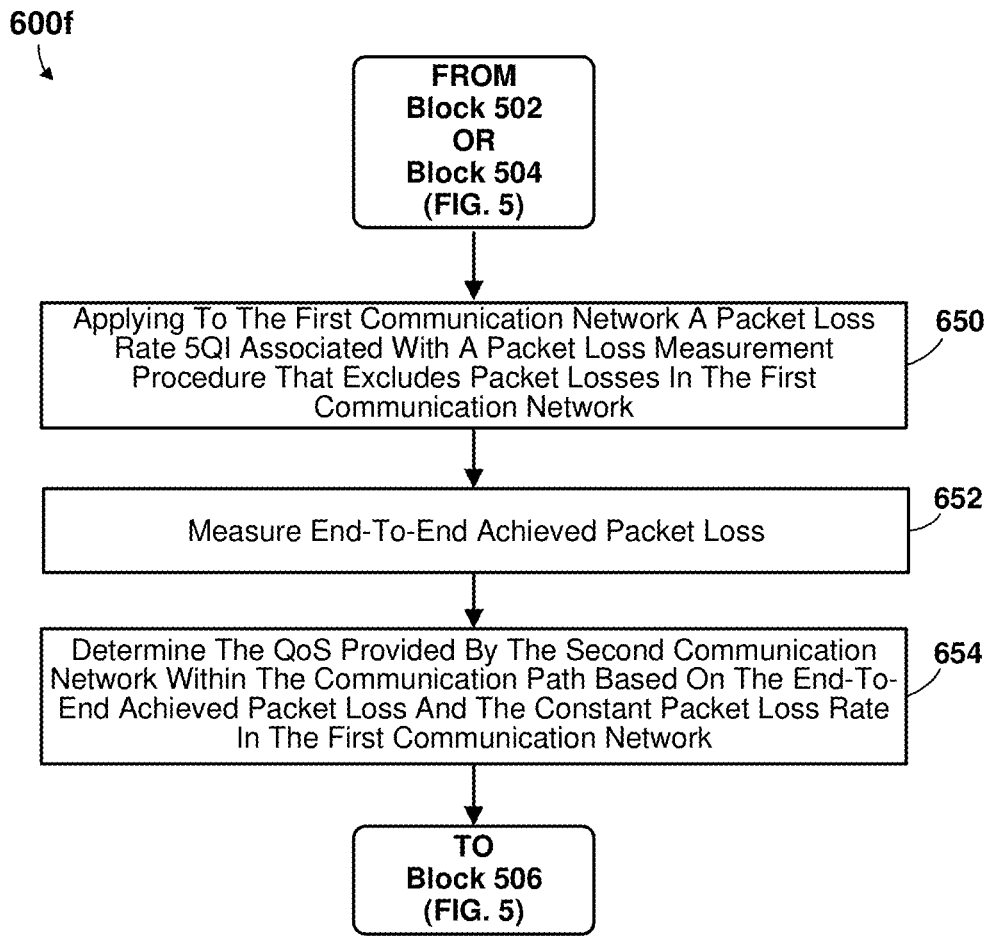

Referring to FIG. 6F, before measuring an end-to-end achieved QoS in block 620 as described, the processor may apply to the first communication network a packet loss rate 5QI associated with a packet loss measurement procedure that excludes packet losses in the first communication network. In some embodiments, a packet loss rate 5QI may be configured and associated with operations that provide a substantially constant or substantially invariant packet loss rate to packets processed by and/or transported by the first communication network. In some embodiments, in response to the packet loss rate measurement 5QI, one or more network elements of the first communication network may be configured to provide the substantially constant packet loss rate to packets processed by and/or transported by the network elements of the first communication network. Means for performing the operations of block 650 may include the processor 210, 212, 214, 216, 218, 252, 260, 428 of a computing device functioning as a network element, the wireless transceiver 266, the transceiver 427, and the QoS configuration module 414.

In block 652, the processor may measure an end-to-end achieved packet loss. Means for performing the operations of block 652 may include the processor 210, 212, 214, 216, 218, 252, 260, 428 of a computing device functioning as a network element, the wireless transceiver 266, the transceiver 427, and the network measurement module 412.

In block 654, the processor may determine the QoS provided by the second communication network within the communication path based on the end-to-end achieved packet loss and the packet loss measurement procedure. In some embodiments, measurement packets may be sent end-to-end along the communication path that spans multiple communication networks. In some embodiments, the processor may measure packet losses at multiple points along the communication path, and may perform one or more operations to exclude packet losses in the first communication network.

For example, referring to FIG. 6J, an application client 690a (e.g., executing on the wireless device) 174 may transmit during a first time period a number of packets N1 addressed to an application server 690e (e.g., 176, 188). An intermediate device, such as a UE 690b (e.g., the UE 172a, 182a) may receive during a second time period a number of packets N2. The second time period may include the same duration as the first time period and may have a first time offset (e.g., the second time period may be later than the first time period by the first time offset). The first time offset may be based on the delay (e.g., that a packet would experience) from the application client 690a to the intermediate device UE 690b. A network element of the 5G core network, such as a UPF 690d (e.g., the UPF 172d or another network element of the 5G core network 172c) may receive during a third time period a number of packets N3. In some embodiments, the number of packets N3 may reflect packet loss at one or more network elements, such as at a gNB 690c. The third time period may include the same duration as the first time period and the second time period and may have a second time offset (e.g., the third time period may be later than the second time period by the second time offset). The application server 690e may receive during a fourth time period a number of packets N4. The fourth time period may include the same duration as the first, second, and third time periods and may have a third time offset (e.g., the fourth time period may be later than the third time period by the third time offset). In this example, the packet loss incurred by (provided by, related to) the second communication network (or in this example, the second communication networks 171b and 171c) may be represented as:

$$p_n = \frac{N1 - N2 + (N3 - N4)}{N1 - (N2 - N3)}$$

in which Pn represents the packet loss rate of the second communication network(s). In this manner, the processor may determine the packet loss rate attributable to the second communication network(s) by a packet loss measurement procedure that excludes packet losses in the first communication network.

In various embodiments, the packet loss rate at greater or fewer points along the communication path (i.e., greater or fewer Ns may be measured) depending on a network's configuration. For example, a packet loss rate between two nearby or close network elements (e.g., a UE co-located with a base station) may not be measured.

As another example, referring to FIG. 6K, a UE 692a (e.g., the UE 152a, 162a, 172a, 182a) may be co-located with an application client. In some embodiments, the application client may be executing on the UE 692a (e.g., the UE 152a, 162a), and the UE 692a may be located proximate to a device executing the application client (e.g., the wireless device 174, 184). In this example, the UE 692a may transmit during a first time period a number of packets N1 addressed to an application server 692d (e.g., 158, 168). An intermediate device, such as a UPF 692c (e.g., the UPF 152d, 162d) may receive a number of packets N2 during a second time period. The second time period may be the same duration as the first time period and may have a first time offset (e.g., the second time period may be later than the first time period by the first time offset). The first time offset may be based on the delay (e.g., that a packet would experience) from the UE 692a to the intermediate device UPF 692c. In some embodiments, the number of packets N2 may reflect packet loss at one or more network elements, such as at a gNB 692b. The application server 692d may receive during a third time period a number of packets N3. The third time period may be the same duration as the first and second time periods and may have a third time offset (e.g., the third time period may be later than the second time period by the second time offset). In this example, the packet loss incurred by (provided by, related to) the second communication network (or in this example, the second communication networks 171b and 171c) may be represented as:

$$p_n = \frac{N2 - N3}{N2}$$

in which Pn represents the packet loss rate of the second communication network(s). In this manner, the processor may determine the packet loss rate attributable to the second communication network(s) by a packet loss measurement procedure that excludes packet losses in the first communication network. Means for performing the operations of block 652 may include the processor 210, 212, 214, 216, 218, 252, 260, 428 of a computing device functioning as a network element, the wireless transceiver 266, the transceiver 427, and the network measurement module 412.

The processor may then configure the first communication network to provide sufficient QoS to support the end-to-end QoS requirement based on the QoS provided by the second communication network in block 506 of the method 500 as described.

Figure 6G:
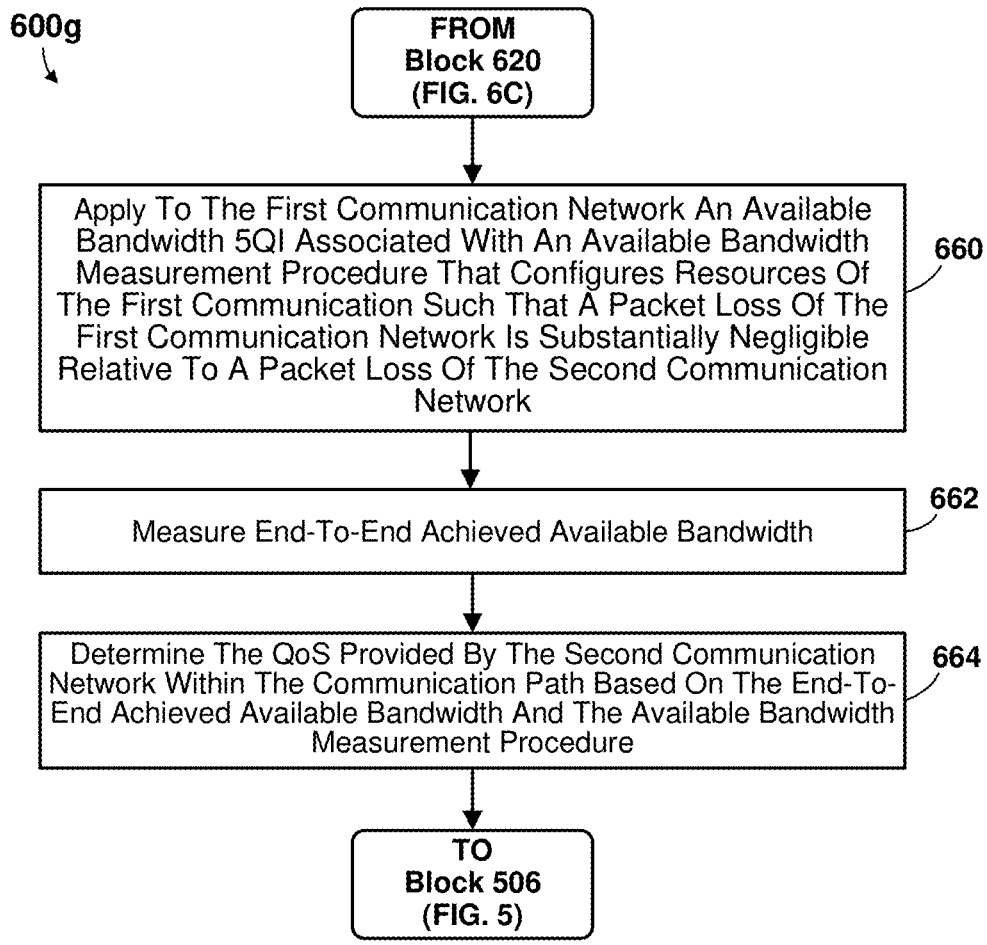

Referring to FIG. 6G, after determining an end-to-end QoS requirement for communicating packets from a packet source to a packet destination via the communication path in block 502 of the method 500 as described, or determining a QoS provided by the second communication network within the communication path in block 504 of the method 500 as described, the processor may apply to the first communication network an available bandwidth 5QI associated with an available bandwidth measurement procedure that configures resources of the first communication network such that a packet loss of the first communication network is substantially negligible relative to a packet loss of the second communication network in block 660.

In some embodiments, an available bandwidth 5QI may be configured and associated with operations that provide a substantially negligible packet loss in the first network relative to packets processed by and/or transported by the second communication network. In some embodiments, in response to the available bandwidth measurement 5QI, one or more network elements of the first communication network may be configured to process and/or transport packets in a manner that provides the substantially negligible packet loss. For example, the processor may "overprovision" transport and/or processing resources of the first communication network such that network element(s) of the first communication network provide no bottleneck to the end-to-end communication path relative to the second communication network. In some embodiments, the network elements of the first communication network may be provisioned in this manner for a relatively short period of time, such as for a duration of one or more a measurement operations. Means for performing the operations of block 660 may include the processor 210, 212, 214, 216, 218, 252, 260, 428 of a computing device functioning as a network element, the wireless transceiver 266, the transceiver 427, and the QoS configuration module 414.

In block 662, the processor may measure an end-to-end achieved available bandwidth. Means for performing the operations of block 662 may include the processor 210, 212, 214, 216, 218, 252, 260, 428 of a computing device functioning as a network element, the wireless transceiver 266, the transceiver 427, and the network measurement module 412.

In block 664, the processor may determine the QoS provided by the second communication network within the communication path based on the end-to-end achieved available bandwidth and the available bandwidth measurement procedure. For example, while the network element(s) of the first communication network are configured to provide the substantially negligible packet loss in the first network, the processor may measure an end-to-end available bandwidth, data rate, and/or bit rate. In such embodiments, the processor may determine the bandwidth, data rate, and/or bit rate of the second network to be substantially the same as the measured bandwidth, data rate, and/or bit rate. In some embodiments, this approach may be particularly useful for determining an available bandwidth for User Datagram Protocol (UDP) traffic flows or Transport Control Protocol (TCP) traffic flows. Means for performing the operations of block 664 may include the processor 210, 212, 214, 216, 218, 252, 260, 428 of a computing device functioning as a network element, the wireless transceiver 266, the transceiver 427, and the network measurement module 412.

The processor may then configure the first communication network to provide sufficient QoS to support the end-to-end QoS requirement based on the QoS provided by the second communication network in block 506 of the method 500 as described.

Figure 6H:
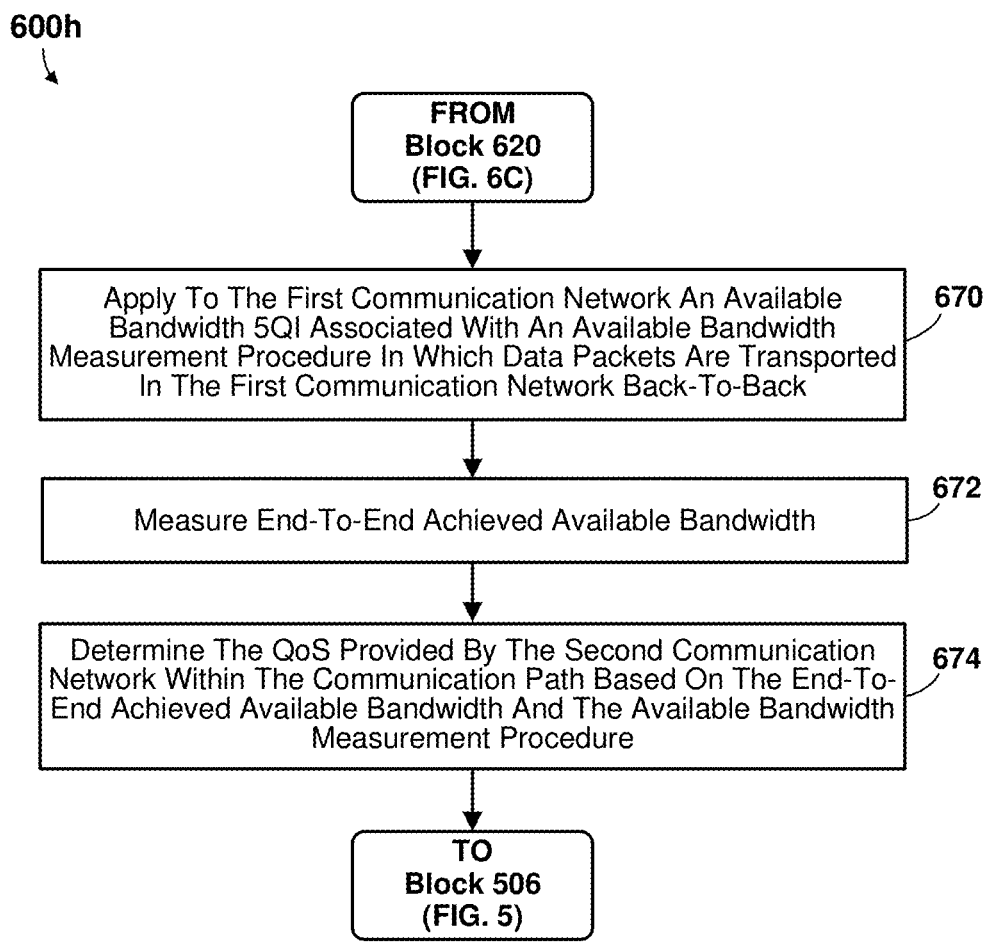

Referring to FIG. 6H, after determining an end-to-end QoS requirement for communicating packets from a packet source to a packet destination via the communication path in block 502 of the method 500 as described, or determining a QoS provided by the second communication network within the communication path in block 504 of the method 500 as described, the processor may apply to the first communication network an available bandwidth 5QI associated with an available bandwidth measurement procedure in which data packets are transported in the first communication network back-to-back in block 670.

In some embodiments, in response to the available bandwidth 5QI, one or more network elements of the first communication network may be configured to process and/or transport packets back-to-back in a manner that introduces substantially negligible packet dispersion between or among transported packets. For example, the available bandwidth 5QI may be associated with a packet dispersion technique such that network elements of the first communication network are configured to transport packets in a manner that does not introduce or increase a time gap between or among transported packets. In some embodiments, network elements of the first communication network may be configured to achieve a substantially negligible time gap between packets using General Packet Radio Service (GPRS) Tunneling Protocol in the user plane (GTP-U) to encapsulate packets (e.g., measurement packets) and transport them via a GTP-U packet in the GTP-U tunnel in the first communication network. In some embodiments, the transported packets may arrive back-to-back at a UPF (e.g., 152*d*, 162, 172*d*, 182*d*) for routing to the second communication network. Means for performing the operations of block 670 may include the processor 210, 212, 214, 216, 218, 252, 260, 428 of a computing device functioning as a network element, the wireless transceiver 266, the transceiver 427, and the QoS configuration module 414.

In block 672, the processor may measure an end-to-end achieved available bandwidth. Means for performing the operations of block 672 may include the processor 210, 212, 214, 216, 218, 252, 260, 428 of a computing device functioning as a network element, the wireless transceiver 266, the transceiver 427, and the network measurement module 412.

In block 674, the processor may determine the QoS provided by the second communication network within the communication path based on the end-to-end achieved available bandwidth and the available bandwidth measurement procedure. In some embodiments, while the network element(s) of the first communication network are configured to transport packets back-to-back in a manner that introduces substantially negligible packet dispersion between or among transported packets, the processor may measure a time gap between packets arriving at an endpoint device (e.g., 158, 168, 176, 188). In such embodiments, the processor may determine the time gap between packets arriving at the endpoint device (e.g., in the second communication network) to be indicative of the bandwidth provided by the second communication network.

For example, referring to FIG. 6L, a 5G network may include a UE 694*a*, a gNB 694*b*, and a UPF 694*c*. The UE 694*a* (which may include or be proximate to an application client) may send two packets [1] and [2] (e.g., measurement packets) to the gNB 694*b* (e.g., 152*b*, 162*b*, 172*b*, 182*b*). The gNB 694*b* may encapsulate the packets [1] and [2] in a GTP-U packet, and may send the GTP-U packet to the UPF 694*c* via a GTP-U tunnel (which may be identified by a Tunnel Endpoint Identifier (TEID). The packets [1] and [2] may arrive back-to-back at the UPF 694*c*, and the UPF 694*c* may send the packets [1] and [2] to an application server 694*d* in a non-5G network. A time gap between the packets [1] and [2] may be measured at the application server 694*d*. The time gap measured by this packet dispersion technique may reflect an available bandwidth of the non-5G network.

In such embodiments, the network element may determine the available bandwidth measured via the packet dispersion technique to be the available bandwidth the second communication network. In some embodiments, in a case where the communication path spans two or more second communication networks (e.g., as in the communication systems 170 and 180), the network element may perform measurements using, e.g., a packet dispersion technique, for each second communication network, and the network element may determine the minimum of the available bandwidths to be the available bandwidth of all of the second communications. Means for performing the operations of block 674 may include the processor 210, 212, 214, 216, 218, 252, 260, 428 of a computing device functioning as a network element, the wireless transceiver 266, the transceiver 427, and the network measurement module 412.

The processor may then configure the first communication network to provide sufficient QoS to support the end-to-end QoS requirement based on the QoS provided by the second communication network in block 506 of the method 500 as described.

Figure 6I:
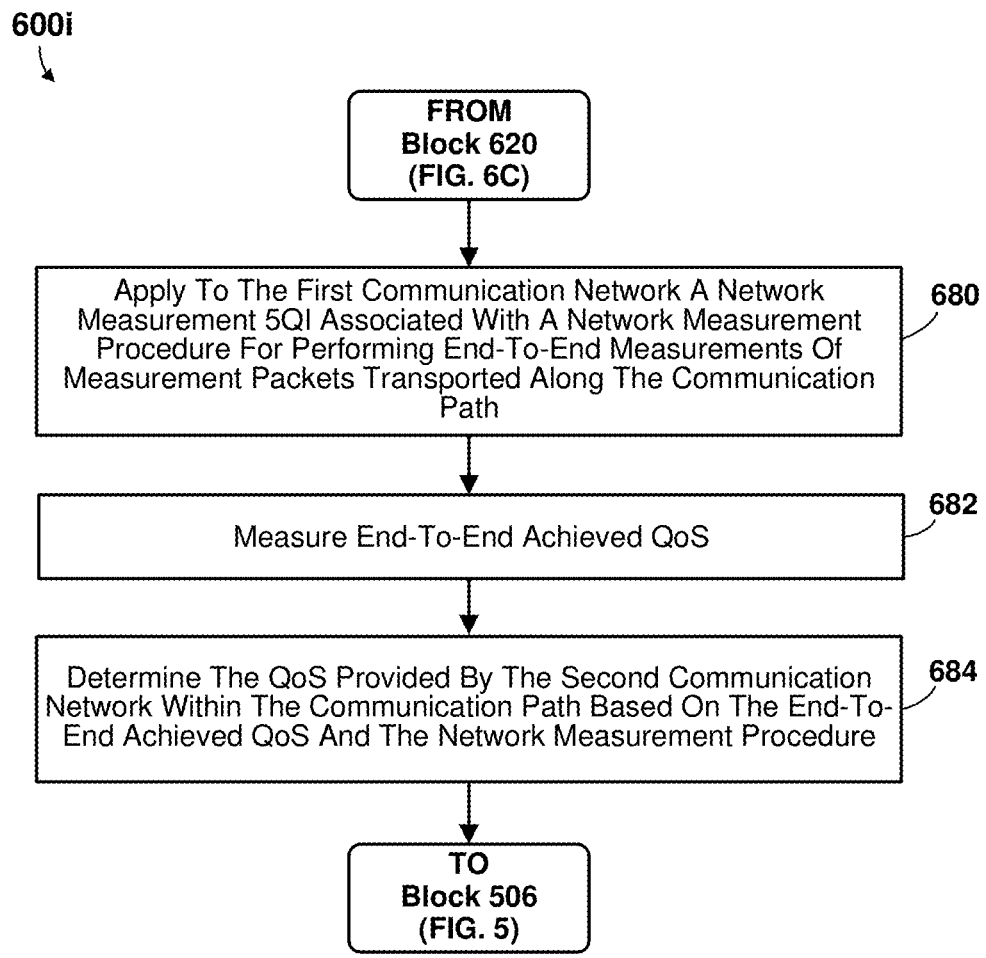
Figure 6J:
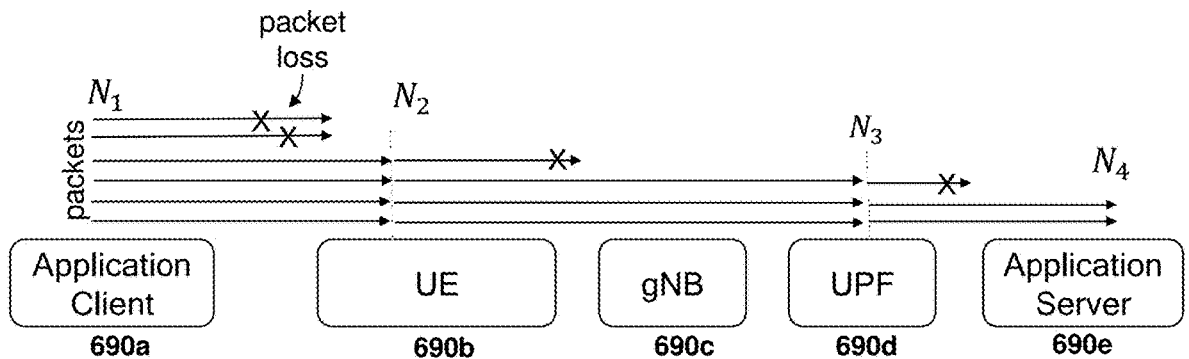
FIGS. 6J and 6K are conceptual diagrams illustrating example packet loss measurements.
Figure 6K:
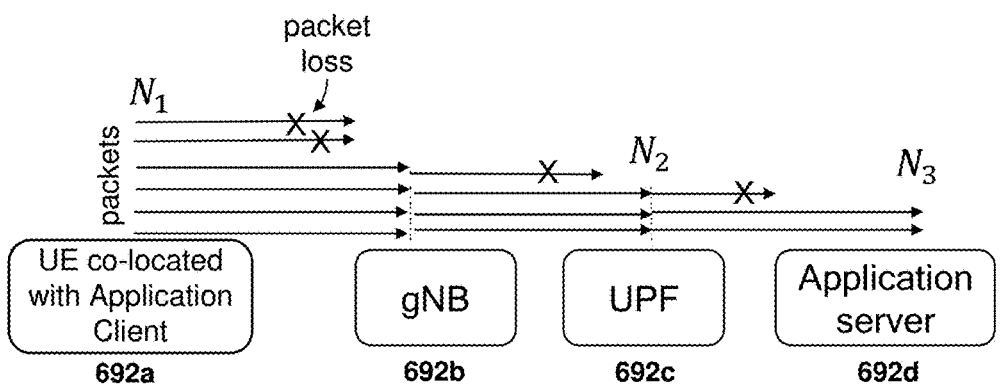
Figure 6L:
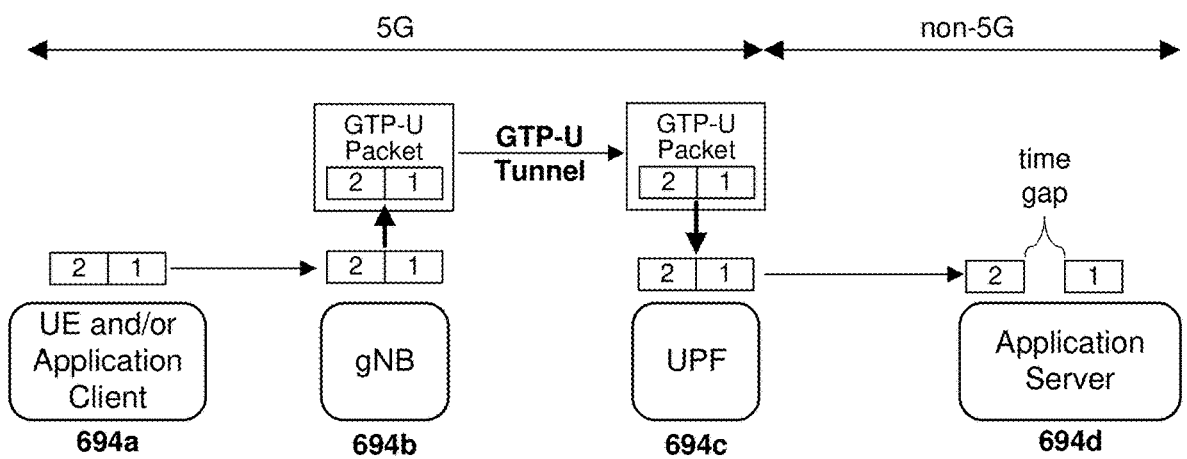
FIG. 6L is a conceptual diagram illustrating an example available bandwidth measurement.

Referring to FIG. 6I, after determining an end-to-end QoS requirement for communicating packets from a packet source to a packet destination via the communication path in block 502 of the method 500 as described, or determining a QoS provided by the second communication network within the communication path in block 504 of the method 500 as described, the processor may apply to the first communication network a network measurement 5QI associated with a network measurement procedure for performing end-to-end measurements of measurement packets transported along the communication path in block 680. In some embodiments, a network measurement 5QI may be configured and associated with operations that measure dedicated measurement packets (i.e., packets sent for measurement purposes that do not convey other signaling or data). In some embodiments, in response to the packet delay measurement 5QI, one or more network elements of the first communication network may be configured to transport the network measurement packets in a QoS flow exclusively for network measurement purposes. Means for performing the operations of block 680 may include the processor 210, 212, 214, 216, 218, 252, 260, 428 of a computing device functioning as a network element, the wireless transceiver 266, the transceiver 427, and the QoS configuration module 414.

In block 682, the processor may measure an end-to-end achieved QoS. Means for performing the operations of block 682 may include the processor 210, 212, 214, 216, 218, 252, 260, 428 of a computing device functioning as a network element, the wireless transceiver 266, the transceiver 427, and the network measurement module 412.

In block 684, the processor may determine the QoS provided by the second communication network within the communication path based on the end-to-end achieved QoS and the network measurement procedure. In some embodiments the network elements may function as a measurement entity to perform end-to-end measurements of the measurement packets, to determine the QoS provided by the second communication network. Means for performing the operations of block 684 may include the processor 210, 212, 214, 216, 218, 252, 260, 428 of a computing device functioning as a network element, the wireless transceiver 266, the transceiver 427, and the network measurement module 412.

The processor may then configure the first communication network to provide sufficient QoS to support the end-to-end QoS requirement based on the QoS provided by the second communication network in block 506 of the method 500 as described.

In various embodiments, a measurement entity may be configured to measure packet delay or message delay incurred by or caused by one or more non-5G networks (a "non-5G delay"). In various embodiments, the measurement entity may be configured to coordinate measurement procedures executed on the various entities involved. In various embodiments, the measurement entity may be executed by a processor in a UE, the processor in a network element in the 5G network, a processor executing and application client, or a processor executing in an application server.

In some embodiments, the measurement entity may be configured to determine a message delay or packet delay based on measurement messages that include timestamps sent between two endpoint devices (e.g., a packet source and a packet destination) along a multi-network communication path. In some embodiments, the measurement messages may include a timestamp request in a time stamp reply. In some embodiments, the measurement messages may include Real Time Protocol (RTP) or Real Time Control Protocol (RTCP) messages. In some embodiments, the endpoint devices may include smart glasses and an application server that communicate via the communication path. In some embodiments, the endpoint devices may include two UEs communicating via the communication path.

Figure 7A:
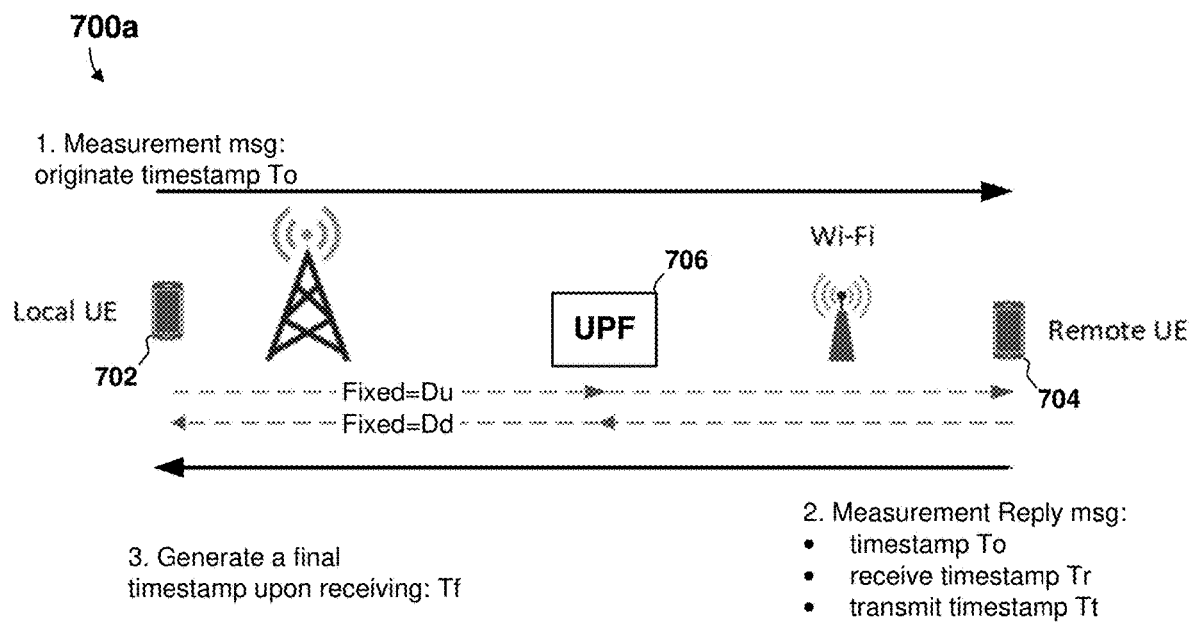
FIGS. 7A-7I illustrates aspects of methods for managing a delay of network segments in an end-to-end communication path according to various embodiments.

FIG. 7A illustrates aspects of a method 700a for managing a delay of network segments in an end-to-end communication path according to some embodiments. With reference to FIGS. 1-7A, the operations of the method 700a may be performed by a processor (such as the processor 210, 212, 214, 216, 218, 252, 260, 428) of a computing device configured to function as a network element (e.g., 402) of the core network 140 or the 5G networks 151a, 161a, 171a, and 181a, a base station device (such as the base station 110a-110d, 200, 350, or a wireless device (e.g., 110a-110d, 200, 320).

In some embodiments, the measurement entity may determine the non-5G delay by determining an end-to-end packet or message delay and subtracting a 5G network packet or message delay. In some embodiments, the measurement entity may send one or more instructions to 5G network elements to maintain a constant delay for an uplink path, for a downlink path, or for both the uplink path and the downlink path. In some embodiments, the measurement entity may be executed in a UE, and the measurement entity in the UE may calculate the non-5G delay (one-way or round-trip) based on timestamps in measurement messages and report the determined non-5G delay to the 5G network. In some embodiments, elements of the 5G network may forward the measurement packets without performing operations to modify the measurement packets.

For example, a first UE (local UE) 702 may generate an originate timestamp "To" indicating an origination or transmit time, and configure a timestamp message to include the originate timestamp "To." In some embodiments, the timestamp message may include an Internet Control Message Protocol (ICMP) timestamp message or an RTP or Secure (SRTP) packet with a marker bit set. The first UE 702 may transmit the timestamp message to a second UE (remote UE) 704. Upon receiving the timestamp message from the first UE 702, the second UE 704 may generate a receive timestamp "Tr" indicating a time at which the second UE 702 received the timestamp message from the first UE 702. The second UE 704 also may generate a transmit timestamp "Tt" indicating a time at which the second UE 704 transmits a timestamp reply message (e.g., an ICMP timestamp reply message, RTCP packet, or an RTP/SRTP packet with the marker bit set). In some embodiments, the timestamp reply message may be configured to include the originate timestamp "To," the receive timestamp "Tr," and the transmit timestamp "Tt." In some embodiments, the timestamp reply message may be configured to include an indication of the end-to-end one-way delay (Tr–To) and the transmit timestamp "Tt." Upon receiving the timestamp reply message, the first UE 702 may generate a final timestamp "Tf."

One or more elements of the radio access network (RAN), such as a UPF 706 may provide, support, or instruct network elements to provide or support a fixed delay in an uplink path ("Du") and/or a fixed delay in a downlink path ("Dd"). In some embodiments, as further described below, one or more elements of the RAN may enable a UE (e.g., the first UE 702) to determine the uplink path delay and/or the downlink path delay.

In some embodiments, the measurement entity may determine a one-way delay from the UPF 706 to the second UE 704 as Tr–To–Du. In some embodiments, the management entity may determine a one-way delay from the second UE 704 to the UPF 706 as Tf–Tt–Dd. The management entity may determine a round-trip delay as a sum of the two one-way delays (e.g., (Tr–To–Du)+(Tf–Tt–Dd)). In this example, intermediate network elements do not perform operations to manipulate any timestamp messages in transit, which may require network elements to perform operations such as deep packet inspection (DPI). This may conserve processing and network communication resources. In some embodiments, the measurement entity may transmit indications of the one-way delay(s) and/or round-trip delay to the 5G network (e.g., the UPF 706).

Figure 7B:
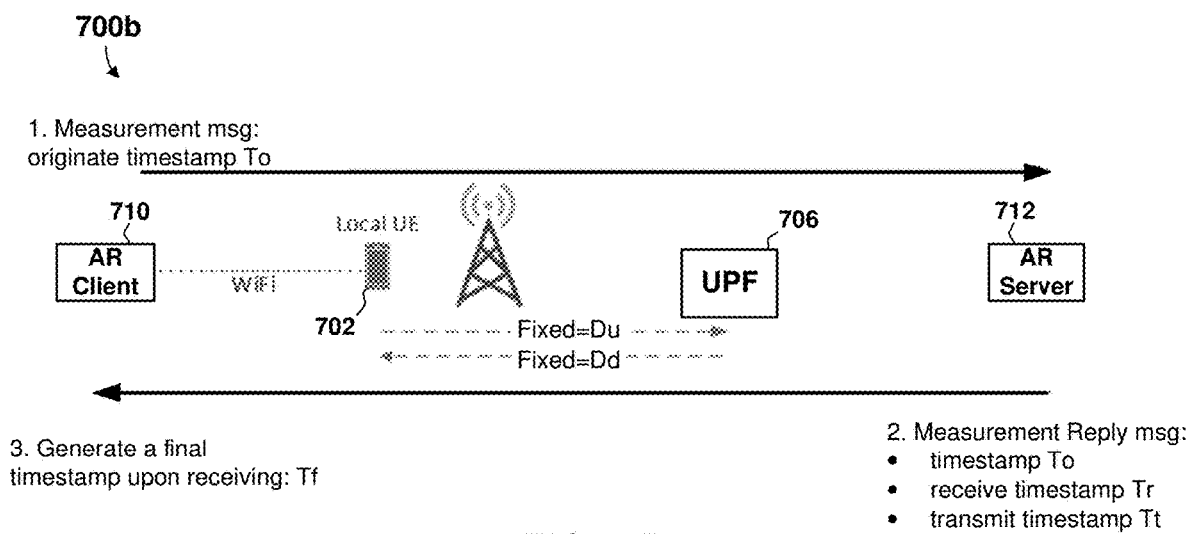

FIG. 7B illustrates aspects of a method 700b for managing a delay of network segments in an end-to-end communication path according to some embodiments. With reference to FIGS. 1-7B, the operations of the method 700b may be performed by a processor (such as the processor 210, 212, 214, 216, 218, 252, 260, 428) of a computing device configured to function as a network element (e.g., 402) of the core network 140 or the 5G networks 151a, 161a, 171a, and 181a, a base station device (such as the base station 110a-110d, 200, 350, or a wireless device (e.g., 110a-110d, 200, 320). In some embodiments, the measurement entity may be executed by a device in communication with the first UE 702, such as an augmented reality (AR) client 710 (e.g., an AR client that may execute on a processor of smart glasses 174, 184).

In the embodiments illustrated in FIG. 7B, the AR client 710 may generate the timestamp message including the originate timestamp To, and may transmit the timestamp message to an AR server 712. Examples of the AR server 712 include an application server or an Edge application server (i.e., an application server that is part of an Edge network). Upon receiving the timestamp message from the AR client 710, the AR server 712 may generate a receive timestamp "Tr" indicating a time at which the AR server 712 received the timestamp message from the AR client 710. The AR server 712 also may generate a transmit timestamp "Tt" indicating a time at which the AR server 712 transmits a timestamp reply message (e.g., an ICMP timestamp reply message, RTCP packet, or an RTP/SRTP packet with the marker bit set). In some embodiments, the timestamp reply message may be configured to include the originate timestamp "To," the receive timestamp "Tr," and/or the transmit timestamp "Tt." It some embodiments, the timestamp reply message may be configured to include an indication of end-to-end one-way delay (Tr–To) and the transmit timestamp "Tt." Upon receiving the timestamp reply message, the AR client 710 may generate a final timestamp Tf.

Similar to the method 700a, the measurement entity executing in the AR client 710 may determine a one-way delay from the UPF 706 to the AR client 712 as Tr–To–Du; a one-way delay from the second UE 704 to the UPF 706 as Tf–Tt–Dd; and/or a round-trip delay as a sum of the two one-way delays (e.g., (Tr–To–Du)+(Tf–Tt–Dd)). In some embodiments, the measurement entity may transmit indications of the one-way delay(s) and/or round-trip delay to the 5G network (e.g., the UPF 706).

Figure 7C:
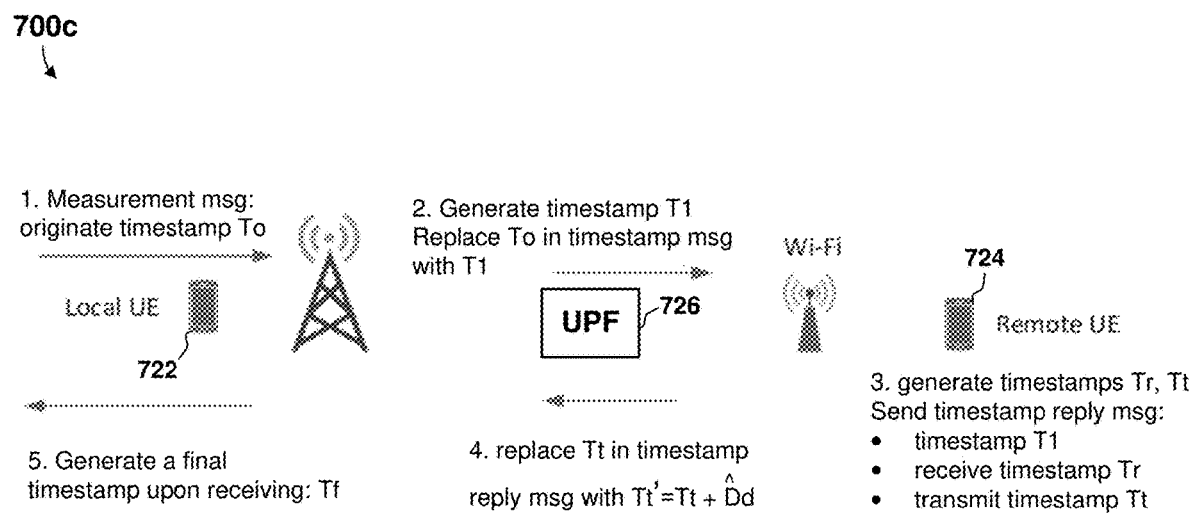

FIG. 7C illustrates aspects of a method 700c for managing a delay of network segments in an end-to-end communication path according to various embodiments. With reference to FIGS. 1-7C, the operations of the method 700c may be performed by a processor (such as the processor 210, 212, 214, 216, 218, 252, 260, 428) of a computing device configured to function as a network element (e.g., 402) of the core network 140 or the 5G networks 151a, 161a, 171a, and 181a, a base station device (such as the base station 110a-110d, 200, 350, or a wireless device (e.g., 110a-110d, 200, 320). In some embodiments, time delay values may be determined based on timestamps conveyed in measurement messages. It some embodiments, element(s) of the 5G network may perform operations to modify measurement messages that are being conveyed across the 5G network. It some embodiments, element(s) of the 5G network may perform operations to modify measurement messages to account for, or to provide information about, delay(s) caused by or incurred by transport of the messages across the 5G network.

In the method 700c, elements of the 5G network do not maintain constant delays in the uplink path or the downlink path. Further, the measurement entity (e.g., executing in a first UE 722) may determine non-5G network delays using end-to-end timestamp messages.

In some embodiments, the first UE 722 may transmit a measurement message (e.g., an ICMP timestamp message) that includes an originate timestamp "To" to a second UE 724. As the timestamp message is being transported across the 5G network, a UPF 726 may receive the timestamp message. Upon receiving the measurement message including the timestamp "To," the UPF 726 may generate a timestamp "T1" that may be used to determine delay caused by the 5G network, and the UPF 726 may replace the timestamp "To" with the timestamp "T1" in the measurement message.

Upon receiving the measurement message, the second UE 724 may generate a timestamp reply message (e.g., an ICMP timestamp message). The timestamp reply message may include the timestamp "T1," a receive timestamp "Tr" indicating a time at which the second UE 724 received the measurement message, and a transmit timestamp "Tt" indicating a time at which the second UE 724 sends the timestamp reply message. As the timestamp reply message is being transported across a 5G network, the UPF 726 may receive the timestamp reply message. Upon receiving the timestamp reply message, the UPF 726 may replace the transmit timestamp "Tt" with a timestamp "Tt'" that may be used to determine delay caused by the 5G network.

In some embodiments, the UPF 726 may determine the timestamp "Tt'" as Tt'=Tt+D̂d, in which "D̂d" represents an estimation of downlink delay in the 5G network. In some embodiments, the UPF 726 may determine "D̂d" as D̂d=T1−To, assuming symmetric (substantially similar) delays in the uplink path and the downlink path. Upon receiving the timestamp reply message, the first UE 724 may generate a final timestamp "Tf." The measurement entity (e.g., executing in a processor of the first UE 722) may determine a one-way delay from the UPF 726 to the second UE 724 as Tr−T1. The measurement entity may determine a one-way delay from the second UE 724 to the UPF 726 as Tf−Tt'. In some embodiments, the measurement entity may transmit indications of the one-way delay(s) to the 5G network (e.g., the UPF 726).

In some embodiments, the first UE 722, the second UE 724, and the UPF 726 may perform similar operations as described above using RTP/SRTP/RTCP packets. In such embodiments, the first UE 722 may generate the originate timestamp "To" and may configure and RTP or SRTP packet with a marker bit set to include the originate timestamp "To." The first UE 722 may transmit the RTP or SRTP packet including the originate timestamp "To" to the second UE 724. Upon receiving the RTP or SRTP packet, the UPF 726 may generate the timestamp "T1," and may replace the originate timestamp "To" with the timestamp "T1." Upon receiving the RTP or SRTP packet, the second UE 724 may generate timestamps "Tr" and "Tt," and may configure an RTCP packet to include an indication of one-way delay based on Tr−T1, "Tr," and "Tt." The second UE 724 may send the RTCP packet to the first UE 722. The UPF 726 may receive the RTCP packet while it is being transported across a 5G network. The UPF 726 may replace the timestamp "Tt" with the timestamp "Tt'" (representing Tt'=Tt+D̂d, where D̂d=T1−To, as described above). The UPF 726 may send the RTCP packet to the first UE 722. Upon receiving the RTCP packet, the first UE 722 may generate the final timestamp "Tf." The measurement entity executing in the processor of the first UE 722 may determine the one-way delay from the UPF 726 to the second UE 724 as Tr−T1. The measurement entity may determine the one-way delay from the second UE 724 to the UPF 726 as Tf−Tt'. In some embodiments, the measurement entity may transmit indications of the one-way delay(s) to the 5G network (e.g., the UPF 726).

Figure 7D:
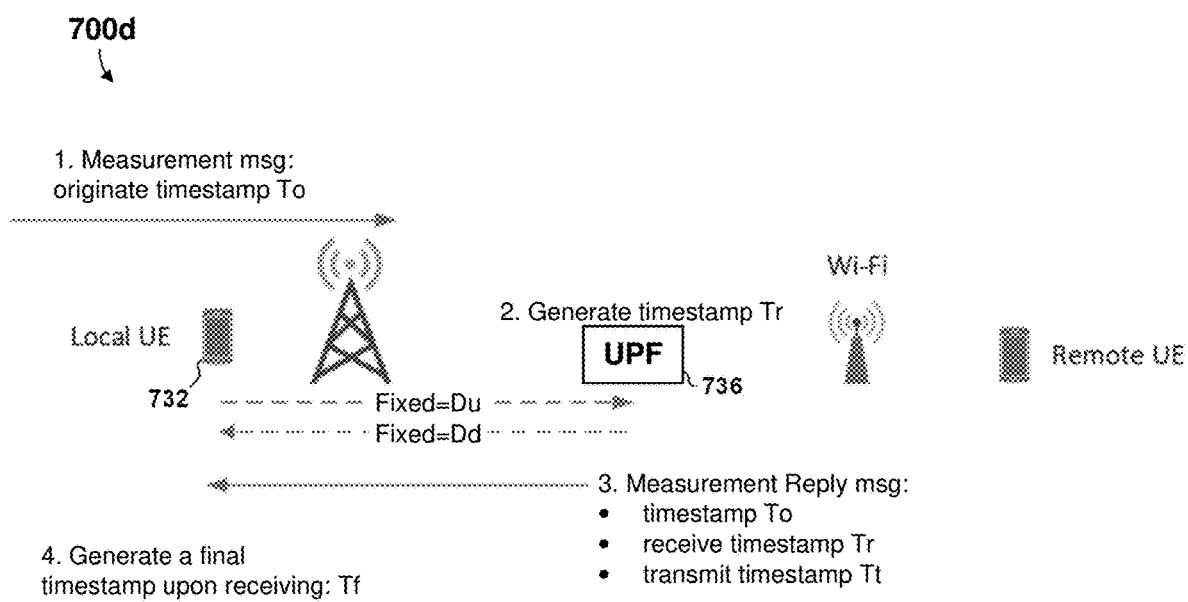

FIG. 7D illustrates aspects of a method 700d for managing a delay of network segments in an end-to-end communication path according to various embodiments. With reference to FIGS. 1-7D, the operations of the method 700d may be performed by a processor (such as the processor 210, 212, 214, 216, 218, 252, 260, 428) of a computing device configured to function as a network element (e.g., 402) of the core network 140 or the 5G networks 151a, 161a, 171a, and 181a, a base station device (such as the base station 110a-110d, 200, 350, or a wireless device (e.g., 110a-110d, 200, 320).

In some embodiments, a UE 732 and a UPF 736 may be configured to use probe message(s) to measure a delay within the 5G network. In some embodiments, the UE 732 and the UPF 736 may be configured to use probe message(s) to measure a 5G network delay.

In some embodiments, the UPF 736 may be configured to function as a PDU Session Anchor (PSA). The PSA UPF 736 may perform operations to support mobility for UEs (e.g., 732) within and/or between RATs. The PSA UPF 736 may serve as a convenient network element for use by the first UE 732 in attempting to measure 5G network delays. However, the UE 732 may not know a network address (e.g., IP address) of the PSA UPF 736.

In some embodiments, the UE 732 may transmit a measurement message to the PSA UPF 736. The PSA UPF 736 may identify the measurement message as a measurement message by at least one of the message being conveyed by a special radio bearer, the measurement message being associated with a logical channel ID, and a quality of service (QoS) flow ID in an SDAP packet header of the measurement message. The PSA UPF 736 also may identify the measurement message when the measurement message is associated with a port number in a UDP packet, if the measurement message is carried in a UDP packet. The PSA UPF 736 also may identify the measurement message if the measurement message includes at least one of a specified value of a differentiated services code point (DSCP), a protocol number, or a value in the Options field in an IP packet header of the measurement message.

Upon receiving the measurement message, the PSA UPF 736 may generate a measurement reply message. In some embodiments, the measurement reply message may include a timestamp "Tr" indicating the time at which the PSA UPF 736 received the measurement message and/or a timestamp "Tt" indicating a time at which the PSA UPF 736 transmits the measurement reply message. In some embodiments, the measurement reply message may not include any timestamp. In some embodiments, the PSA UPF 736 and/or other 5G network elements may provide (or assume) a fixed delay time in an uplink path (Du) and/or in a downlink path (Dd).

The UE 732 may receive the measurement reply message and may generate a final timestamp "Tf" indicating a time at which the UE 732 receives the measurement reply message. In some embodiments, a measurement entity (e.g., executing in the UE 732) may determine a one-way delay from the PSA UPF 736 to the second UE 732 as Tf–Tt. In some embodiments, the management entity may determine a one-way delay from the second UE 732 to the PSA UPF 736 as Tr–To. The management entity may determine a round-trip delay as a sum of the two one-way delays (e.g., (Tf–Tt+Tr–To)/2). In some embodiments, the measurement entity may transmit indications of the one-way delay(s) and/or round-trip delay to the 5G network (e.g., the PSA UPF 736).

In various embodiments, the measurement entity may transmit indication(s) of one or more determined delays to a network element of the 5G network. It some embodiments, if the measurement entity is executing in an endpoint device in communication with a 5G network (e.g., the UE 702, 722, 732), the measurement entity (e.g., a Media Session Handler, a Media Access Function) may transmit a report of a measurement, such as a round-trip time (RTT), a one-way delay in the uplink path and/or downlink path, a packet loss rate, a network bandwidth or data rate, and/or another suitable measurement to a 5G core network element, such as an Application Function (AF) or a Policy Charging Function (PCF). It some embodiments, the measurement entity may transmit the report to a nearest 5G network element that forwards report to an element of the 5G core network. For example, a tethered device, such as the wireless device 174, 184, may transmit the report to the nearest 5G device, which may be a UE (e.g., UE 172a, 182a), and the UE may forward the received report to a 5G core network element. In some embodiments, the reported measurement(s) may include end-to-end measurements or measurements of the non-5G network(s). In some embodiments, the measurement entity may be implemented in hardware, software, an application executing on a device (e.g., a UE), a hardware component of a device, and/or any combination thereof.

Figure 7E:
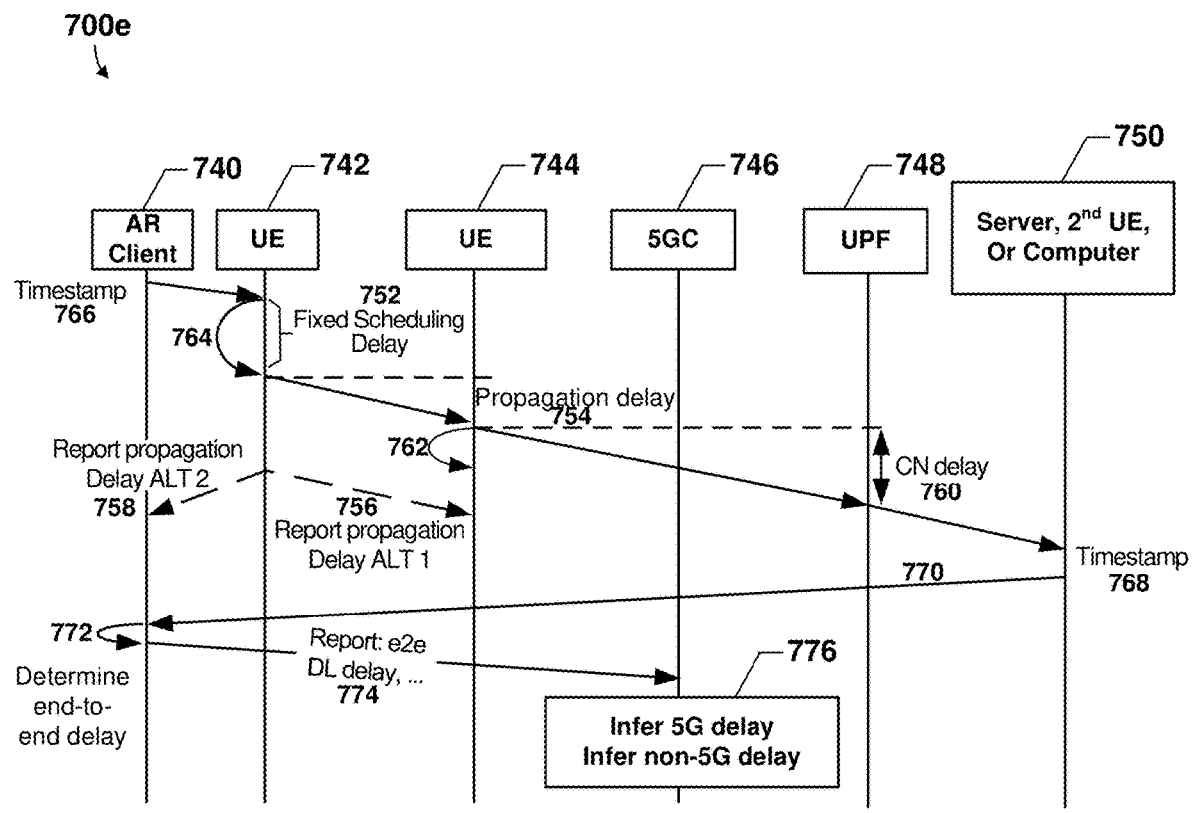

FIG. 7E illustrates aspects of a method 700e for managing a delay of network segments in an end-to-end communication path according to various embodiments. With reference to FIGS. 1-7E, the operations of the method 700e may be performed by a processor (such as the processor 210, 212, 214, 216, 218, 252, 260, 428) of a computing device configured to function as a network element (e.g., 402) of the core network 140 or the 5G networks 151a, 161a, 171a, and 181a, a base station device (such as the base station 110a-110d, 200, 350, or a wireless device (e.g., 110a-110d, 200, 320).

In some embodiments, in order to perform accurate delay measurements, network elements of the 5G network may perform operations to provide a fixed 5G network delay in an uplink path and/or downlink path. As an example, as noted above, after determining an end-to-end QoS requirement for communicating packets from a packet source to a packet destination via the communication path in block 502 of the method 500 as described, or determining a QoS provided by the second communication network within the communication path in block 504 of the method 500 as described, the processor may apply to the first communication network a packet delay measurement 5G QoS Identifier (5QI) that corresponds to a constant packet delay in the first communication network in block 630. In some embodiments, a packet delay measurement 5QI may be configured and associated with operations that provide a substantially constant or substantially invariant packet delay to packets processed by and/or transported by the first communication network.

In some embodiments, providing a fixed 5G network delay may require coordination among the UE, one or more elements of a gNB, and one or more elements of the 5G core network. In operation, such coordination among various network elements may be difficult to achieve. One major variable is a scheduling delay that may occur at an air interface, such as between a UE and a gNB. As a possible alternative, network elements may be configured to provide a deterministic (fixed) scheduling delay of the air interface. In some embodiments, if the scheduling delay at the air interface is deterministic, a total delay in the 5G network also may be deterministic. The method 700e involves using a deterministic scheduling delay in an uplink path.

In some embodiments, a UE 742 and a gNB 744 may provide a fixed scheduling delay 752 for a packet sent from an AR client 740. In some embodiments, the fixed scheduling delay 742 may be determined as a time difference between the time of packet arrival at gNB 744 and the time of packet departure from the UE 742. In some embodiments, the UE 742 may prioritize a logical channel corresponding to the packet originating from the AR client 740 over other logical channels. The UE 742 may transmit the packet in a slot or a mini-slot nearest an end of the fixed scheduling delay. In some embodiments, the UE may transmit the packet using a proactive grant or using pre-scheduling (e.g., contiguous in time), or based on preemption of an existing grant for other traffic. In some embodiments, the packet originating from the AR client 740 may be a packet of an application traffic flow, or it may be a probe packet (e.g., a timestamp message).

The UE 742 may report a propagation delay 754 of the packet from the air interface to the gNB 744. The gNB 744 may report the propagation delay 754 to an entity in 5G core network (5GC) 746. In some embodiments (ALT1), the UE 742 may report 756 the propagation delay 754 to the gNB 744. The propagation delay may be determined as half of a cumulative timing advance (TA) that the UE 742 may apply to an uplink transmission.

In some embodiments (ALT2), the UE 742 may report 758 the propagation delay 754 to the AR client 740, and the AR client 740 may later transmit the reported propagation delay along with an end-to-end delay to the 5GC 746.

In some embodiments, the 5GC 746 may determine a 5G core network delay (CN delay) 760 caused by transporting the packet across the 5G core network. In some embodiments, network elements of the 5GC 746 may perform operations to ensure that the CN delay 760 does not exceed a packet delay budget (PDB) of the 5G core network 746. In some embodiments, the CN delay 760 may include queuing delays (which may be relatively small), transmission delays from 5G routers to UPF 748, and propagation delays between routers of the 5G network.

The gNB 744 may determine a processing delay 762 of the packet at the gNB (e.g., for decoding the packet). In some embodiments, the gNB 744 may report the processing delay 762 to an entity of the 5GC 746. In some embodiments, the gNB 744 may apply a processing delay budget and may store the packet (i.e., may not transmit the packet to the 5GC 746) if gNB 744 processing completes earlier than the processing delay budget.

The UE 742 may determine a processing delay 764 of the packet at the UE 742 (e.g., for encoding the packet). In some embodiments, the UE 742 may report the processing delay 764 to a network entity in the 5GC 746. It some embodiments, the UE 742 may apply the processing delay budget and release the packet for transmission to the gNB 744 when the packet delay budget is met, or when the packet delay budget is effectively zero and absorbed into the fixed scheduling delay.

In some embodiments, the AR client 740 may generate a timestamp 766 at a time that the AR client 740 transmits the packet to the UE 742. An endpoint device 750 that ultimately receives the packet (e.g., a server, a second UE, or other computing device), may generate a second timestamp 768 at a time when the packet is received at the endpoint device 750. The endpoint device 750 may send a message 770 containing the timestamp 768 to the AR client 740. In some embodiments, the AR client 740 may determine an end-to-end delay 772 based on the difference between the timestamp 766 and the timestamp 768. In some embodiments, the AR client 740 may send a report 774 including the end-to-end delay 772 to the 5GC 746. In some embodiments, if the AR client 740 receives the report 758 that includes the propagation delay 754, the AR client 740 also may report the propagation delay 754 to the 5GC 746 in the report 774.

The 5GC 746 may perform operations 776 to determine a one-way latency or delay of the non-5G network (the non-5G delay). In some embodiments, the 5GC 746 may determine the one-way latency or delay of the non-5G network as: non-5G delay equals end-to-end delay 772 minus propagation delay 754 minus fixed scheduling delay 752 minus processing delays 762, 764 minus CN delay 760.

Figure 7F:
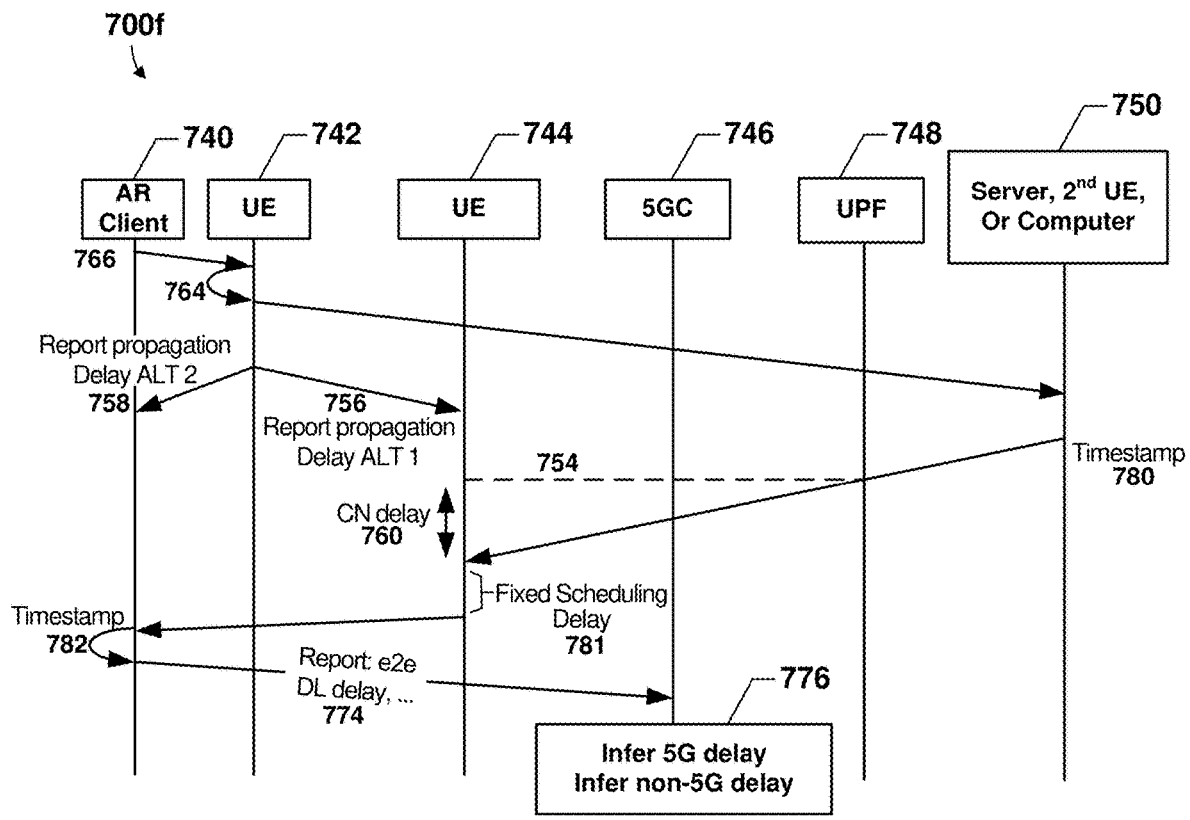

FIG. 7F illustrates aspects of a method 700f for managing a delay of network segments in an end-to-end communication path according to various embodiments. With reference to FIGS. 1-7F, the operations of the method 700f may be performed by a processor (such as the processor 210, 212, 214, 216, 218, 252, 260, 428) of a computing device configured to function as a network element (e.g., 402) of the core network 140 or the 5G networks 151a, 161a, 171a, and 181a, a base station device (such as the base station 110a-110d, 200, 350, or a wireless device (e.g., 110a-110d, 200, 320). The method 700f involves operations performed by various devices to delay of network segments using a deterministic scheduling delay in an uplink path.

In the method 700f, various network elements may perform similar operations as in the method 700e. In some embodiments, the endpoint device 750 may generate a timestamp 780 indicating a time at which the endpoint device 750 sends a reply message (e.g., a timestamp reply message) to the gNB 744. Processing of the reply message by the gNB 744 may incur a fixed scheduling delay 781. In some embodiments, the AR client 740 may generate a timestamp 782 indicating a time at which the AR client 740 receives the reply message from the gNB 744. In some embodiments, the gNB 744 may control the fixed scheduling delay 781. In some embodiments, the gNB 744 may set the fixed scheduling delay 781 to zero. In some embodiments, the gNB 744 may transmit packets in a slot or mini-slot nearest the end of the fixed scheduling delay.

Figure 7G:
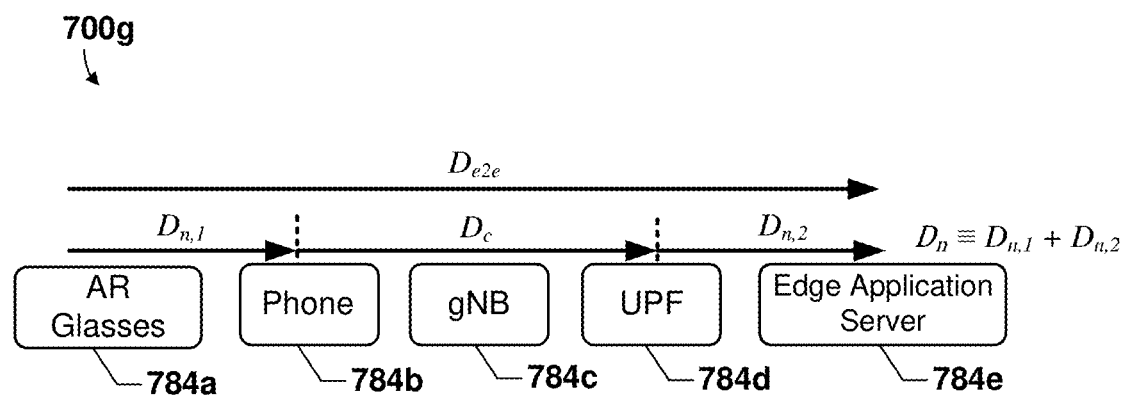

FIG. 7G illustrates aspects of a method 700g for managing a delay of network segments in an end-to-end communication path according to various embodiments. With reference to FIGS. 1-7G, the operations of the method 700g may be performed by a processor (such as the processor 210, 212, 214, 216, 218, 252, 260, 428) of a computing device configured to function as a network element (e.g., 402) of the core network 140 or the 5G networks 151a, 161a, 171a, and 181a, a base station device (such as the base station 110a-110d, 200, 350, or a wireless device (e.g., 110a-110d, 200, 320). The method 700g may include operations to determine an end-to-end delay.

A key challenge for a 5G relay architecture involves properly estimating QoS allocation(s) that may be required to support services such as augmented reality (AR) sessions, mixed reality (MR) sessions, and the like that may be performed by UEs such AR glasses 784a (e.g., 174, 184). The QoS allocation(s) may take into account a wireless communication link (e.g., a "tethering" link) from the AR glasses 784a to a phone device 784b or another device that also communicates with a 5G network (a "5G device"). Aspects of this wireless communication link affect many QoS parameters, including bitrate, packet loss, delay, and jitter.

Referring to FIG. 7G, components of an end-to-end delay communication ("$D_{e2e}$") may include a tethering link delay ("$D_{n,1}$"), a delay over an intermediate communication network ("$D_c$"), and a delay caused by a communication link ("$D_{n,2}$") between the UPF 784d and Edge application server 784e. In some embodiments as illustrated in FIG. 7G, the network delay ("$D_n$") may be defined as the sum of the tethering link delay plus the delay caused by the communication link, i.e., $D_n = D_{n,1} + D_{n,2}$.

The phone 784b may estimate the effect of the tethering link $D_{n,1}$ on overall QoS requirement(s) to enable devices to perform operations for smooth performance of an AR/MR session. Also, the phone 784b (via a Media Access Function) and/or a network element such as UPF 784d may determine a delay caused by the communication link "$D_{n,2}$" between the UPF 784d and Edge application server 784e (e.g., an Internet communication link). In some embodiments, the phone 784b and/or the UPF 784d may estimate the delay "$D_{n,2}$" by performing measurement tests for latency, packet loss, and bit rate, or by exchanging information with a RAN (e.g., gNB 784c) or AF managing a QoS policy. In some embodiments, an element of the 5G core network (e.g., the UPF 784d) may adjust its QoS allocation for the 5G network based on the observation of the status of the tethering link and the Internet, and may transmit one or more commands to one or more network elements to manage end-to-end QoS.

Figure 7H:
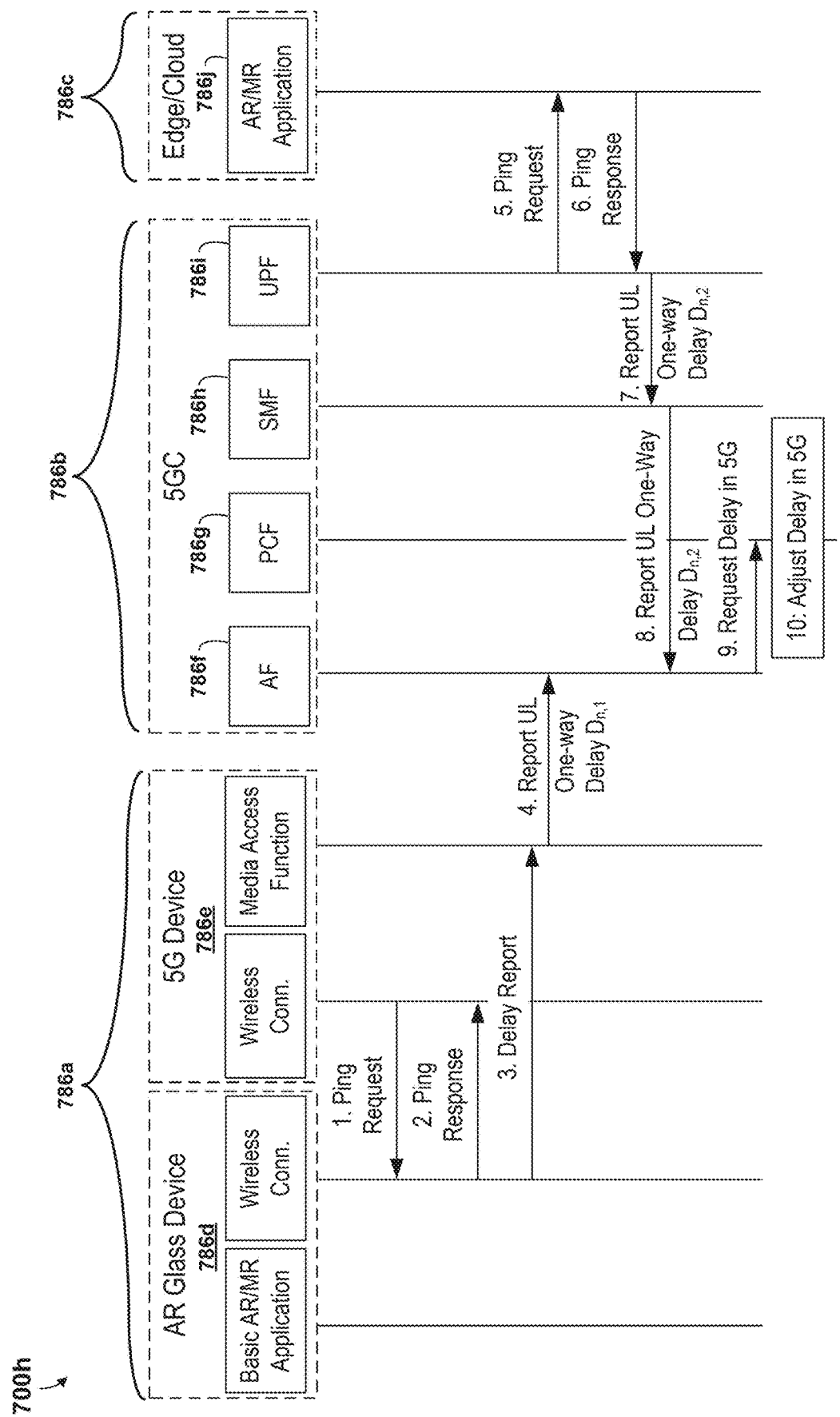

FIG. 7H illustrates aspects of a method 700h for managing a delay of network segments in an end-to-end communication path according to various embodiments. With reference to FIGS. 1-711, the operations of the method 700h may be performed by a processor (such as the processor 210, 212, 214, 216, 218, 252, 260, 428) of a computing device configured to function as a network element (e.g., 402) of the core network 140 or the 5G networks 151a, 161a, 171a, and 181a, a base station device (such as the base station 110a-110d, 200, 350, or a wireless device (e.g., 110a-110d, 200, 320). The method 700g may include operations performed by various devices to determine an end-to-end latency.

In various embodiments, an end-to-end communication path may include a tethering link segment 786a (e.g., a Wi-Fi segment 786a that includes a Wi-Fi communication link, or a 5G sidelink), a 5G network segment 786b, and an Internet segment 786c. The tethering link segment 786a and the Internet segment 786c may be considered, alone or together, non-5G network segments. In various embodiments, the Internet segment 786c typically cannot guarantee a specified level or amount of latency. To achieve low end-to-end latency, one approach is to perform operations to adjust operations of 5G network elements such that a latency in the 5G network 786b is very conservative, e.g., below a target value. This, however, comes at a cost, because provisioning an unnecessarily low latency in the 5G network 786b requires excessive resource allocation (e.g., to support a more robust modulation-and-coding scheme (MCS)) or pre-empting many other traffic flows.

An alternative approach is to dynamically adjust the delay in the 5G network 786b in accordance with the total delay incurred elsewhere in the end-to-end communication path. The delay incurred by the tethering link 786a may change over time depending, for example, on RF interference generated by other nearby Wi-Fi networks operating on the same frequency or nearby frequencies. Similarly, the delay between a UPF 786i (in the 5G network 786b) and an application server 786j (e.g., "AR/MR Application" in the Internet segment 786c) may depend on the location of the UPF 786i and a level of network congestion. Various measurements may be used to estimate these time-varying delays on the non-5G segments.

The method 700h represents operations that may be performed by various devices to measure latency in the end-to-end communication path that involves performing segment-by-segment delay measurement(s). In various embodiments, the operations of the method 700h may be performed to determine a one-way uplink delay and/or a one-way downlink delay.

In some embodiments, a delay incurred in the tethering link segment 786a (e.g., a Wi-F link or 5G sidelink) and a delay incurred between the UPF 786i and the application server 786j may be measured separately. In some embodiments, various devices may employ the ICMP ping protocol (ICMP Echo and Echo Reply). The 5G Device 786e may transmit a ping request (Message 1) to the AR glasses 786d ("AR Glass Device"). The AR glasses 786d may reply with a ping response (Message 2). The 5G Device 786e may determine an RTT (a first RTT) over the Wi-Fi link. Similarly, the UPF 786i may transmit a ping request (Message 5) to the application server 786j, and the application server 786j may respond to the UPF 786i with a ping response (Message 6). The UPF 786i may determine an RTT (a second RTT) between the UPF 786i and the application server 786j. The first RTT and the second RTT may each be halved to estimate a one-way delay for each of the two non-5G segments. In some embodiments, the one-way delay of the Wi-Fi communication link may be represented as "$D_{n,1}$" and the one-way delay of the communication link between the UPF and the application server may be represented as $D_{n,2}$.

A Media Access Function of the 5G device 786e may report the one-way delay estimate "$D_{n,1}$" to an Application Function (AF) 786f of the 5GC (Message 4). The UPF 786i may report the one-way delay estimate $D_{n,2}$ to a Session Management Function (SMF) 786h of the 5GC 786b, and the SMF 786h may forward the estimate to the AF 786f (Message 8). The AF 786f may determine a value for a delay in the 5G network 786b needed to compensate for the variation in the delay in the non-5G segments (e.g., 786a and 786c) in order to meet the end-to-end latency requirement for an application ("Basic AR/MR Application") executing in the AR Glass Device 786d, and may transmit a delay request to the PCF 786g (Message 9). The PCF 786g may perform operations (Operations 10) to adjust a delay in the 5G network 786b. In some embodiments, each of the reported delays "$D_{n,1}$," "$D_{n,2}$" may be determined as an average or mean of multiple measurements.

Figure 7I:
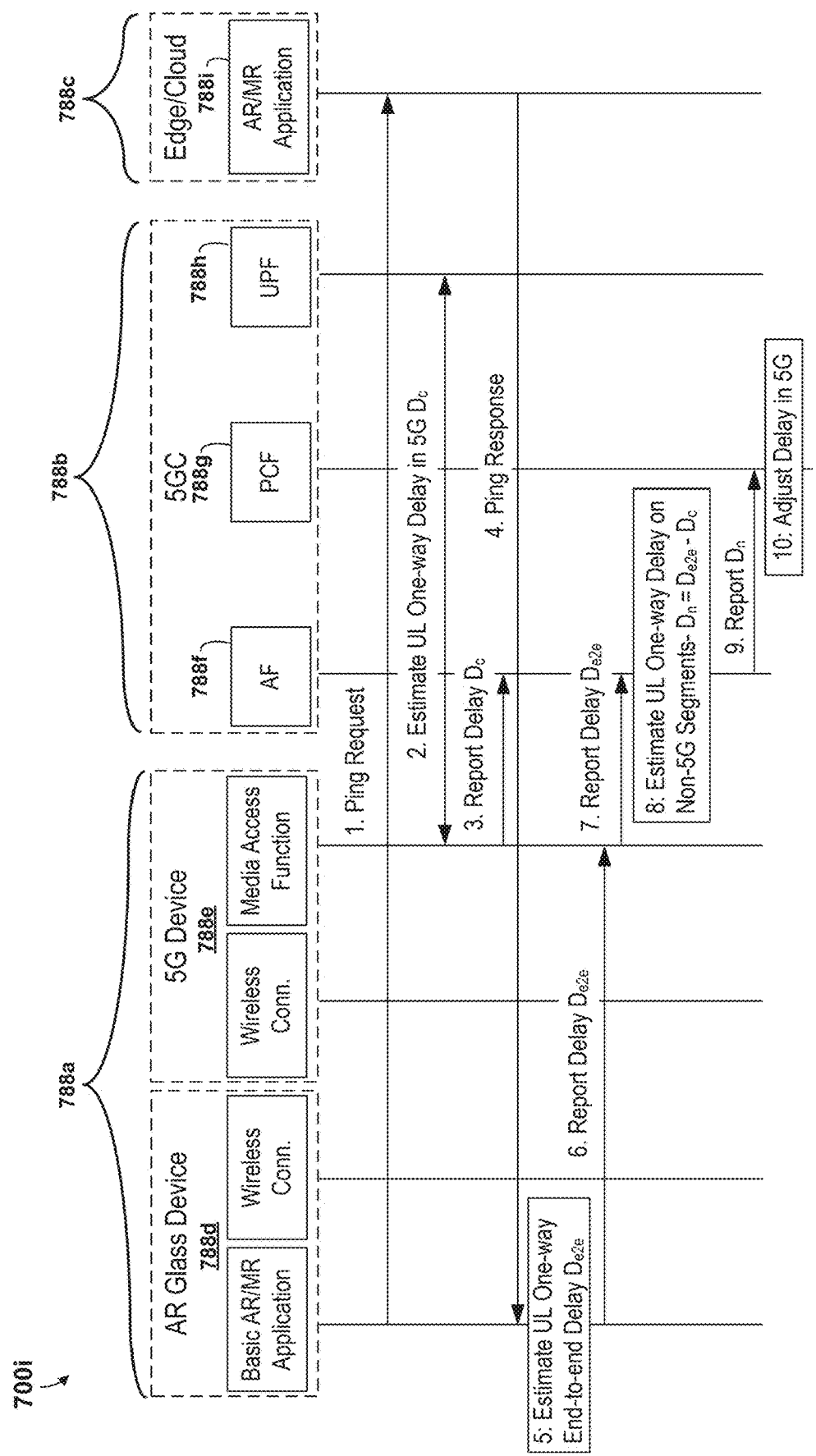

FIG. 7I illustrates aspects of a method 700i for managing a delay of network segments in an end-to-end communication path in some embodiments. With reference to FIGS. 1-7I, the operations of the method 700i may be performed by a processor (e.g., the processor 210, 212, 214, 216, 218, 252, 260, 428) of a computing device configured to function as a network element (e.g., 402) of the core network 140 or the 5G networks 151a, 161a, 171a, and 181a, a base station device (e.g., the base station 110a-110d, 200, 350, or a wireless device (e.g., 110a-110d, 200, 320). In some embodiments, an end-to-end communication path may include a tethering link segment 788a (e.g., a Wi-Fi segment that includes a Wi-Fi communication link), a 5G network segment 788b, and an Internet segment 788c.

The method 700i represents operations that may be performed by various devices performing end-to-end delay measurement(s) to enable measurements of latency in the end-to-end communication path. In some embodiments, the operations of the method 700h may be performed to determine a one-way uplink delay and/or a one-way downlink delay. Performing end-to-end measurements may avoid potential rejections of a measurement message that originates from the UPF and reaches the application server (e.g., between the UPF 786i and the application server 786j illustrated in FIG. 7H).

In some embodiments, an AR glasses device 788d may transmit a ping request message (Message 1) to an application server 788i ("AR/MR Application"). The application server 788i may respond with a ping response (Message 4). The AR glasses 788d may perform operations to estimate the UL one-way end-to-end delay "$D_{e2e}$" by halving the RTT (Operations 5). In some embodiments, a network element of the 5G network 788b may determine arrival times at various network elements of a message that travels the end-to-end communication path. For example, a network element of 5G network (e.g., AF 788f) may determine an estimate of an UL one-way delay within the 5G network (which may be represented as "$D_c$"), such as by determining a first time when the ping request (Message 1) arrives at 5G device 788e (e.g., a phone) and a second time when the ping request (Message 1) reaches the UPF 788h, and determining the difference between the first time and the second time. A first non-5G segment delay may be represented as "$D_{n,1}$" (e.g., the Wi-Fi segment 788a), and a second non-5G segment to limit the represented as "$D_{n,2}$" (e.g., the Internet segment 788c).

The AR glasses 788d may report the estimated UL one-way end-to-end delay "$D_{e2e}$" to the 5G Device 788e (Message 6). The 5G Device 788e may report the estimated UL one-way end-to-end delay "$D_{e2e}$" to the AF 788f (Message 7). The AF 788f may determine an estimate of the uplink delay on all non-5G network segments, which may be represented as $D_n = D_{e2e} - D_c$ (Operations 8). The AF 788f may report the determined or estimated uplink delay on all non-5G network segments to a PCF 788g (Message 9). The PCF 788g may perform operations (Operations 10) to adjust a delay in the 5G network 788b.

Alternatively, a network element of the 5G network 788b may assign a new type of 5QI corresponding to a constant delay as the target delay value (e.g., 8 ms). In this way, a delay experienced by the measurement packet in the 5G network may be considered as a deterministic known value.

In some embodiments, various network elements may be configured to employ a time measurement protocol to perform operations to determine time measurements and/or send message(s) to communicate determined time measurements. For example, the ICMP ping protocol uses two timestamps generated at a transmitting device to determine an estimate of the round-trip time (RTT). The measured delay may include a time gap between the reception of the ping request message by receiving device and transmitting a ping response message from the receiving device. Such a time gap may contribute to an estimation error (which may depend on operations system specific limitations used the receiving device). In some embodiments, the time gap may negatively affect low latency applications.

As an alternative, various network elements may be configured to use ICMP timestamps (e.g., ICMP timestamps described in Internet Engineering Task Force (IETF) RFC792). Compared to operations using ICMP ping messages, ICMP timestamps may provide a source transmitting device with two timestamps; a first timestamp for a reception of a timestamp message, and a second timestamp for a transmission of a timestamp reply message. The first timestamp and second timestamp may be transmitted back to the source transmitting device. The source transmitting device may use a difference between the first timestamp and the second timestamp to calculate the time gap, and may use the calculated time gap in an estimation of the round-trip time, thereby improving the estimated or calculated round-trip time.

In some embodiments, the 5G core network (e.g., PCF 788g) may determine the delay for the 5G network 788b based on a first delay estimate for the tethering link between the AR glasses 788d and the 5G device (e.g., phone) 788e, and a second delay estimate for the network path between the UPF 788h and the AR/MR application server (e.g., 788i), and an end-to-end delay requirement. In some embodiments, the first delay estimate may be determined based on measurements performed by the AR glasses 788d and the 5G device 788e, which first delay estimate may be reported to the 5G core network (e.g., AF 788f). In some embodiments, the AR glasses 788d and the 5G device 788e may be configured to use ICMP Echo and Echo Reply messages. In some embodiments, the AR glasses 788d and the 5G device 788e may be configured to use ICMP timestamp and timestamp reply messages. In some embodiments, the second delay estimate may be determined based on measurements by the UPF (e.g., 788h) and an Edge application server (e.g., AR/MR Application 788i), and may be reported to the 5G core network. In some embodiments, the UPF 788h and the Edge application server 788i may be configured to use ICMP Echo and Echo Reply messages. In some embodiments, the UPF 788h and the Edge application server 788i may be configured to use ICMP timestamp and timestamp reply messages.

In some embodiments, the 5G core network (e.g., PCF 788g) may determine the delay for the 5G network 788b based on the first delay estimate for the end-to-end path, and a second delay estimate for the network path in the 5G network (between the 5G Device 788e and the UPF 788h), and an end-to-end delay requirement. In some embodiments, the first delay estimate may be determined based on measurements performed by the AR glasses 788d and the 5G device 788e, and this first delay estimate may be reported to the 5G core network (e.g., AF 788f). In some embodiments, the AR glasses 788d and the 5G device 788e may be configured to use ICMP Echo and Echo Reply messages. In some embodiments, the AR glasses 788d and the 5G device 788e may be configured to use ICMP timestamp and timestamp reply messages. In some embodiments, the second delay estimate may be determined based on a 5QI associated with a constant delay.

In some embodiments, the second delay estimate may be determined based on measurements by the 5G Device 788e (e.g., using a Media Access Function) and an Edge application server (e.g., AR/MR Application 788i), and may be reported to the 5G core network. In some embodiments, the measurements may include two timestamps, a first timestamp determined at the 5G device 788e, and a second timestamp determined at the UPF 788h.

Figure 8A:
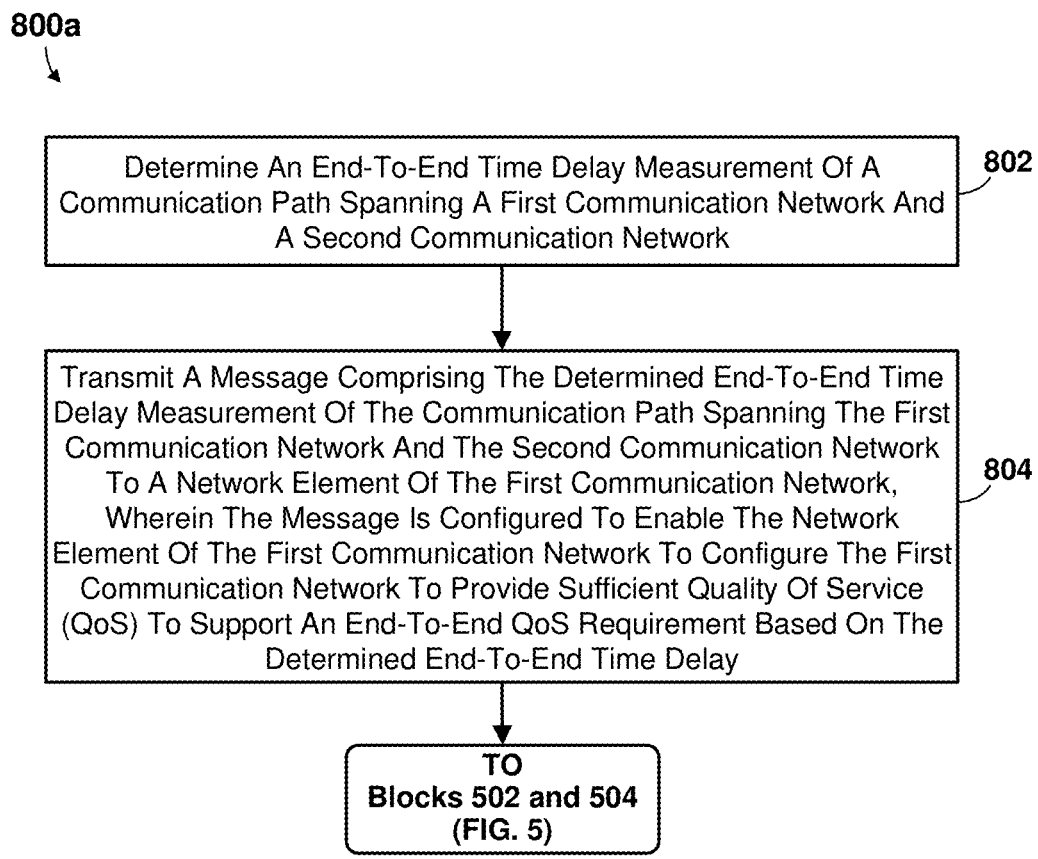
FIG. 8A is a process flow diagram illustrating a method that may be performed by a processor of a computing device for managing a delay of network segments in an end-to-end communication path according to some embodiments.

FIG. 8A is a process flow diagram illustrating a method 800a that may be performed by a processor of a computing device for managing a delay of network segments in an end-to-end communication path according to some embodiments. With reference to FIGS. 1-8A, the operations of the method 800a may be performed by a processor (such as the processor 210, 212, 214, 216, 218, 252, 260, 428) of a computing device configured to function as a network element (e.g., 402) of the core network 140 or the 5G networks 151a, 161a, 171a, and 181a, a base station device (such as the base station 110a-110d, 200, 350, or a wireless device (e.g., 110a-110d, 200, 320).

In block 802, the processor may determine an end-to-end time delay measurement of a communication path spanning a first communication network and a second communication network. In various embodiments, the first communication network may be a 5G network and the second communication network may not be a 5G network (i.e., the second communication network may be a non-5G network).

In block 804, the processor may transmit a message including the determined end-to-end time delay measurement of the communication path spanning the first communication network and the second communication network to a network element of the first communication network, wherein the message is configured to enable the network element of the first communication network to configure the first communication network to provide sufficient Quality of Service (QoS) to support an end-to-end QoS requirement based on the determined end-to-end time delay.

Following the performance of the operations of block 804, a processor of a computing device functioning as a network may perform the operations of blocks 502 and 504, as described.

Figure 8B:
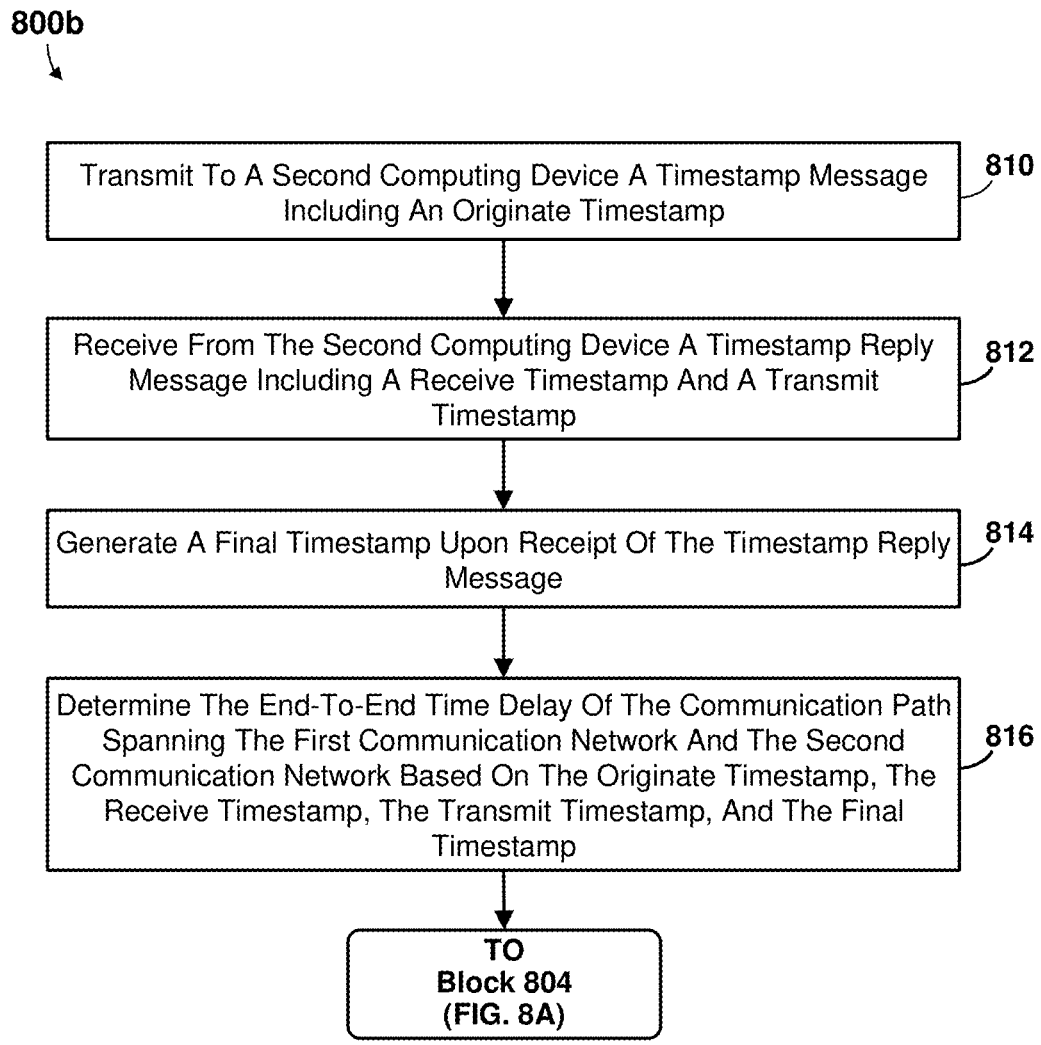
FIGS. 8B-8D are process flow diagrams illustrating operations that may be performed by a processor of a computing device as part of the method for managing a delay of network segments in an end-to-end communication path according to some embodiments.

FIG. 8B is a process flow diagram illustrating operations 800b that may be performed by a processor of a computing device as part of the method 800a for managing a delay of network segments in an end-to-end communication path according to some embodiments. With reference to FIGS. 1-8B, the operations 800b may be performed by a processor (such as the processor 210, 212, 214, 216, 218, 252, 260, 428) of a computing device configured to function as a network element (e.g., 402) of the core network 140 or the 5G networks 151a, 161a, 171a, and 181a, a base station device (such as the base station 110a-110d, 200, 350, or a wireless device (e.g., 110a-110d, 200, 320).

In block 810, the processor may transmit to a second computing device a timestamp message including an originate timestamp. In some embodiments, the timestamp message may include a Real Time Protocol (RTP) or Secure Real Time Protocol (SRTP) message.

In block 812, the processor may receive from the second computing device a timestamp reply message including a receive timestamp and a transmit timestamp. In some embodiments, the transmit timestamp may be the originate timestamp plus a delay caused by the first communication network. In some embodiments, the timestamp reply message may include a Real Time Control Protocol (RTCP) message.

In block 814, the processor may generate a final timestamp upon receipt of the timestamp reply message.

In block 816, the processor may determine the end-to-end time delay of the communication path spanning the first communication network and the second communication network based on the originate timestamp, the receive timestamp, the transmit timestamp, and the final timestamp.

In some embodiments, the processor may determine the end-to-end time delay measurement of the communication path spanning the first communication network and the second communication network based on the originate timestamp, the receive timestamp, the transmit timestamp, and a radio access network (RAN) delay.

The processor may perform the operations of block 804 of the method 800a, as described.

Figure 8C:
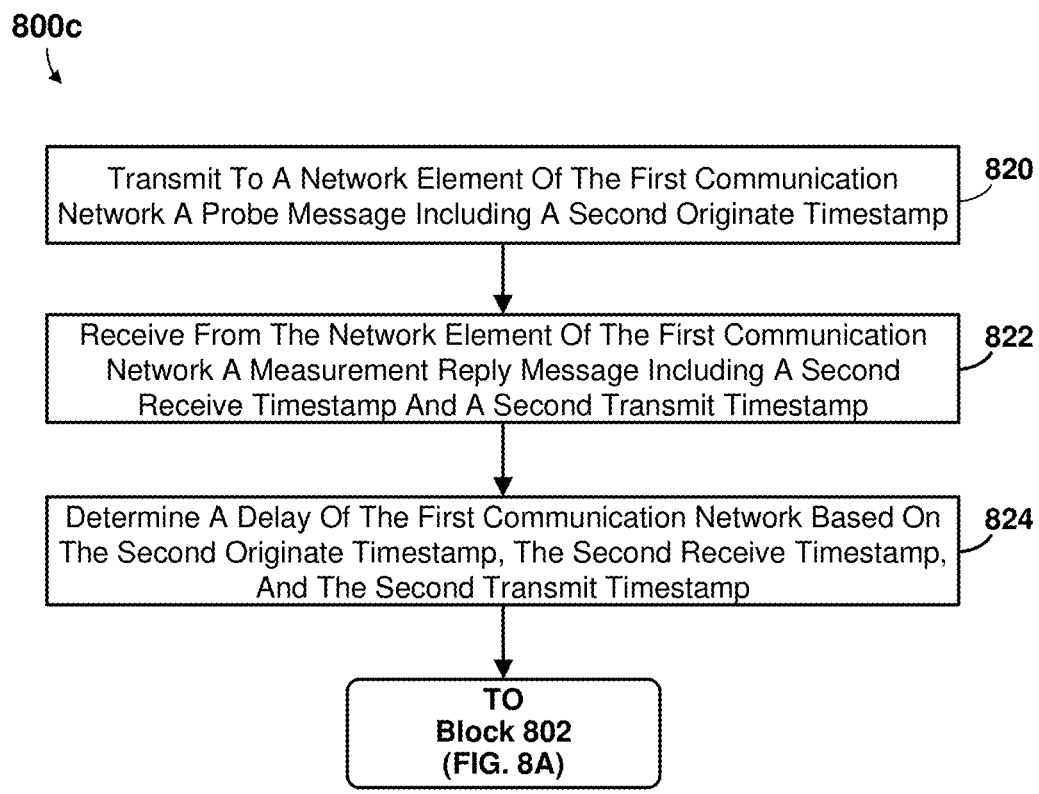

FIG. 8C is a process flow diagram illustrating operations 800c that may be performed by a processor of a computing device as part of the method 800a for managing a delay of network segments in an end-to-end communication path according to some embodiments. With reference to FIGS. 1-8C, the operations 800c may be performed by a processor (such as the processor 210, 212, 214, 216, 218, 252, 260, 428) of a computing device configured to function as a network element (e.g., 402) of the core network 140 or the 5G networks 151a, 161a, 171a, and 181a, a base station device (such as the base station 110a-110d, 200, 350, or a wireless device (e.g., 110a-110d, 200, 320).

In block 820, the processor may transmit to a network element of the first communication network a probe message including a second originate timestamp. In some embodiments, the probe message may be configured to be identified based on at least one of a special radio bearer, a logical channel ID, and a QoS flow ID in a Service Data Adaptation Protocol (SDAP) packet header, a UDP packet port number, a specified value of a differentiated services code point (DSCP), a protocol number, or a value in an Options header field.

In block 822, the processor may receive from the network element of the first communication network a measurement reply message including a second receive timestamp and a second transmit timestamp.

In block 824, the processor may determine a delay of the first communication network based on the second originate timestamp, the second receive timestamp, and the second transmit timestamp.

Figure 8D:
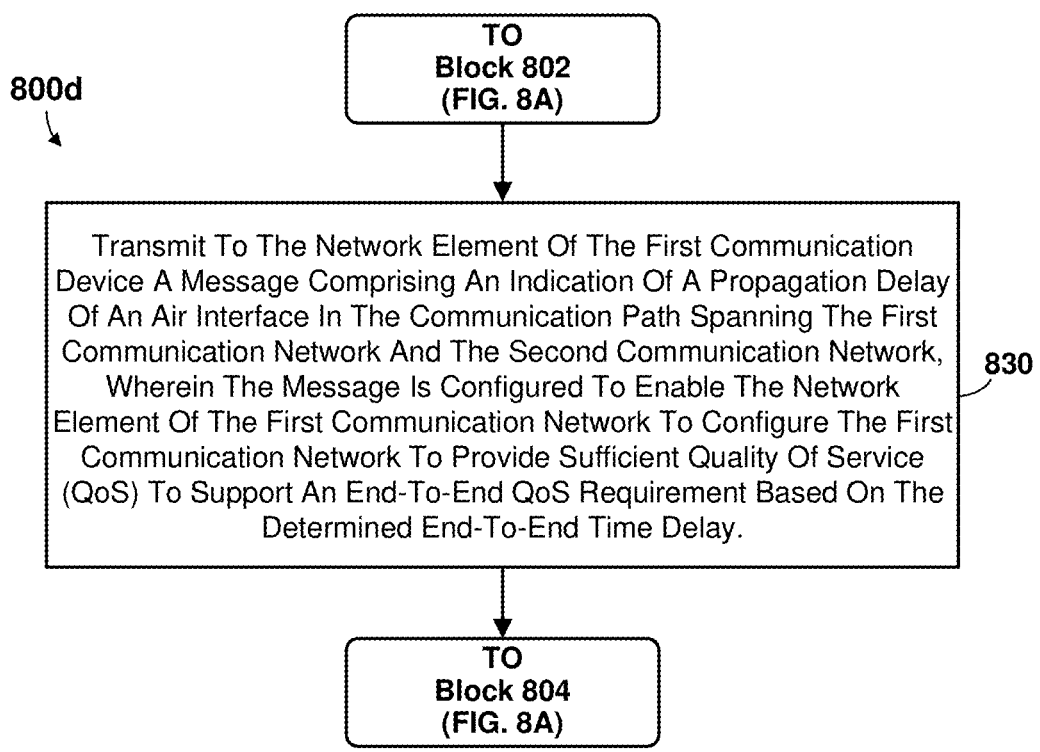

FIG. 8D is a process flow diagram illustrating operations 800d that may be performed by a processor of a computing device as part of the method 800a for managing a delay of network segments in an end-to-end communication path according to some embodiments. With reference to FIGS. 1-8D, the operations 800d may be performed by a processor (such as the processor 210, 212, 214, 216, 218, 252, 260, 428) of a computing device configured to function as a network element (e.g., 402) of the core network 140 or the 5G networks 151a, 161a, 171a, and 181a, a base station device (such as the base station 110a-110d, 200, 350, or a wireless device (e.g., 110a-110d, 200, 320).

Following the performance of the operations of block 802 (FIG. 8A), the processor may transmit to the network element of the first communication device a message that includes an indication of a propagation delay of an air interface in the communication path spanning the first communication network and the second communication network in block 830. In various embodiments, the message may be configured to enable the network element of the first communication network to configure the first communication network to provide sufficient Quality of Service (QoS) to support an end-to-end QoS requirement based on the determined end-to-end time delay.

Figure 9:
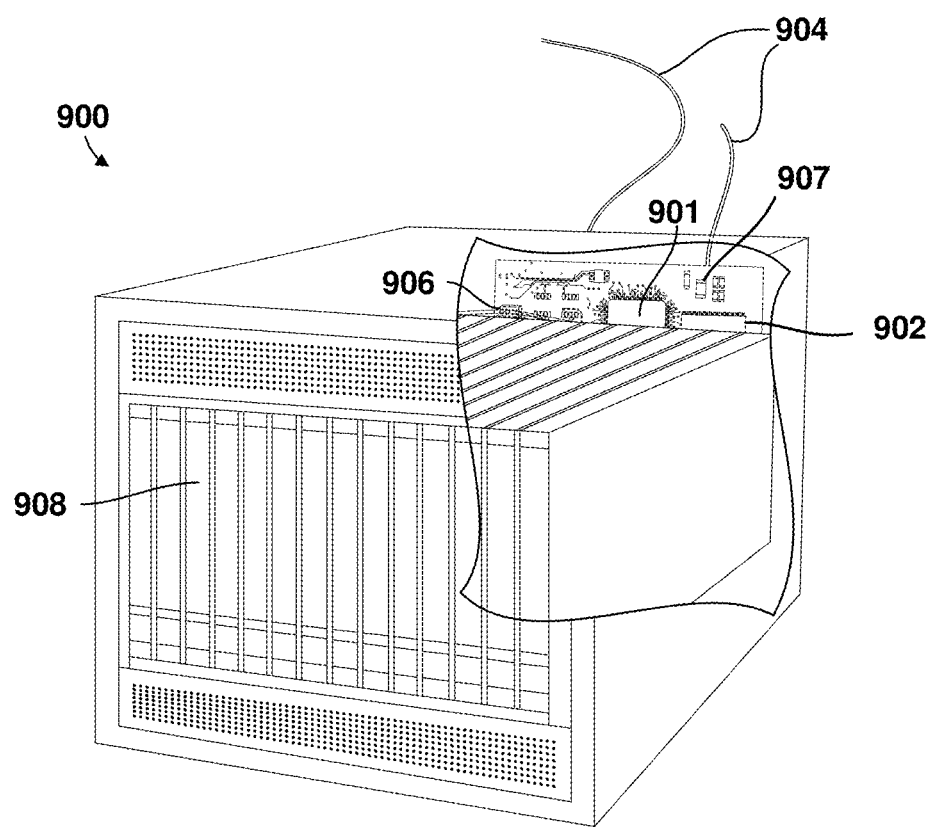
FIG. 9 is a component block diagram of a network element device suitable for use with various embodiments.

FIG. 9 is a component block diagram of a network element device suitable for use with various embodiments. Such network element devices (e.g., a network element (e.g., 402) of the core network 140 or the 5G networks 151a, 161a, 171a, and 181a, a base station device (such as the base station 110a-110d, 200, 350), and/or the like) may include at least the components illustrated in FIG. 9. With reference to FIGS. 1-9, the network element device 900 may typically include a processor 901 coupled to volatile memory 902 and a large capacity nonvolatile memory, such as a disk drive 908. The network element device 900 also may include a peripheral memory access device 906 such as a floppy disc drive, compact disc (CD) or digital video disc (DVD) drive coupled to the processor 901. The network element device 900 also may include network access ports 904 (or interfaces) coupled to the processor 901 for establishing data connections with a network, such as the Internet or a local area network coupled to other system computers and servers. The network element device 900 may include one or more antennas 907 for sending and receiving electromagnetic radiation that may be connected to a wireless communication link. The network element device 900 may include additional access ports, such as USB, Firewire, Thunderbolt, and the like for coupling to peripherals, external memory, or other devices.

Figure 10:
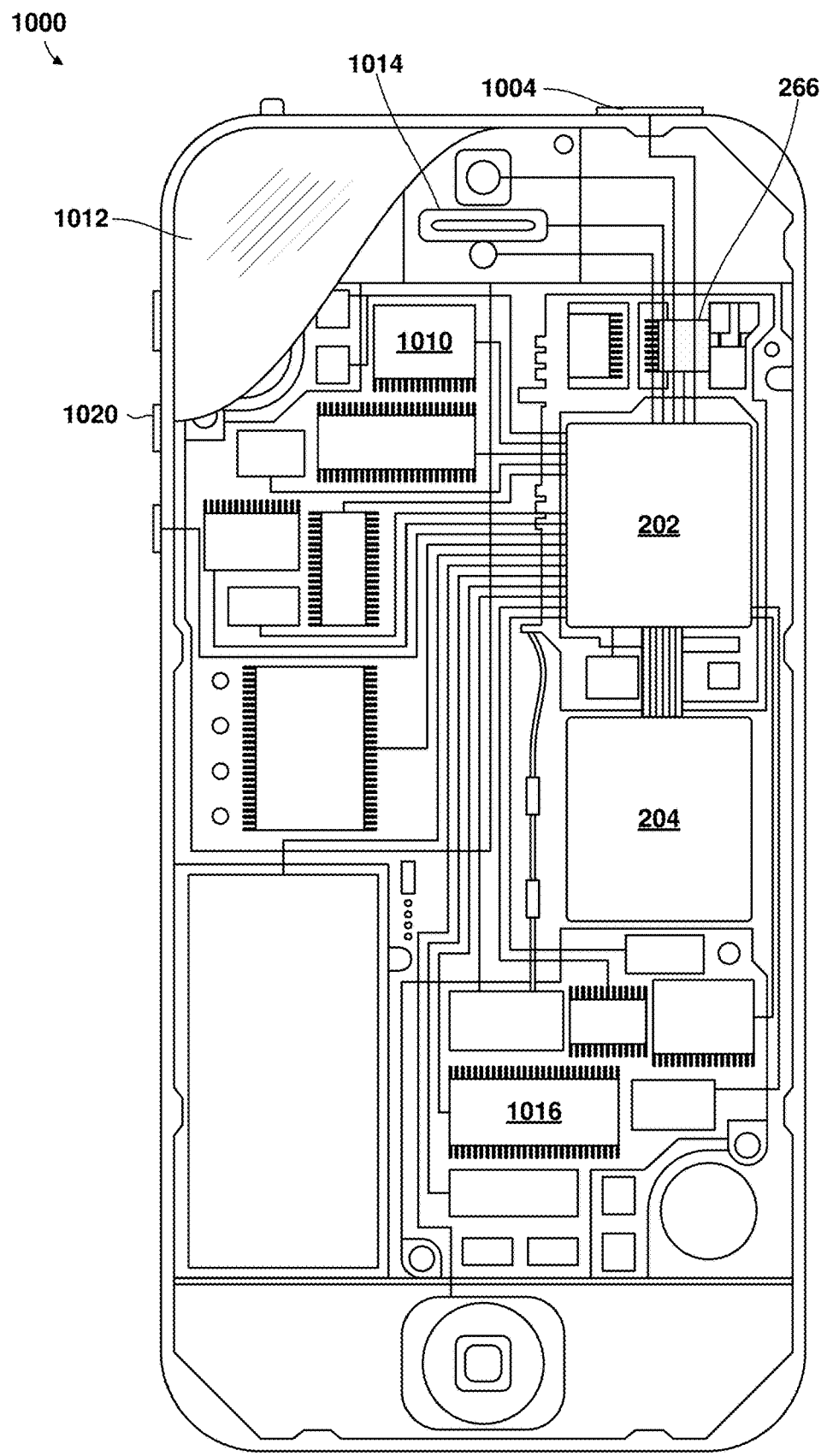
FIG. 10 is a component block diagram of a wireless device suitable for use with various embodiments.

FIG. 10 is a component block diagram of a wireless device 1000 suitable for use with various embodiments. In some embodiments, the wireless device 1000 may operate as a network element. With reference to FIGS. 1-10, various embodiments may be implemented on a variety of wireless devices 1000 (for example, the wireless device 120a-120e, 200, 320, 404), an example of which is illustrated in FIG. 10 in the form of a smartphone. The wireless device 1000 may include a first SOC 202 (for example, a SOC-CPU) coupled to a second SOC 204 (for example, a 5G capable SOC). The first and second SOCs 202, 204 may be coupled to internal memory 1016, a display 1012, and to a speaker 1014. Additionally, the wireless device 1000 may include an antenna 1004 for sending and receiving electromagnetic radiation that may be connected to a transceiver 427 coupled to one or more processors in the first and/or second SOCs 202, 204. Wireless device 1000 may include menu selection buttons or rocker switches 1020 for receiving user inputs.

The wireless device 1000 may include a sound encoding/decoding (CODEC) circuit 1010, which digitizes sound received from a microphone into data packets suitable for wireless transmission and decodes received sound data packets to generate analog signals that are provided to the speaker to generate sound. One or more of the processors in the first and second SOCs 202, 204, wireless transceiver 266 and CODEC 1010 may include a digital signal processor (DSP) circuit (not shown separately).

The processors of the network element device 900 and the wireless device 1000 may be any programmable microprocessor, microcomputer or multiple processor chip or chips that can be configured by software instructions (applications) to perform a variety of functions, including the functions of some implementations described below. In some wireless devices, multiple processors may be provided, such as one processor within an SOC 204 dedicated to wireless communication functions and one processor within an SOC 202 dedicated to running other applications. Software applications may be stored in the memory 902, 1016 before they are accessed and loaded into the processor. The processors may include internal memory sufficient to store the application software instructions.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations 500, 600a-600i, 700a-700i, and 800a-800d may be substituted for or combined with one or more operations of the methods and operations 500, 600a-600i, 700a-700i, and 800a-800d.

Implementation examples are described in the following paragraphs. While some of the following implementation examples are described in terms of example methods, further example implementations may include: the example methods discussed in the following paragraphs implemented by a base station including a processor configured with processor-executable instructions to perform operations of the methods of the following implementation examples; the example methods discussed in the following paragraphs implemented by a base station including means for performing functions of the methods of the following implementation examples; and the example methods discussed in the following paragraphs may be implemented as a non-transitory processor-readable storage medium having stored thereon processor-executable instructions configured to cause a processor of a base station to perform the operations of the methods of the following implementation examples.

Example 1. A method of managing end-to-end Quality of Service (QoS) in a communication path spanning at least two communication networks, including determining by a network element of a first communication network an end-to-end QoS requirement for communicating packets from a packet source to a packet destination via a communication path spanning the first communication network and a second communication network, determining by the network element a QoS provided by the second communication network within the communication path, and configuring the first communication network to provide sufficient QoS to support the end-to-end QoS requirement based on the QoS provided by the second communication network.

Example 2. The method of example 1, in which the first communication network is a 5G network and the second communication network is not a 5G network.

Example 3. The method of either of examples 1 or 2, in which determining by the network element the QoS provided by the second communication network within the communication path includes determining a packet error rate of the second communication network.

Example 4. The method of example 3, in which configuring the first communication network to provide sufficient QoS to support the end-to-end QoS requirement based on the QoS provided by the second communication network includes determining a required packet error rate of the first communication network based on the determined packet error rate of the second communication network.

Example 5. The method of any of examples 1-4, in which determining by the network element the QoS provided by the second communication network within the communication path includes determining an available throughput of the second communication network.

Example 6. The method of example 5, in which configuring the first communication network to provide sufficient QoS to support the end-to-end QoS requirement based on the QoS provided by the second communication network includes determining a throughput requirement of the first communication network based on the determined available throughput of the second communication network.

Example 7. The method of any of examples 1-6, in which determining by the network element the QoS provided by the second communication network within the communication path includes measuring an end-to-end achieved QoS, identifying a QoS provided by the first communication network, and determining the QoS provided by the second communication network within the communication path based on the end-to-end achieved QoS and the QoS provided by the first communication network.

Example 8. The method of example 7, in which identifying the QoS provided by the first communication network includes applying to the first communication network a packet delay measurement 5G QoS Identifier (5QI) that corresponds to a constant packet delay in the first communication network, and determining the QoS provided by the second communication network within the communication path based on the end-to-end achieved QoS and the QoS provided by the first communication network includes determining the QoS provided by the second communication network within the communication path based on the end-to-end achieved packet delay and the constant packet delay in the first communication network.

Example 9. The method of example 7, in which identifying the QoS provided by the first communication network includes applying to the first communication network a packet loss rate 5QI that corresponds to a constant packet loss rate in the first communication network, and determining the QoS provided by the second communication network within the communication path based on the end-to-end achieved QoS and the QoS provided by the first communication network includes determining the QoS provided by the second communication network within the communication path based on the end-to-end achieved packet loss rate and the constant packet loss rate in the first communication network.

Example 10. The method of example 7, in which identifying the QoS provided by the first communication network includes applying to the first communication network a packet loss rate 5QI associated with a packet loss measurement procedure that excludes packet losses in the first communication network, and determining the QoS provided by the second communication network within the communication path based on the end-to-end achieved QoS and the QoS provided by the first communication network includes determining the QoS provided by the second communication network within the communication path based on the end-to-end achieved packet loss and the packet loss measurement procedure.

Example 11. The method of example 7, in which identifying the QoS provided by the first communication network includes applying to the first communication network an available bandwidth 5QI associated with an available bandwidth measurement procedure that configures resources of the first communication network such that a packet loss of the first communication network is substantially negligible relative to a packet loss of the second communication network, and determining the QoS provided by the second communication network within the communication path based on the end-to-end achieved QoS and the QoS provided by the first communication network includes determining the QoS provided by the second communication network within the communication path based on the end-to-end achieved available bandwidth and the available bandwidth measurement procedure.

Example 12. The method of example 7, in which identifying the QoS provided by the first communication network includes applying to the first communication network an available bandwidth 5QI associated with an available bandwidth measurement procedure in which data packets are transported in the first communication network back-to-back, and determining the QoS provided by the second communication network within the communication path based on the end-to-end achieved QoS and the QoS provided by the first communication network includes determining the QoS provided by the second communication network within the communication path based on the end-to-end achieved available bandwidth and the available bandwidth measurement procedure.

Example 13. The method of example 7, in which identifying the QoS provided by the first communication network includes applying to the first communication network a network measurement 5QI associated with a network measurement procedure for performing end-to-end measurements of measurement packets transported along the communication path, and determining the QoS provided by the second communication network within the communication path based on the end-to-end achieved QoS and the QoS provided by the first communication network includes determining the QoS provided by the second communication network within the communication path based on the end-to-end achieved QoS and the network measurement procedure.

Example 14. A method performed by a processor of a computing device, including determining an end-to-end time delay measurement of a communication path spanning a first communication network and a second communication network, and transmitting a message including the determined end-to-end time delay measurement of the communication path spanning the first communication network and the second communication network to a network element of the first communication network, in which the message is configured to enable the network element of the first communication network to configure the first communication network to provide sufficient Quality of Service (QoS) to support an end-to-end QoS requirement based on the determined end-to-end time delay.

Example 15. The method of example 14, in which the first communication network is a 5G network and the second communication network is not a 5G network.

Example 16. The method of either of examples 14 or 15, further including transmitting to a second computing device a timestamp message including an originate timestamp, receiving from the second computing device a timestamp reply message including a receive timestamp and a transmit timestamp, generating a final timestamp upon receipt of the timestamp reply message, and determining the end-to-end time delay of the communication path spanning the first communication network and the second communication network based on the originate timestamp, the receive timestamp, the transmit timestamp, and the final timestamp.

Example 17. The method of example 16, further including determining the end-to-end time delay measurement of the communication path spanning the first communication network and the second communication network based on the originate timestamp, the receive timestamp, the transmit timestamp, and a radio access network (RAN) delay.

Example 18. The method of example 16, in which the transmit timestamp is the originate timestamp plus a delay caused by the first communication network.

Example 19. The method of example 16, in which the timestamp message includes a Real Time Protocol (RTP) or Secure Real Time Protocol (SRTP) message, and the timestamp reply message includes a Real Time Control Protocol (RTCP) message.

Example 20. The method of any of examples 14-19, including transmitting to the network element of the first communication network a probe message including a second originate timestamp, receiving from the network element of the first communication network a measurement reply message including a second receive timestamp and a second transmit timestamp, and determining a delay of the first communication network based on the second originate timestamp, the second receive timestamp, and the second transmit timestamp.

Example 21. The method of any of examples 14-20, in which the probe message is configured to be identified based on at least one of a special radio bearer, a logical channel ID, and a QoS flow ID in a Service Data Adaptation Protocol (SDAP) packet header, a UDP packet port number, a specified value of a differentiated services code point (DSCP), a protocol number, or a value in an Options header field.

Example 22. The method of any of examples 14-21, including transmitting to the network element of the first communication device a message including an indication of a propagation delay of an air interface in the communication path spanning the first communication network and the second communication network, and in which the message is configured to enable the network element of the first communication network to configure the first communication network to provide sufficient Quality of Service (QoS) to support the end-to-end QoS requirement based on the determined end-to-end time delay.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A computing device, comprising:
one or more processors and one or more memories coupled with the one or more processors, the one or more processors configured to cause the computing device to:
transmit, to a second computing device of a second communication network, a timestamp message including an originate timestamp; and
transmit, to a network element of a first communication network, a message comprising an end-to-end time delay measurement of a communication path spanning the first communication network and the second communication network,
wherein the end-to-end time delay measurement of the communication path is based on a timestamp reply message from the second computing device responsive to the timestamp message, the timestamp reply message including a delay associated with the first communication network,
wherein the delay associated with the first communication network in the timestamp reply message is based on a replacement transmit timestamp for a transmit timestamp, the transmit timestamp indicated by the second computing device, and
wherein the message is configured to enable the network element of the first communication network to configure the first communication network to provide sufficient Quality of Service (QOS) to support an end-to-end QoS requirement based on the end-to-end time delay measurement of the communication path.

2. The computing device of claim 1, wherein the first communication network is a 5G network and the second communication network is not a 5G network.

3. The computing device of claim 1, wherein the one or more processors are configured to cause the computing device to:
receive, from the second computing device via a third computing device of the first communication network, the timestamp reply message including a receive timestamp and the replacement transmit timestamp, the replacement transmit timestamp corresponding to the originate timestamp plus the delay associated with the first communication network;
generate a final timestamp upon receipt of the timestamp reply message; and
determine the end-to-end time delay measurement of the communication path spanning the first communication network and the second communication network based on the originate timestamp, the receive timestamp, the replacement transmit timestamp, and the final timestamp.

4. The computing device of claim 3, wherein the one or more processors are configured to cause the computing device to determine the end-to-end time delay measurement of the communication path spanning the first communication network and the second communication network based on the originate timestamp, the receive timestamp, the replacement transmit timestamp, and a radio access network (RAN) delay.

5. The computing device of claim 3, wherein the timestamp message comprises a Real Time Protocol (RTP) or Secure Real Time Protocol (SRTP) message, and the timestamp reply message comprises a Real Time Control Protocol (RTCP) message.

6. The computing device of claim 1, wherein the one or more processors are configured to cause the computing device to:
transmit to the network element of the first communication network a probe message including a second originate timestamp;
receive from the network element of the first communication network a measurement reply message including a second receive timestamp and a second transmit timestamp; and
determine the delay associated with the first communication network based on the second originate timestamp, the second receive timestamp, and the second transmit timestamp.

7. The computing device of claim 6, wherein the probe message is configured to be identified based on at least one of a special radio bearer, a logical channel ID, and a QoS flow ID in a Service Data Adaptation Protocol (SDAP) packet header, a UDP packet port number, a specified value of a differentiated services code point (DSCP), a protocol number, or a value in an Options header field.

8. The computing device of claim 1, wherein the one or more processors are configured to cause the computing device to transmit to the network element of the first communication network a message comprising an indication of a propagation delay of an air interface in the communication path spanning the first communication network and the second communication network, and wherein the message is configured to enable the network element of the first communication network to configure the first communication network to provide sufficient Quality of Service (QOS) to support the end-to-end QoS requirement based on the end-to-end time delay measurement of the communication path.

9. A method performed by one or more processors of a computing device, comprising:

transmitting, to a second computing device of a second communication network, a timestamp message including an originate timestamp; and
transmitting, to a network element of a first communication network, a message comprising an end-to-end time delay measurement of a communication path spanning the first communication network and the second communication network,
wherein the end-to-end time delay measurement of the communication path is based on a timestamp reply message from the second computing device responsive to the timestamp message, the timestamp reply message including a delay associated with the first communication network,
wherein the delay associated with the first communication network in the timestamp reply message is based on a replacement transmit timestamp for a transmit timestamp, the transmit timestamp indicated by the second computing device, and
wherein the message is configured to enable the network element of the first communication network to configure the first communication network to provide sufficient Quality of Service (QOS) to support an end-to-end QoS requirement based on the end-to-end time delay measurement of the communication path.

10. The method of claim 9, wherein the first communication network is a 5G network and the second communication network is not a 5G network.

11. The method of claim 9, further comprising:
receiving, from the second computing device via a third computing device of the first communication network, the timestamp reply message including a receive timestamp and the replacement transmit timestamp, the replacement transmit timestamp corresponding to the originate timestamp plus the delay associated with the first communication network;
generating a final timestamp upon receipt of the timestamp reply message; and
determining the end-to-end time delay measurement of the communication path spanning the first communication network and the second communication network based on the originate timestamp, the receive timestamp, the replacement transmit timestamp, and the final timestamp.

12. The method of claim 11, further comprising determining the end-to-end time delay measurement of the communication path spanning the first communication network and the second communication network based on the originate timestamp, the receive timestamp, the replacement transmit timestamp, and a radio access network (RAN) delay.

13. The method of claim 11, wherein the timestamp message comprises a Real Time Protocol (RTP) or Secure Real Time Protocol (SRTP) message, and the timestamp reply message comprises a Real Time Control Protocol (RTCP) message.

14. The method of claim 9, further comprising:
transmitting to the network element of the first communication network a probe message including a second originate timestamp;
receiving from the network element of the first communication network a measurement reply message including a second receive timestamp and a second transmit timestamp; and determining the delay associated with the first communication network based on the second originate timestamp, the second receive timestamp, and the second transmit timestamp.

15. The method of claim 14, wherein the probe message is configured to be identified based on at least one of a special radio bearer, a logical channel ID, and a QoS flow ID in a Service Data Adaptation Protocol (SDAP) packet header, a UDP packet port number, a specified value of a differentiated services code point (DSCP), a protocol number, or a value in an Options header field.

16. The method of claim 9, further comprising transmitting to the network element of the first communication network a message comprising an indication of a propagation delay of an air interface in the communication path spanning the first communication network and the second communication network, wherein the message is configured to enable the network element of the first communication network to configure the first communication network to provide sufficient Quality of Service (QOS) to support the end-to-end QoS requirement based on the end-to-end time delay measurement of the communication path.

17. A computing device, comprising:
means for transmitting, to a second computing device of a second communication network, a timestamp message including an originate timestamp; and
means for transmitting, to a network element of a first communication network, a message comprising an end-to-end time delay measurement of a communication path spanning the first communication network and the second communication network,
wherein the end-to-end time delay measurement of the communication path is based on a timestamp reply message from the second computing device responsive to the timestamp message, the timestamp reply message including a delay associated with the first communication network,
wherein the delay associated with the first communication network in the timestamp reply message is based on a replacement transmit timestamp for a transmit timestamp, the transmit timestamp indicated by the second computing device, and
wherein the message is configured to enable the network element of the first communication network to configure the first communication network to provide sufficient Quality of Service (QOS) to support an end-to-end QoS requirement based on the end-to-end time delay measurement of the communication path.

18. The computing device of claim 17, wherein the first communication network is a 5G network and the second communication network is not a 5G network.

19. The computing device of claim 17, further comprising:
means for receiving, from the second computing device via a third computing device of the first communication network, the timestamp reply message including a receive timestamp and the replacement transmit timestamp, the replacement transmit timestamp corresponding to the originate timestamp plus the delay associated with the first communication network;
means for generating a final timestamp upon receipt of the timestamp reply message; and
means for determining the end-to-end time delay measurement of the communication path spanning the first communication network and the second communication network based on the originate timestamp, the receive timestamp, the replacement transmit timestamp, and the final timestamp.

20. The computing device of claim 19, further comprising means for determining the end-to-end time delay measurement of the communication path spanning the first communication network and the second communication network based on the originate timestamp, the receive timestamp, the replacement transmit timestamp, and a radio access network (RAN) delay.

21. The computing device of claim 19, wherein the timestamp message comprises a Real Time Protocol (RTP) or Secure Real Time Protocol (SRTP) message, and the timestamp reply message comprises a Real Time Control Protocol (RTCP) message.

22. The computing device of claim 17, further comprising:
means for transmitting to the network element of the first communication network a probe message including a second originate timestamp;
means for receiving from the network element of the first communication network a measurement reply message including a second receive timestamp and a second transmit timestamp; and
means for determining the delay associated with the first communication network based on the second originate timestamp, the second receive timestamp, and the second transmit timestamp.

23. The computing device of claim 22, wherein the probe message is configured to be identified based on at least one of a special radio bearer, a logical channel ID, and a QoS flow ID in a Service Data Adaptation Protocol (SDAP) packet header, a UDP packet port number, a specified value of a differentiated services code point (DSCP), a protocol number, or a value in an Options header field.

24. The computing device of claim 17, further comprising means for transmitting to the network element of the first communication network a message comprising an indication of a propagation delay of an air interface in the communication path spanning the first communication network and the second communication network, wherein the message is configured to enable the network element of the first communication network to configure the first communication network to provide sufficient Quality of Service (QOS) to support the end-to-end QoS requirement based on the end-to-end time delay measurement of the communication path.

25. One or more non-transitory processor-readable media having stored thereon processor-executable instructions that, when executed by one or more processors of a computing device, cause the computing device to perform operations comprising:
transmitting, to a second computing device of a second communication network, a timestamp message including an originate timestamp; and
transmitting, to a network element of a first communication network, a message comprising an end-to-end time delay measurement of a communication path spanning the first communication network and the second communication network,
wherein the end-to-end time delay measurement of the communication path is based on a timestamp reply message from the second computing device responsive to the timestamp message, the timestamp reply message including a delay associated with the first communication network,
wherein the delay associated with the first communication network in the timestamp reply message is based on a replacement transmit timestamp for a transmit timestamp, the transmit timestamp indicated by the second computing device, and wherein the message is configured to enable the network element of the first communication network to configure the first communication network to provide sufficient Quality of Service (QOS) to support an end-to-end QoS requirement based on the end-to-end time delay measurement of the communication path.

26. The one or more non-transitory processor-readable media of claim 25, wherein the stored processor-executable instructions that, when executed by the one or more processors, cause the computing device to perform operations further comprising:

receiving, from the second computing device via a third computing device of the first communication network, the timestamp reply message including a receive timestamp and the replacement transmit timestamp, the replacement transmit timestamp corresponding to the originate timestamp plus the delay associated with the first communication network;

generating a final timestamp upon receipt of the timestamp reply message; and determining the end-to-end time delay measurement of the communication path spanning the first communication network and the second communication network based on the originate timestamp, the receive timestamp, the replacement transmit timestamp, and the final timestamp.

27. The one or more non-transitory processor-readable media of claim 25, wherein the stored processor-executable instructions that, when executed by the one or more processors, cause the computing device to perform operations further comprising:

transmitting to the network element of the first communication network a probe message including a second originate timestamp;

receiving from the network element of the first communication network a measurement reply message including a second receive timestamp and a second transmit timestamp; and determining the delay associated with the first communication network based on the second originate timestamp, the second receive timestamp, and the second transmit timestamp.

* * * * *